United States Patent [19]
Miyake et al.

[11] Patent Number: 5,253,237
[45] Date of Patent: Oct. 12, 1993

[54] OPTICAL HEAD DEVICE

[75] Inventors: Takahiro Miyake; Yoshio Yoshida; Yukio Kurata; Yasuo Nakata, all of Tenri; Katsuhiro Kubo, Yamatokoriyama, all of Japan

[73] Assignee: Sharp Kabushiki Kaisha, Osaka, Japan

[21] Appl. No.: 533,401

[22] Filed: Jun. 5, 1990

[30] Foreign Application Priority Data

| Jun. 6, 1989 | [JP] | Japan | 1-143851 |
| Jun. 22, 1989 | [JP] | Japan | 1-160403 |
| Jul. 11, 1989 | [JP] | Japan | 1-180011 |
| Jul. 21, 1989 | [JP] | Japan | 1-189638 |
| Jul. 28, 1989 | [JP] | Japan | 1-197230 |

[51] Int. Cl.$^5$ .............................. G11B 7/00
[52] U.S. Cl. .................. 369/44.37; 369/44.12; 369/44.42
[58] Field of Search ............... 369/44.11, 44.12, 44.37, 369/109, 44.42

[56] References Cited

U.S. PATENT DOCUMENTS

| 4,654,838 | 3/1987 | Sugiki | 369/44.42 |
| 4,695,158 | 9/1987 | Kotaka et al. | 369/44.42 |
| 4,817,074 | 3/1989 | Yamanaka | 369/44.37 |
| 4,897,828 | 1/1990 | Yoshitoshi et al. | 369/44.42 |
| 4,904,856 | 2/1990 | Nagahama et al. | 369/44.42 |
| 4,924,079 | 5/1990 | Opheij et al. | 369/44.11 |
| 4,929,823 | 5/1990 | Kato et al. | 369/44.37 |
| 5,060,217 | 10/1991 | Kume | 369/44.41 |

FOREIGN PATENT DOCUMENTS

| 219908 | 4/1987 | European Pat. Off. |
| 228620 | 7/1987 | European Pat. Off. |
| 309689 | 4/1989 | European Pat. Off. |
| 311463 | 4/1989 | European Pat. Off. |
| 58-91538 | 5/1983 | Japan | 369/44.42 |
| 60-59545 | 4/1985 | Japan |
| 60-129936 | 7/1985 | Japan | 369/44.42 |
| 62-277635 | 12/1987 | Japan |
| 62-277640 | 12/1987 | Japan |
| 62-289932 | 12/1987 | Japan |
| 62-289933 | 12/1987 | Japan |
| 64-4926 | 1/1989 | Japan |

Primary Examiner—Roy N. Envall, Jr.
Assistant Examiner—Jennifer L. Hazard

[57] ABSTRACT

The invention discloses an optical head device having a diffraction grating element divided into a plurality of diffraction gratings have a substantially equal diffraction angle, a substantially equal optical utilization efficiency, and different focal distances of first order diffracted lights, each of the first order diffracted lights being produced from a reflected light from the recording medium, at the respective diffraction gratings and a photodetector positioned at a mid-position between two focal points produced when there occurs no focusing error, the photo-detecting means having a plurality of photo-detecting parts juxtaposed in a direction substantially orthogonal to an average diffracting direction of the diffraction grating element. The above arrangement enables to produce a small size optical head device and improve the detecting of focusing errors and tracking errors.

55 Claims, 29 Drawing Sheets

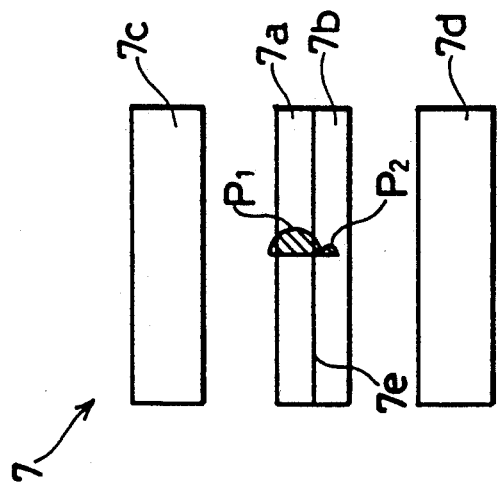
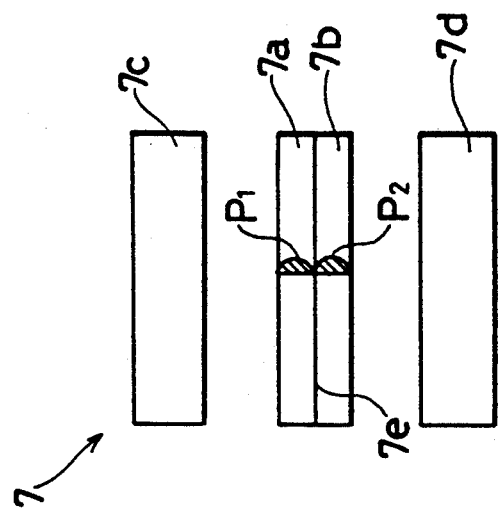
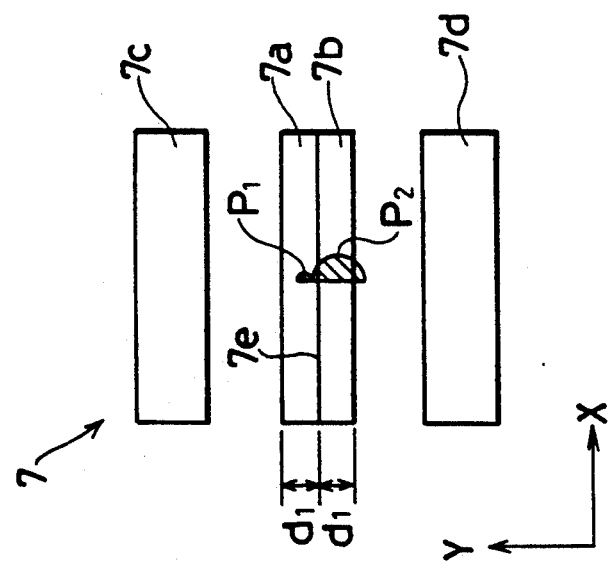

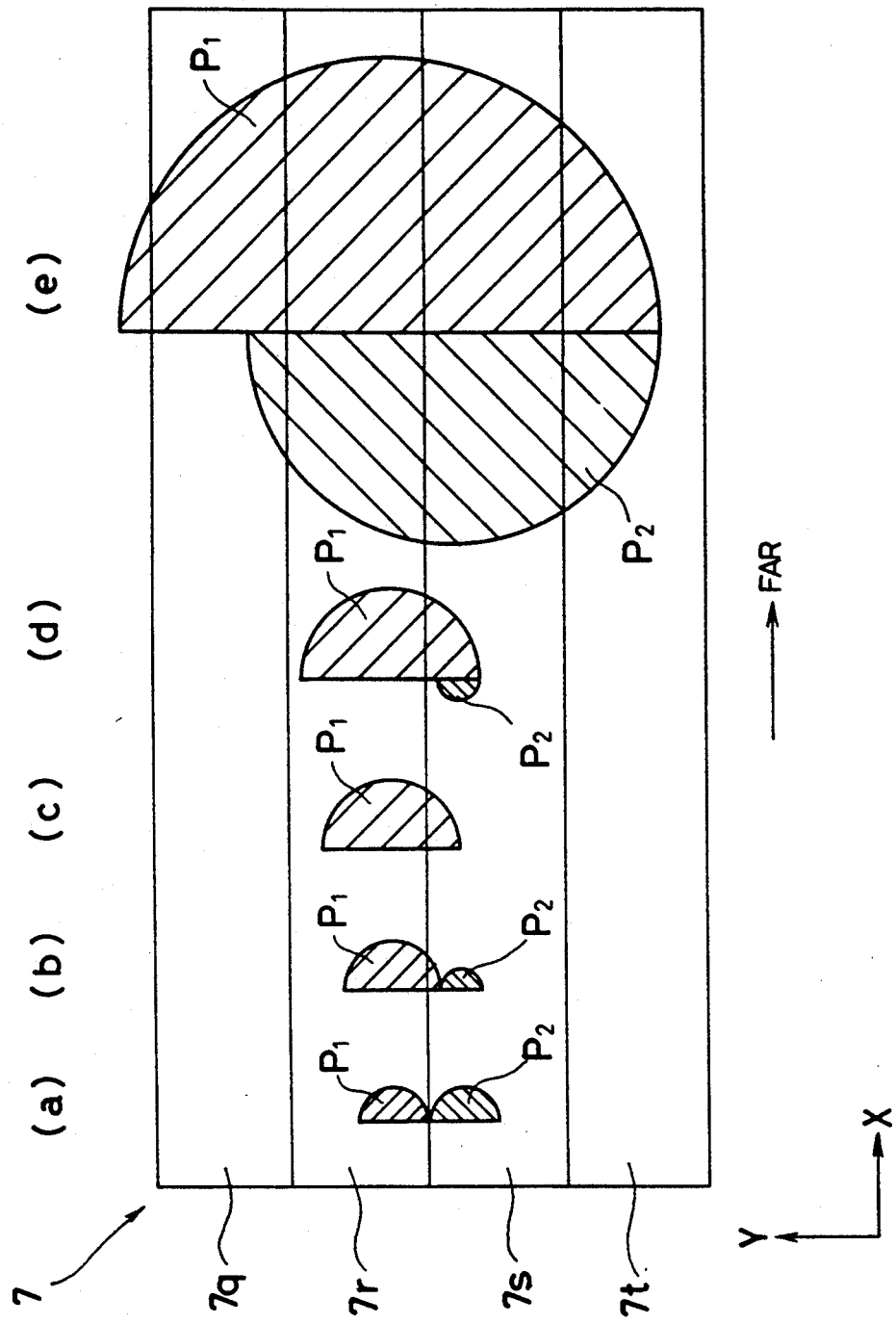

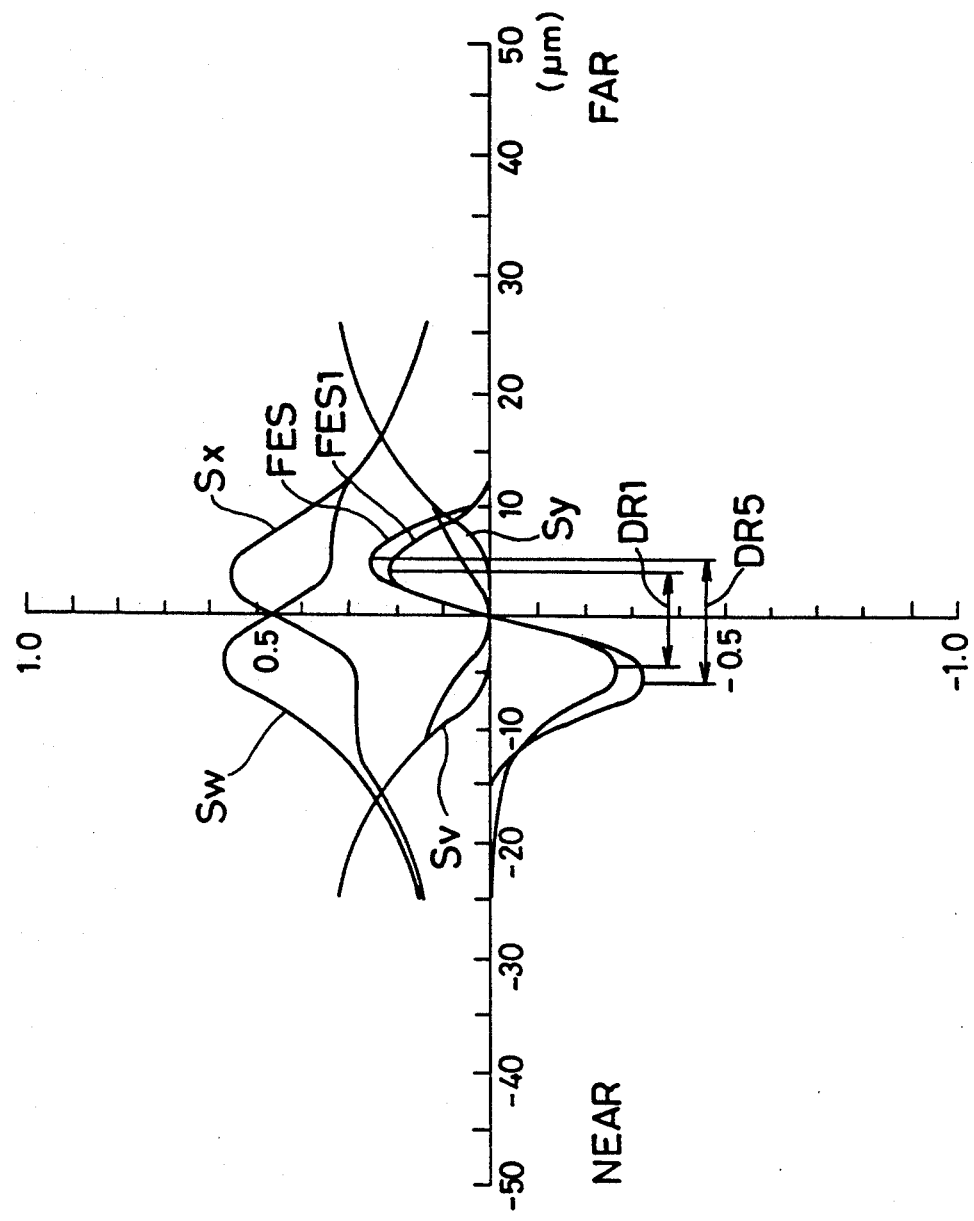

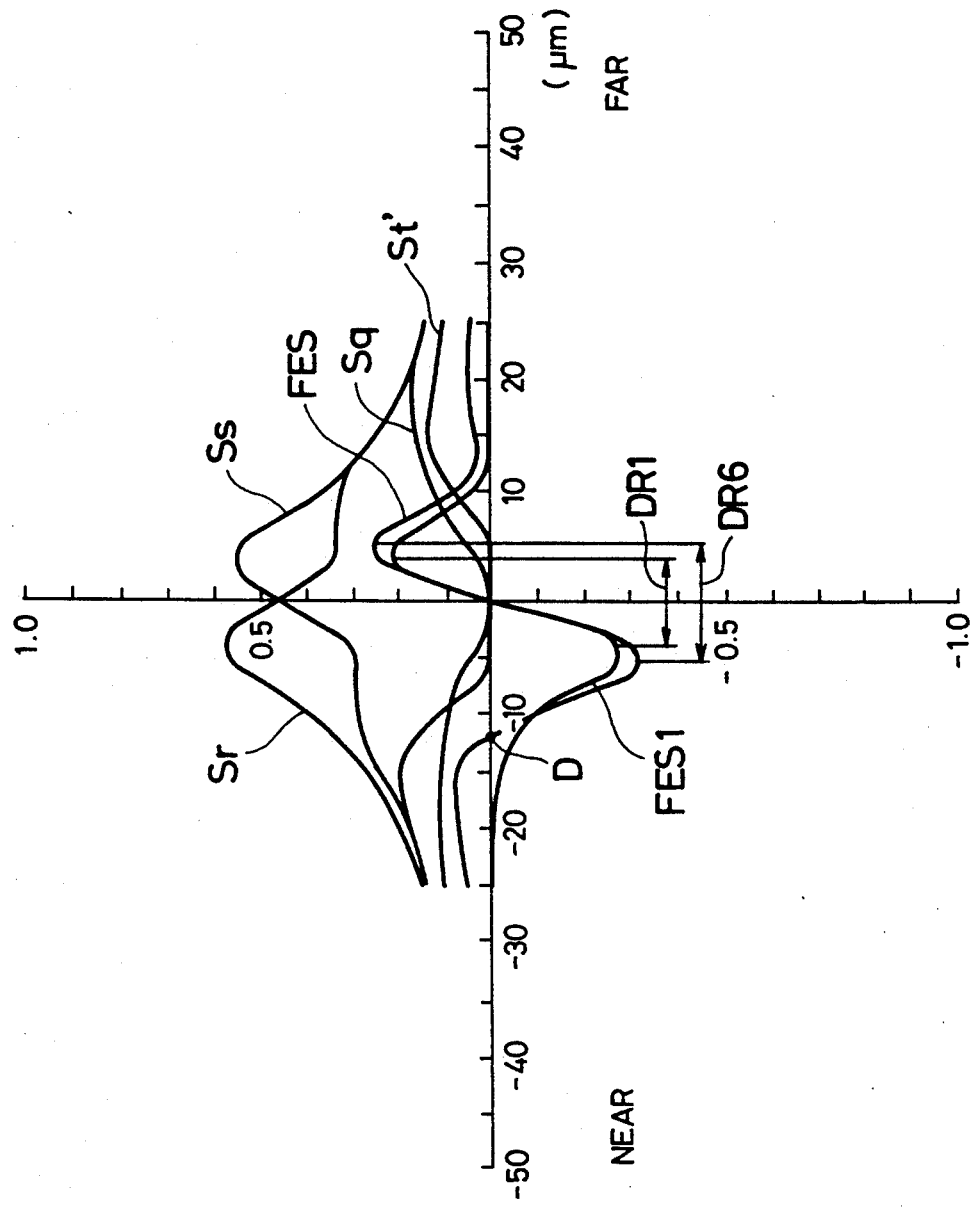

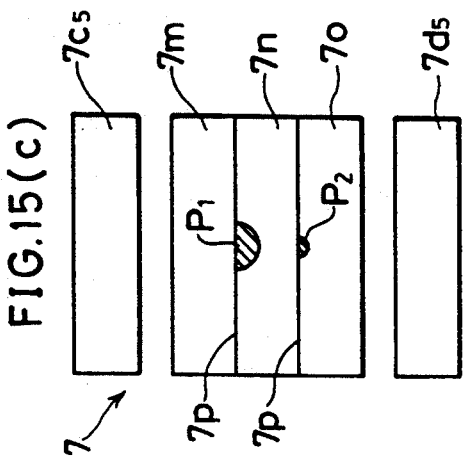
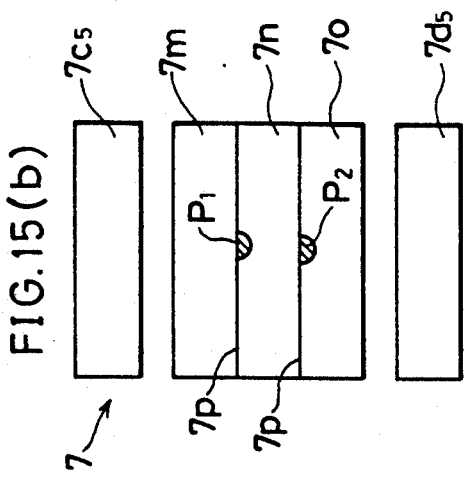
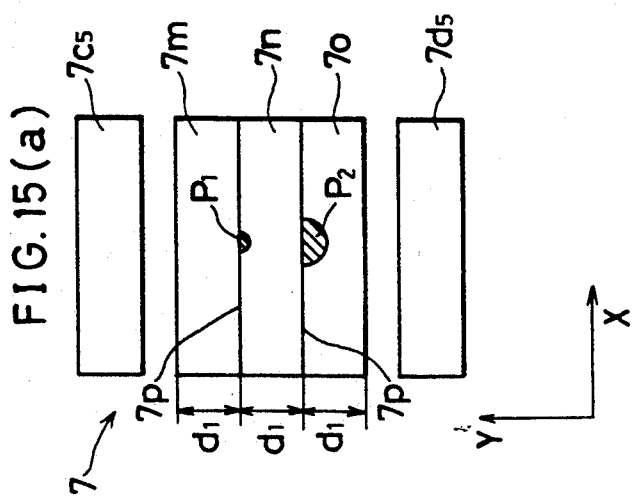
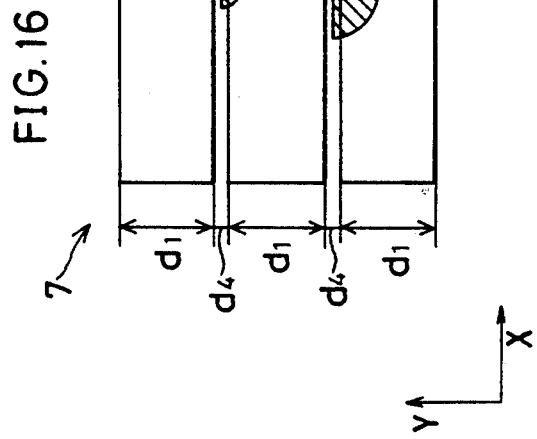

FIG. 24 ( a )
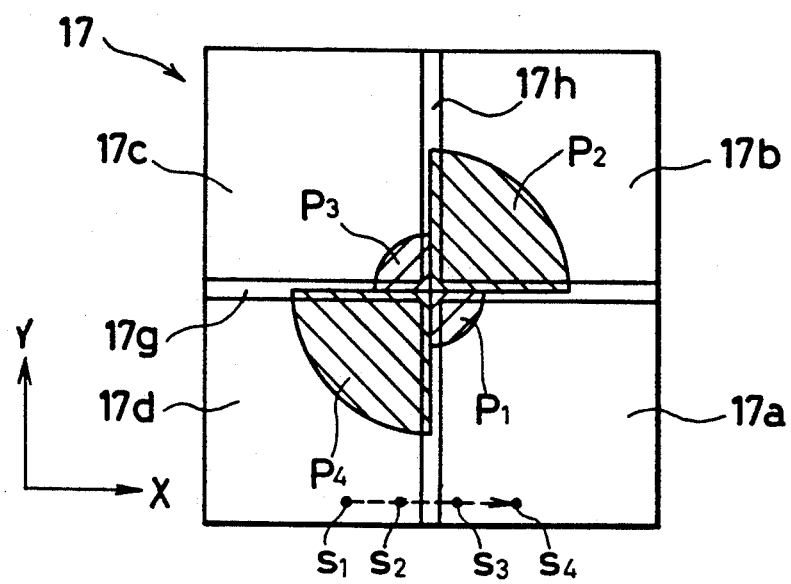
FIG. 24 ( b )
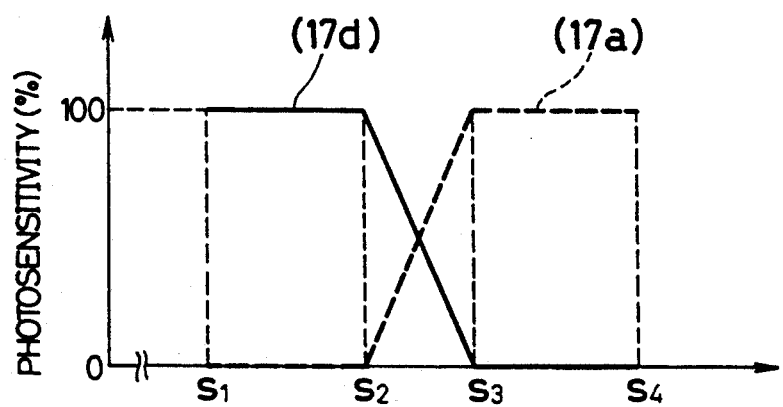

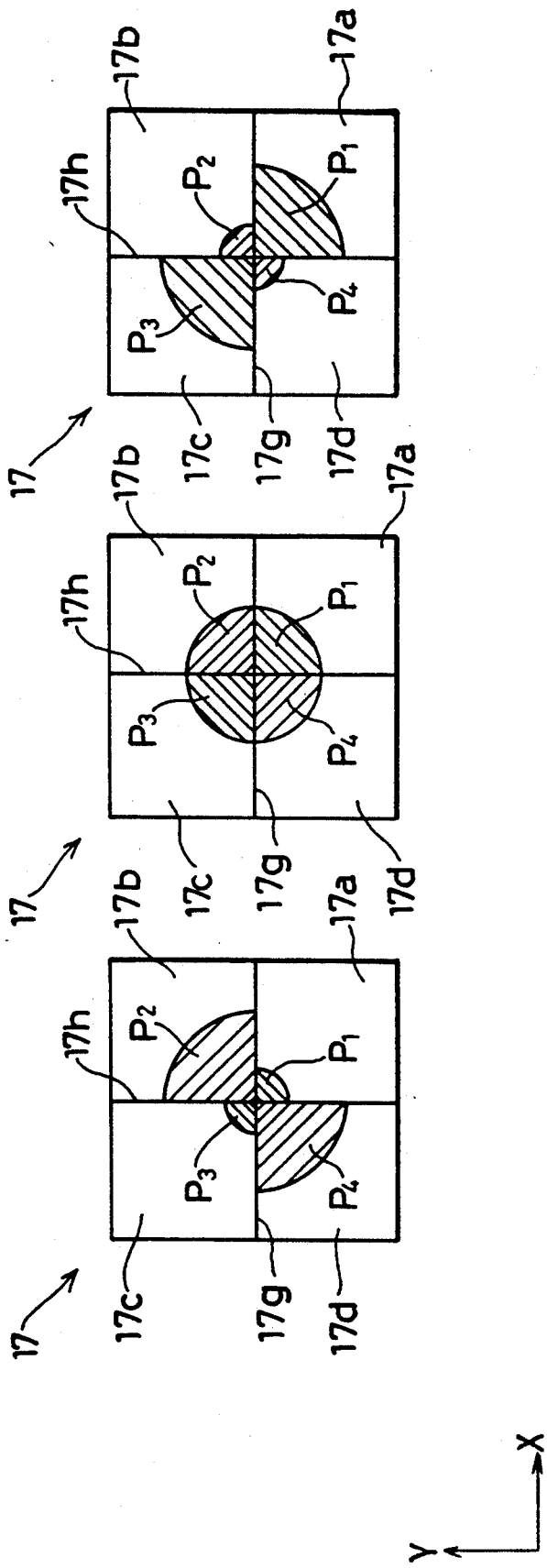

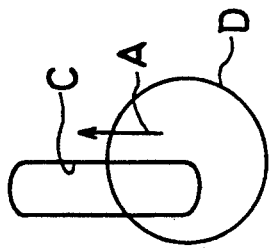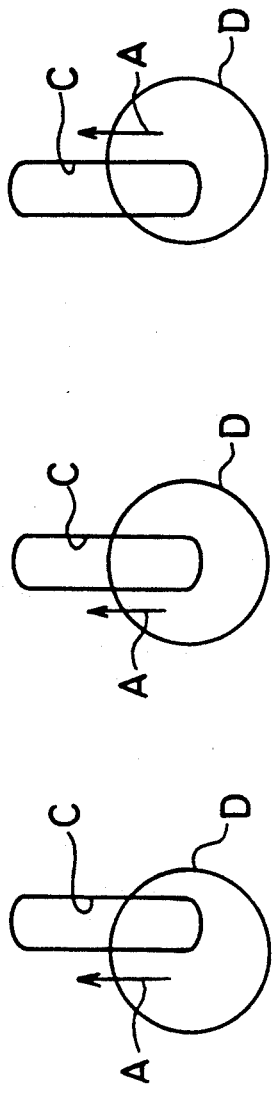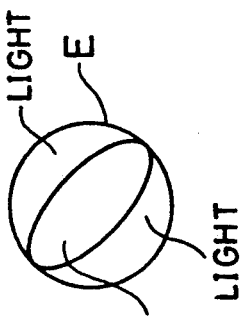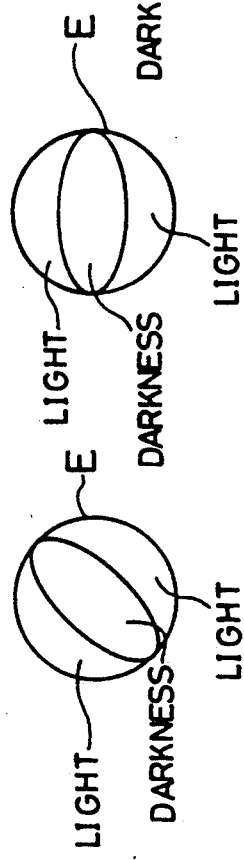

OPTICAL HEAD DEVICE

FIELD OF THE INVENTION

The present invention relates to an optical head device for writing or reading data on various types of optical disks such as Read-Only type, Write-Once type, or Rewritable disks.

BACKGROUND OF THE INVENTION

Read-Only type disks such as compact disks, Write-Once type disks whereon data can be written only once, and Rewritable disks such as magneto-optical disks, are widely known as optical disks.

To write or read data on or from an optical disk such as mentioned above, a light beam, for example a laser beam, needs to be projected and converged accurately on recording tracks formed on the optical disk. In the conventional art, the 3-beam method or the push-pull method is predominantly adopted for executing the tracking control of the light beam. With the 3-beam method, a main beam that is irradiated on the center of a track and a pair of sub beams that are irradiated slightly shifted in opposite directions off the center of the track on both sides of the track, are produced and employed. Meanwhile with the push-pull method, only one light beam is used and divided in two by means of an optical system, and the quantities of light of the two light beams produced are compared. The 3-beam method permits a finer tracking control than the push-pull method, when the disk is warped or when the depth of the guiding grooves forming the track is irregular.

A conventional optical head device whose optical system comprises a diffraction grating element provided with diffraction gratings created by the use of interference fringes of two divergent lights, and that employs the 3-beam method for the tracking control will be described below with reference to FIG. 38.

In a conventional optical head device, a light emitted from a semi-conductor laser 101 is divided into a main beam (i.e. zeroth order diffracted light) and a pair of sub-beams (i.e +1 order and −1 order diffracted lights) by a first diffraction grating element 102, and is directed to a second diffraction grating element 103. The sub-beams are located in a plane approximately orthogonal to the surface of the paper, form a predetermined angle with respect to the main beam and stretch away in opposite directions. The three beams are further diffracted in the second diffraction grating element 103 and only the zeroth order diffracted light beams produced as each of the three beams are diffracted, pass through a collimating lens 104 and are converged on a recording medium 106 by an objective lens 105.

As illustrated in FIG. 39(a), at this time if the recording medium 106 is for example a compact disk, a main beam M (accurately the zeroth order diffracted light produced by the main beam) is converged on a recording track 108 formed on the recording medium 106 so as to read data recorded in the form of a pit 109 on the recording track 108. Data is obtained and read from the luminous intensity of the reflected light of the main beam M. A focusing error signal is also derived from the main beam M, as it will be described later.

Meanwhile, two sub beams (accurately the zeroth order diffracted lights produced by the sub beams) $S_1$ and $S_2$ are converged in positions relatively far apart from each other in opposite directions with respect to the main beam M in the track direction Y of the recording medium 106; and slightly shifted in opposite directions with respect to a direction X. The direction X represents a radial direction of the recording medium 106 as well as the diffracting direction of the second diffraction grating element 103 to be described later (the direction perpendicular with the track direction Y and hereinafter referred to as the diffracting direction X). A tracking error signal is derived from the luminous intensities of the reflected lights of the two sub beams $S_1$ and $S_2$.

The main beam M reflected from the recording medium 106 and the reflected lights of the sub beams $S_1$ and $S_2$ pass through the objective lens 105 and the collimating lens 104. Only the first order diffracted lights produced as the reflected lights are diffracted by the second diffraction grating element 103 in the diffracting direction X, are directed to a photodetector 107. Hereinafter, the first order diffracted lights produced in the diffraction grating element 103 by the main beam M will be referred to as main first order diffracted lights, and the first order diffracted lights produced by the pair of sub beams $S_1$ and $S_2$ as the pair of sub first order diffracted lights.

The configuration of the diffraction gratings formed in the second diffraction grating element 103 as seen from the recording medium 106 side, is illustrated in FIG. 40(a) and the configuration of photo-detecting parts 107a to 107f formed in the photodetector 107, as seen from the recording medium 106 side, is illustrated in FIG. 40(b). As illustrated in FIG. 40(a), the second diffraction grating element 103 is composed of two diffraction gratings 103a and 103b divided by a join line 103c that is parallel with the diffracting direction X and intersects an optical axis L (shown in FIG. 38). Grating lines 103d are formed in the diffraction grating 103a, and grating lines 103e are formed in the diffraction grating 103b such that the grating lines 103d and grating lines 103e have a different grating pitch and are formed in a direction substantially perpendicular to the join line 103c.

As to the photo-detector 107, it is divided into six photo-detecting parts 107a to 107f such that the longitudinal direction of each of the photo-detecting parts 107a to 107f is parallel with the diffracting direction X. When the main beam M projected on the recording medium 106 is converged correctly without any focusing error, the main first order diffracted light produced in the diffraction grating 103a is converged on a parting line 107g and forms a spot $P_1'$. The main first order diffracted light produced in the diffraction grating 103b is converged on a parting line 107h and forms a spot $P_2'$. The sub first order diffracted lights are converged on the photo-detecting parts 107e and 107f respectively.

Supposing that Sa to Sf represent the output signals released by the photo-detecting parts 107a to 107f, a focusing error signal FES may be determined by performing the operation FES=(Sa+Sd)−(Sb+Sc). A tracking error signal RES is determined by performing the operation RES=Se−Sf, and a recorded data signal RS by performing the operation RS=Sa+Sb+Sc+Sd.

The diffraction gratings 103a and 103b are usually composed of grooves and have a rectangular profile as illustrated in FIG. 41(a). However, diffraction gratings having a serrated profile that permit a high optical utilization efficiency, are also being studied.

In the above arrangement, the two spots $P_1'$ and $P_2'$ are formed on the photodetector 107 fairly apart from each other along the diffracting direction X. Therefore, the photo-detecting parts 107a and 107c are aligned and disposed longitudinally along the diffracting direction X. Consequently, the photo-detecting parts 107b and 107d are juxtaposed and disposed longitudinally along the diffracting direction X. This causes the entire photo-detector 107 to extend considerably lengthwise along the diffracting direction X and thereby to occupy a large space, and the fabrication cost to increase.

When each the diffraction gratings 103a and 103b have a serrated profile, in order to form the two spots $P_1'$ and $P_2'$ fairly apart from each other along the diffracting direction X, the angle of diffraction at the diffraction grating 103a and the angle of diffraction at the diffraction grating 103b need to differ from each other considerably. In other words, the respective grating pitches of the diffraction gratings 103a and 103b need to differ from each other considerably. This not only causes the fabrication process of the diffraction gratings 103a and 103b to be complex but also, creates a difference between the optical utilization efficiencies as the diffraction gratings 103a and 103b have a different profile, thereby causing an accurate focusing error detection to be infeasible. The profile of each of the diffraction gratings 103a and 103b may be formed so as to reduce the difference between the optical utilization efficiencies. However, such a profile does not correspond to the optimum profile desired for each of the diffraction grating 103a and 103b thereby causing the optical utilization efficiency to lower and the quality of reproduced signals to drop.

Furthermore, when using an optical head device where the 3-beam method is adopted in order to write/read data on a Write-Once type disk, the following difficulties arise. Suppose that the recording medium 106 shown in FIG. 39 is an optical disk of the Write-Once type where recording tracks 108 are previously formed in the shape of guiding grooves or the like. When reading data, the pair of sub beams $S_1$ and $S_2$ are irradiated on pits 109 formed on a recording track 108 in a substantially identical fashion, as illustrated in FIG. 39(a). The variation in the reflectivity occurring due to the pits 109 is thus substantially identical for both sub beams $S_1$ and $S_2$ thereby permitting the tracking error detection to be executed smoothly. However when writing data as illustrated in FIG. 39(b), the sub beam $S_2$ that precedes the main beam M is irradiated on an unrecorded section while the sub beam $S_1$ that follows the main beam M is irradiated on a previously formed pit 109. As a result, the sub beams $S_1$ and $S_2$ have a different reflectivity even if the main beam M is positioned on the center of the recording track 108 causing the accuracy of the tracking error detection to lower.

SUMMARY OF THE INVENTION

An object of the present invention is to provide an optical head device that can be fabricated at low cost and in a small size by employing a photodetector that occupies little space or by reducing the number of composing parts, and where highly accurate focusing control and tracking control can be executed.

Another object of the present invention is to provide an optical head device comprising a diffraction grating element that is composed of a plurality of diffraction gratings formed by grooves, having a substantially identical grating profile and such that the difference between their respective angles of diffraction is small, that can be fabricated easily and whose optical utilization efficiency is sufficiently high and substantially uniform.

In order to achieve the aforementioned objects, an optical head device in accordance with the present invention comprises a diffraction grating element that leads zeroth order diffracted lights produced by a main beam and a pair of sub beams obtained using the 3-beam method to a recording medium, and leads first order diffracted lights produced by reflected lights from the recording medium to photo-detecting means. The optical head device further comprises photo-detecting means composed of a main photo-detecting section used for detecting recorded data and focusing errors based on the main beam, and a sub photo-detecting section used for detecting tracking errors based on the pair of sub beams.

The diffraction grating element comprises a first diffraction grating and a second diffraction grating separated by a plane that includes an optical axis linking the point where light is projected from a light source provided in the optical head device and the focal point where the light is converged on the recording medium. The orientation of the grating lines and the grating pitch of each of the first and second diffraction gratings are set in accordance with the relative positions of the light source, the diffraction grating element and the photo-detecting means so that the light spots formed by the light beams that were directed to the photo-detecting means through the first and second diffraction gratings are aligned along a direction substantially orthogonal to the average diffracting direction of the diffraction grating element, and in particular so that the light spots formed by the light beams that are directed to the main photo-detecting section, are aligned in close proximity.

The first diffraction grating and the second diffraction grating may thus have a substantially equal angle of diffraction. As a result, the first diffraction grating and the second diffraction grating may be formed so as to have a substantially equal grating pitch and thereby so as to have a substantially similar grating profile. A diffraction grating element having a sufficiently high and substantially uniform optical utilization efficiency may be thus fabricated easily.

The photo-detecting means is mounted at a position located substantially in the middle of the focal point of a first order diffracted light produced in the first diffraction grating and the focal point of a first order diffracted light produced in the second diffraction grating. However this is on condition that a light-converging property is given to one of the first and second diffraction gratings, and a light-diverging property to the other. Accordingly, when a light beam is projected from the optical head device and converged accurately on a recording medium without any focusing error, the light spot formed by the first order diffracted light produced in the first diffraction grating and the light spot formed by the first order diffracted light produced in the second diffraction grating, are respectively irradiated on the main photo-detecting section of the photo-detecting means in a substantially equal size. Furthermore, as described above, the diffraction grating element has a substantially uniform optical utilization efficiency. This allows the tracking control and the focusing control to be performed with high accuracy when tracking errors and focusing errors are detected through a difference between the luminous intensities of the light spots formed by the first order diffracted lights produced in the first and second diffraction gratings and impinging on the photo-detecting means.

Provision is made such that the main photo-detecting section of the photo-detecting means is divided into a plurality of parts by parting lines that are substantially parallel with the average diffracting direction of the diffraction grating element. The main photo-detecting section and the sub photo-detecting sections are mounted so as to be juxtaposed in a single direction that is substantially orthogonal to the average diffracting direction. As a result, the space the photo-detecting means occupies may be reduced. Further, when the wavelength of the light emitted from the light source varies, each light spot shifts on the photo-detecting means in the diffracting direction of the diffraction grating element, i.e. the lengthwise direction of the main photo-detecting section. Each of the light spots thus always corresponds to one of the photo-detecting parts constituting the main photo-detecting section. As the focusing error is detected by comparing the output signals released by the photo-detecting parts using a fixed arithmetic operation, offset does not occur in the focusing error signal and focusing errors can be detected accurately, if each light spot always corresponds to one photo-detecting part.

When the main photo-detecting section of the photo-detecting means is divided into for example four parts by parting lines that are substantially parallel with the average diffracting direction of the diffraction grating element, if the optical head device and the recording medium are excessively apart from each other, the light spots are sometimes enlarged and protrude out of the main photo-detecting section, and the polarity of the focusing error signal is undesirably reversed. In order to prevent such a trouble, the width extending in the direction substantially orthogonal to the average diffracting direction, of at least one of the two photo-detecting parts located at both ends of the main photo-detecting section, should be set so as to be wider than the widths of the inner photo-detecting parts. Or, the photosensitivity of at least one of the photo-detecting parts located at both ends of the main photo-detecting section should be adjusted.

In order to execute an accurate tracking control when recording data on the recording medium, a pair of light spots formed by the diffracted lights produced by the main beam and irradiated on the main photo-detecting section, may also be employed and tracking errors may be detected with the push-pull method.

The diffraction grating element may be also divided by planes which include an optical axis that links the point where light is projected from a light source and the focal point where the light is converged on the recording medium, so as to be symmetrical with respect to the optical axis and composed of at least four diffraction gratings. In that case, the main photo-detecting section of the photo-detecting means is installed at a position located substantially in the middle of a focal point where the first order diffracted lights produced in a first predetermined pair of diffraction gratings, are converged when there is no focusing error, and a focal point where the first order diffracted lights produced in a second pair of diffraction gratings are converged when there is no focusing error. In addition, the photo-detecting parts of the photo-detecting means are respectively mounted in accordance with the diffracting direction of each of the diffraction gratings.

When tracking errors are detected with a so-called heterodyne method, tracking error detecting means needs to be affixed to the optical head device. The tracking error detecting means detects tracking errors by comparing the phase of a difference signal generated in accordance with a difference between the sum of output signals released by the photo-detecting parts that correspond to the first pair of diffraction gratings and the sum of output signals released by the photo-detecting parts that correspond to the second pair of diffraction gratings, with the phase of a sum signal generated in accordance with the sum of all the photo-detecting parts. In this case, the means used for producing the pair of sub beams from the light emitted from the light source, as well as the sub photo-detecting section of the photo-detecting means are unnecessary.

With the above arrangement, when there is no tracking error, the light beam reflected off a pit recorded on the recording medium or the like, is distributed on the diffraction grating element such that it forms a pattern of light and darkness symmetrical with respect to a plane that is parallel with the direction of the recording tracks of the recording medium and that comprises the optical axis. As a result, the sum of the output signals released by the photo-detecting parts corresponding to the first pair of diffraction gratings, and the sum of the output signals released by the photo-detecting parts corresponding to the second pair of diffraction gratings are equal, whereby the difference between the two sums equals "0". Meanwhile, when a tracking error occurs, the pattern of light and darkness formed on the diffraction grating element becomes asymmetrical with respect to the aforementioned plane. Consequently, the sum of the output signals released by the photo-detecting parts corresponding to the first pair of diffraction gratings and the sum of the output signals released by the photo-detecting parts corresponding to the second pair of diffraction gratings differ from each other, and a difference signal may be derived from this difference. The difference signal forms a substantially sinusoidal wave whose polarity is reversed differently depending on which side off the center of the recording track the light beam deviates when the light beam moves along pits or the like during the tracking. The sum signal generated in accordance with the sum of the output signals released by all the photo-detecting parts, also forms a sinusoidal wave varying in accordance with the motion of the light beam along pits or the like. The phase of the sum signal is substantially constant irrespectively of whether a tracking error occurs or not. The tracking error detecting means can thus execute the tracking error detection by comparing the phase of the sum signal and the phase of the difference signal.

For a fuller understanding of the nature and advantages of the invention, reference should be made to the ensuing detailed description taken in conjunction with the accompanying drawings.

BRIEF DESCRIPTION OF THE DRAWINGS

FIG. 1 to FIG. 4 are views illustrating a first embodiment of the present invention.

FIG. 1(a) to FIG. 1(c) are schematic plane views illustrating how light spots illuminated on a photodetector vary, when an objective lens is shifted along its optical axis.

FIG. 2 is a schematic front view illustrating an optical head device.

FIG. 3 is a schematic plan view illustrating a second diffraction grating element as seen from a recording medium side.

FIG. 4 is a graph illustrating how output signals released by different photo-detecting parts and a focusing error signal vary, when the objective lens is shifted along its optical axis.

FIG. 5 is a schematic plan view illustrating a photodetector whereon light spots are illuminated.

FIG. 6 is a graph illustrating how output signals released by different photo-detecting parts and a focusing error signal vary when an objective lens is shifted along its optical axis.

FIG. 7 is a schematic plan view of a photodetector whereon light spots are illuminated.

FIG. 8 is a graph illustrating how output signals released by different photo-detecting parts and a focusing error signal vary when an objective lens is shifted along its optical axis.

FIG. 9 through FIG. 11 are views illustrating a fourth embodiment of the present invention.

FIG. 9 is a schematic plan view of a photodetector whereon light spots are illuminated.

FIG. 10 is a graph illustrating how output signals released by different photo-detecting parts and a focusing error signal vary, when an objective lens is shifted along its optical axis.

FIG. 11 is a plan view illustrating an example of how light spots vary on a photodetector when the objective lens is shifted away from the recording medium.

FIGS. 12(a)-(c) and FIG. 13 illustrate a fifth embodiment of the present invention.

FIG. 12(a) to FIG. 12(c) are schematic plane views illustrating examples of how light spots illuminated on a photodetector vary when an objective lens is shifted along its optical axis.

FIG. 13 is a graph illustrating how output signals released by different photo-detecting parts and a focusing error signal vary, when an objective lens is shifted along its optical axis.

FIG. 14 is a graph illustrating a sixth embodiment of the present invention and how output signals released by different photo-detecting parts vary when an objective lens is shifted along its optical axis after the photosensitivity of the photo-detecting parts is adjusted.

FIGS. 15(a)-(c) to FIG. 19 are views illustrating a seventh embodiment of the present invention.

FIG. 15(a) to FIG. 15(c) are schematic plane views illustrating how light spots illuminated on a photodetector vary, when an objective lens is shifted along its optical axis.

FIG. 16 is an enlarged plan view of essential parts shown in FIG. 15(a).

FIG. 19 is a graph illustrating how output signals released from different photo-detecting parts and a focusing error signal vary, when an objective lens is shifted along its optical axis.

FIG. 20(a) illustrates light spots illuminated on recording pits formed on a recording medium during the reproduction of data.

FIG. 20(b) illustrates light spots illuminated on recording pits formed on a recording medium during the recording of data.

FIG. 21(a) to FIG. 21(c) are schematic plane views illustrating how light spots illuminated on a photodetector vary, when an objective lens is shifted along its optical axis.

FIG. 24(a) is an enlarged plan view illustrating essential parts shown in FIG. 21(a).

FIG. 24(b) is a graph illustrating the photosensitive characteristics of a photo-detecting parts 17a and 17d.

FIG. 26 is a graph illustrating how sum signals obtained from output signals released by prescribed photo-detecting parts and a focusing error signal vary, when the objective lens is shifted along its optical axis.

FIG. 27 is a schematic plan view of a photodetector whereon light spots are illuminated when the wavelength of the light emitted from a semiconductor laser fluctuates.

FIG. 28 is a schematic partial front view illustrating an optical head device.

FIG. 29 is a graph illustrating how sum signals obtained from output signals released from prescribed photo-detecting parts and a focusing error signal vary, when an objective lens is shifted along its optical axis.

FIG. 33 to FIG. 37 are views illustrating a 14th embodiment of the present invention.

FIG. 33 is a schematic front view illustrating another optical head device.

FIG. 34(a) to FIG. 34(c) are schematic plane views illustrating how light spots illuminated on a photodetector vary, when an objective lens is shifted along its optical axis.

FIG. 35(a) to FIG. 35(c) are explanatory views illustrating relations between the positions of a light spot and a pit on a recording medium.

FIG. 36(a) to FIG. 36(c) are explanatory views illustrating examples of pattern made of light and darkness formed by the light spot on a diffraction grating element depending on the relation between the positions of the light spot and the pit shown in FIG. 35(a) to FIG. 35(c).

FIG. 37(a) is a graph illustrating how a sum signal varies when the light spot moves over a pit.

FIG. 37 shows graphs illustrating how a diagonal difference signal varies when the light spot moves on a pit.

FIG. 38 to FIG. 41 are views illustrating conventional examples.

FIG. 38 is a schematic front view illustrating an optical head device.

DESCRIPTION OF THE EMBODIMENTS

Referring now to FIGS. 1(a)-(c) to 4, a first embodiment of the present invention will be described below.

Figure 2:
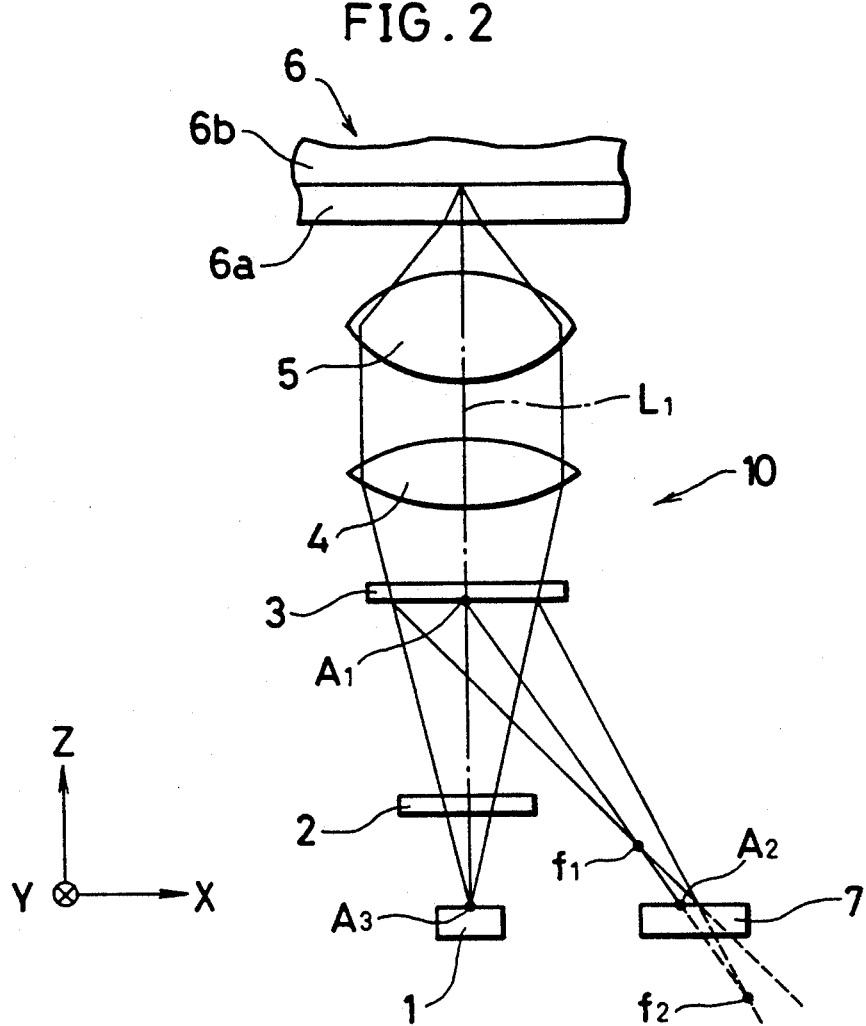

The optical head device of this embodiment is used as a reproducing device for ROM-type optical disks such as compact disks and video disks. As shown in FIG. 2, in an optical head device 10, a light beam emitted from a semiconductor laser 1 which functions as the light source is diffracted by a first diffraction grating element 2 to produce a main beam (i.e., a zeroth order diffracted light in the first diffraction grating element 2) and a pair of sub beams (i.e., ±first order diffracted lights in the first diffraction grating element 2). The pair of sub beams depart from each other in opposite directions with a main beam between so that each sub beam makes a predetermined angle with respect to the main beam in a plane which includes an optical axis $L_1$ connecting an emitting point $A_3$ of the semiconductor laser 1 to a focal point on a recording medium 6, and which is orthogonal to the plane of the drawing paper. The main beam and the pair of sub beams impinge upon a second diffraction grating element 3 which is one of the essential constituents of the invention. The three beams are further diffracted at the second diffraction grating element 3 and only the zeroth order diffracted light of each beam passes through a collimating lens 4. Thereafter, the zeroth order diffracted light of each beam is converged by an objective lens 5 so as to impinge on a substrate 6a of the recording medium 6 and then be focused on a recording layer, 6b thereof.

Where the recording medium 6 is a compact disk, the main beam (more specifically, the zeroth order diffracted light of the main beam), that has passed through the objective lens 5, is converged on a recording track in order to read data recorded in the form of pits on the recording track. On the other hand, the pair of sub beams (more specifically, the zeroth order diffracted lights of the sub beams) depart from each other with the main beam between. Specifically, the pair of sub beams depart from each other to a considerable extent in a track direction Y of the recording track on which the above beams are to be converged. The sub beams slightly deviate from each other in a direction X orthogonal to the track direction Y, that is, an average diffracting direction of the second diffraction grating element 13 comprised of a plurality of diffraction gratings (described later). This average diffracting direction is hereinafter referred to as "diffracting direction X". The reflected lights of the main beam and the sub beams from the recording medium 6 respectively pass through the objective lens 5 and the collimating lens 4, and then are further diffracted at the second diffraction grating element 3. Of the lights diffracted in the diffracting direction X at the second diffraction grating element 3, the first order diffracted lights of each beam are guided to a photodetector 7. (The first order diffracted lights of the main beam produced in the second diffraction grating element 3 in the return path are hereinafter respectively referred to as "main first order diffracted light", while the first order diffracted lights of the sub beam produced in the same are hereinafter respectively referred to as "sub first order diffracted light").

The photodetector 7 is comprised of, as shown in FIG. 1, photo-detecting parts 7a and 7b that constitute a main photo-detecting section and photo-detecting parts 7c and 7d that constitute a sub photo-detecting section. The photo-detecting parts 7a and 7b are used for the reading-out of recorded data as well as the generation of focusing error signals, both operations being performed based on the main beam. The photo-detecting parts 7c and 7d are used for the generation of tracking error signals based on the pair of sub beams. The photo-detecting parts 7a to 7d each have a substantially rectangular configuration whose long sides are parallel with the diffracting direction X of the second diffraction grating element 3. A parting line 7e, that is substantially parallel with the diffracting direction X, defines the border between the photo-detecting parts 7a and 7b. The photo-detecting parts 7c and 7d are disposed substantially along the track direction Y with the photo-detecting parts 7a and 7b between. A predetermined spacing is provided between the photo-detecting parts 7c and 7a, and between the photo-detecting parts 7d and 7b. It is an essential feature of the invention that the photo-detecting parts 7a to 7d are not juxtaposed along the diffracting direction X of the second diffraction grating element 3, but juxtaposed in a direction substantially orthogonal to the diffracting direction X.

Figure 3:
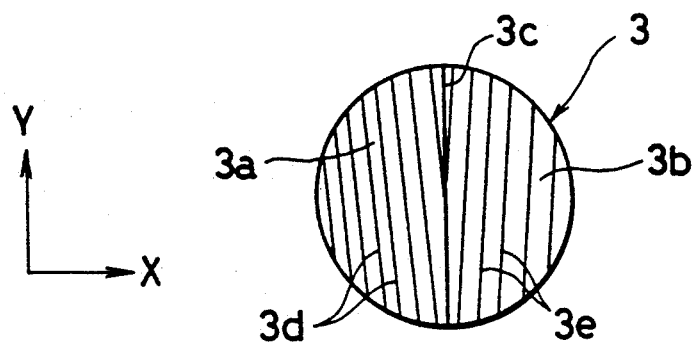

The second diffraction grating element 3 is divided into a first diffraction grating 3a and a second diffraction grating 3b by a join line 3c as shown in FIG. 3, these gratings 3a and 3b being substantially semi-circular. The join line 3c is on a plane which includes the optical axis $L_1$ and is parallel with the track direction Y. The first diffraction grating 3a has grating lines 3d and the second diffraction grating 3b has grating lines 3e. The orientations and pitches of these grating lines 3d and 3e are determined depending on the relative positions of the second diffraction grating element 3; the emitting point $A_3$ of the semiconductor laser 1; and a focal point on the photodetector 7. The grating pitches of the first and second diffraction gratings 3a and 3b are gradually varied in accordance with the above relative positions. The grating lines 3d and 3e substantially uniformly extend in a direction orthogonal to the diffracting direction X. With the above arrangement, when focusing is accurately performed (that is, the distance between the objective lens 5 and the recording medium 6 is appropriate and no focusing error occurs), the main first order diffracted light in the first diffraction grating 3a is once converged on a focal point $f_1$ located before the photodetector 7, and then forms a spot $P_1$ on the photo-detecting part 7a as shown in FIG. 1(b). The spot $P_1$ has a semi-circular configuration obtained by inverting the semi-circular first diffraction grating 3a by 180°. The main first-order diffracted light in the second diffraction grating 3b forms a semi-circular spot $P_2$ on the photo-detecting part 7b before being focused on the focal point $f_2$ which is positioned behind the photodetector 7. The orientation of the spot $P_2$ is the same as that of the spot $P_1$. As shown in FIG. 1(b), the spots $P_1$ and $P_2$ can be juxtaposed substantially in the track direction Y, by approximately equalizing the diffraction angle of the first diffraction grating 3a to that of the second diffraction grating 3b, and slightly differentiating the orientation of the grating lines 3d from that of the grating lines 3e. The photodetector 7 is positioned substantially at a mid-position between the focal points $f_1$ and $f_2$. In order to make a difference between the focal distance of the first order diffracted light of the first diffraction grating 3a and that of the first order diffracted light of the second diffraction grating 3b, a light-converging property (convex lens effects) is applied to the first diffraction grating 3a while a light-diverging property (concave lens effects) is applied to the second diffraction grating 3b. Assuming that $A_1$ represents the optical axis point which is the intersection of the optical axis $L_1$ and the second diffraction grating element 3, and $A_2$ represents the middle point between the spots $P_1$ and $P_2$ which exist on the parting line 7e (see FIG. 1(b)), the optical axis point $A_1$, the focal points $f_1$ and $f_2$, and the middle point $A_2$ all exist in the same plane shown in FIG. 2, the plane including the optical axis of the first order diffracted light of the light which passes through the center of the second diffraction grating element 3.

Figure 41A:
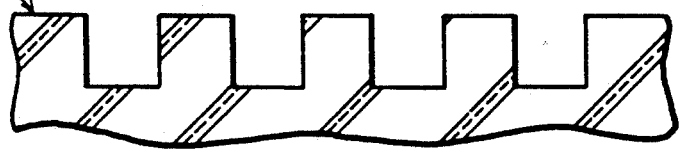
FIG. 41(a) and FIG. 41(b) are partial cross-sectional views respectively illustrating the profile of a diffraction grating formed on the second diffraction grating element.
Figure 41B:

The grating lines 3d and 3e are inscribed by the following process similar to the manufacturing process of semiconductors: a resist is firstly applied to the substrate; a grating pattern is transferred to the resist, using a mask which has the pattern shown in FIG. 3; and the resist is etched. For processing the first and second diffraction gratings 3a and 3b so as to have a serrated profile as shown in FIG. 41(b), the ion beam etching method may be employed in which ion beams are obliquely projected onto the surface of the substrate from above. There are other methods such as the two-beam interference method widely known, and the method in which a pattern of interference fringes is obtained by a computer and the pattern is directly depicted on a dry plate by an electron beam exposure device. With the above methods, the grooves formed in each of the first and second diffraction gratings 3a and 3b may have a rectangular profile or serrated profile as shown in FIGS. 41(a) and 41(b). Since the difference between the diffraction angle of the first diffraction grating 3a and the diffraction angle of the second diffraction grating 3b is very small as described above, a substantially identical profile can be obtained for the first and second diffraction gratings 3a and 3b when processing the grooves in a serrated configuration.

This allows the first and second diffraction gratings 3a and 3b to have a substantially identical optical utilization efficiency, and therefore the light amount of the spot $P_1$ is substantially equal to that of the spot $P_2$. Consequently, the accuracy in detecting focusing error signals and tracking error signals is highly improved.

Now there will be given an explanation on the detection of recorded data signals, focusing error signals and tracking error signals while making reference to FIGS. 1(a) to 1(c).

When the distance between the objective lens 5 and the recording medium 6 is appropriate and focusing is accurately performed, the spots $P_1$ and $P_2$ are of the same size as shown in FIG. 1(b). This is because the photodetector 7 is placed at a mid-position between the focal points $f_1$ and $f_2$. Further, since the spots $P_1$ and $P_2$ are formed within the photo-detecting parts 7a and 7b respectively, the strength of an output signal Sa of the photo-detecting part 7a is equal to the strength of an output signal Sb of the photo-detecting part 7b. When the recording medium 6 approaches the objective lens 5 excessively, causing a focusing error, the focal point $f_1$ becomes closer to the photo-detecting part 7a while the focal point $f_2$ is farther away from the photo-detecting part 7b. Therefore, the spot $P_1$ is reduced in size and the spot $P_2$ expands out of the photo-detecting part 7b as shown in FIG. 1(a). Since the spots $P_1$ and $P_2$ have the substantially same light amount, the output signal Sb of the photo-detecting part 7b has less strength than the output signal Sa of the photo-detecting part 7a has, by the portion of the spot $P_2$ which protrudes out of the photo-detecting part 7b. On the contrary, when the recording medium 6 is excessively far from the objective lens 5, causing a focusing error, the spot $P_1$ is enlarged and the spot $P_2$ is constricted so that the strength of the output signal Sa becomes less than that of the output signal Sb.

A focusing error FES is given by the equation: FES=Sa−Sb, and the objective lens 5 is driven such that the focusing error signal becomes "0". On the other hand, a recorded data signal RS is given by the equation: RS=Sa +Sb. Since the pair of sub first order diffracted lights are converged on the photo-detecting parts 7c and 7d respectively, a tracking error signal RES can be obtained by the following equation: RES=Sc−Sd where Sc represents the output signal of the photo-detecting part 7c; and Sd represents the output signal of the photo-detecting part 7d. Tracking is controlled such that the tracking error signal RES becomes "0".

The following description concretely describes the design factors of an example of the optical head device 10.

The optical head device 10 is designed such that the objective lens 5 has a numerical aperture (NA) of 0.5 and a focal distance of 4.5 mm, and the collimating lens 4 has a numerical aperture (NA) of 0.145 and a focal distance of 18.0 mm. Further, the optical distance between the optical axis point $A_1$ of the second diffraction grating element 3 and the emitting point $A_3$ of the semiconductor laser 1 is set to 2.727 mm; the optical distance between the emitting point $A_3$ and the middle point $A_2$ existing on the photodetector 7 is set to 1.3 mm; the optical distance between the optical axis $A_1$ and the focal point $f_1$ is set to 2.9465 mm; the optical distance between the optical axis point $A_1$ and the middle point $A_2$ is set to 3.0211 mm; and the optical distance between the optical axis point $A_1$ and the focal point $f_2$ is set to 3.0944 mm. When the above points are plotted on three-dimensional coordinates (X, Y, Z) with an unit of $\mu$m, on condition that the optical axis point $A_1$ of the second diffraction grating element 3 is an original; the diffracting direction X is plotted as the X-coordinate; the tracking direction Y is as the Y-axis; and the direction orthogonal to the diffracting direction X and the tracking direction Y is as the Z-axis, the following values are obtained: the optical axis point $A_1$ (0, 0, 0); the middle point $A_2$ (1300.0, 0.0, −2727.0); the emitting point $A_3$ (0, 0, −2727.0); the focal point $f_1$ (1267.9, 9.8, −2727.0); and the focal point $f_2$ (1333.7, −10.3, −2797.8). In this example, the widths $d_1$ of the photo-detecting parts $7a$ and $7b$ in the photodetector 7 (these widths are substantially parallel with the track direction Y) are respectively set to 25 μm and the width of the parting line $7e$ (this width is substantially parallel with the track direction Y) is set to 5 μm. The above constants are listed in the following table.

TABLE 1

| OPTICAL DISTANCE BETWEEN EACH POINT (mm) | |
|---|---|
| OPTICAL AXIS POINT $A_1$/EMITTING POINT $A_3$ | 2.727 |
| EMITTING POINT $A_3$/MIDDLE POINT $A_2$ | 1.3 |
| OPTICAL AXIS POINT $A_1$/FOCAL POINT $f_1$ | 2.9465 |
| OPTICAL AXIS POINT $A_1$/MIDDLE POINT $A_2$ | 3.0211 |
| OPTICAL AXIS POINT $A_1$/FOCAL POINT $f_2$ | 3.0944 |

| OPTICAL PROPERTIES OF LENSES | | |
|---|---|---|
| | NUMERICAL APERATURE (NA) | FOCAL DISTANCE (mm) |
| COLLIMATING LENS 4 | 0.145 | 18.0 |
| OBJECTIVE LENS 5 | 0.5 | 4.5 |

| COORDINATES OF EACH POINT (μm) |
|---|
| $A_1$: (0, 0, 0) |
| $A_2$: (1300.0, 0.0, −2727.0) |
| $A_3$: (0, 0, −2727.0) |
| $f_1$: (1267.9, 9.8, −2727.0) |
| $f_2$: (1333.7, −10.3, −2797.8) |

Figure 4:
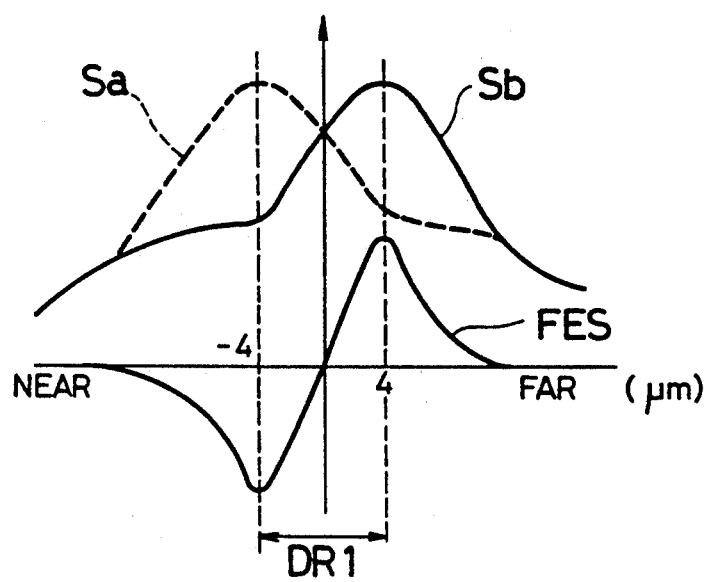

In the above arrangement, when focusing is accurately performed as shown in FIG. 1(b), the diameters of the spots $P_1$ and $P_2$ are respectively 20 μm. The spots $P_1$ and $P_2$ are accordingly formed within the photo-detecting parts $7a$ and $7b$ each having a width of 25 μm. When the objective lens 5 is moved along the optical axis $L_1$ in relation to the recording medium 6, the strength of the output signal Sa of the photo-detecting part $7a$ varies as indicated by the curved line Sa of FIG. 4; the strength of the output signal Sb of the photo-detecting part $7b$ varies as indicated by the curved line Sb of the same; and the strength of the focusing error signal FES (=Sa−Sb) varies as indicated by the curved line FES of the same. In the graph of FIG. 4, the optimum position of the objective lens 5 in relation to the recording medium 6 is plotted as an original (at that time, FES=0); relative signal strength is plotted as an ordinate; and the displacement amount of the objective lens 5 from the optimum position is plotted as an abscissa. When the displacement amount is minus, the objective lens 5 approaches the recording medium 6 excessively. When the objective lens 5 is displaced, with the output signal Sb at its maximum value, the focusing error signal FES has a maximum minus value. On the other hand, when the displacement amount is plus, the objective lens 5 becomes farther from the recording medium 6 excessively. When the objective lens 5 is displaced, with the output signal Sa at its maximum value, the focusing error signal FES has a maximum plus value. The region in which the displacement amount is plus is hereinafter called "FAR region" and the region in which the displacement amount is minus is called "NEAR region". In this embodiment, a dynamic range DR1 for detecting focusing errors is −4 μm to +4 μm.

Figure 5:
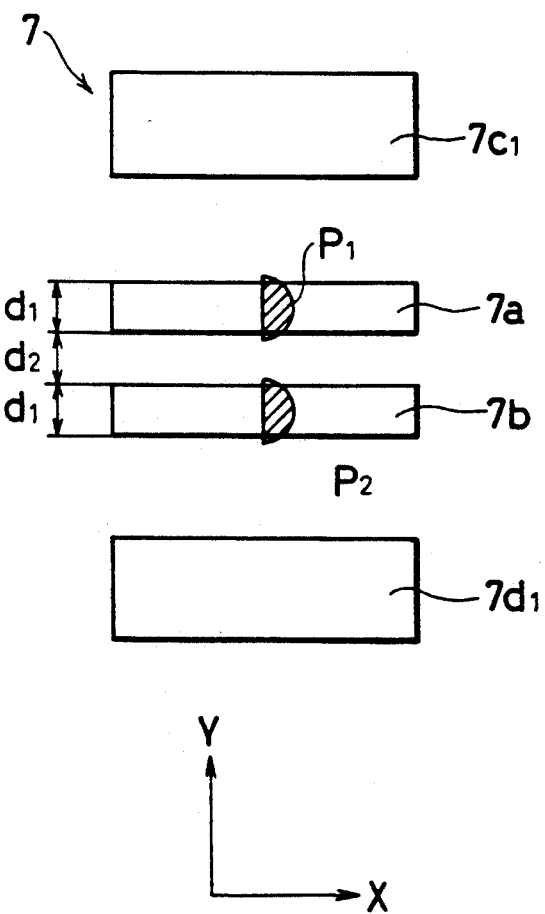
FIG. 5 and FIG. 6 are views illustrating a second embodiment of the present invention.
Figure 6:
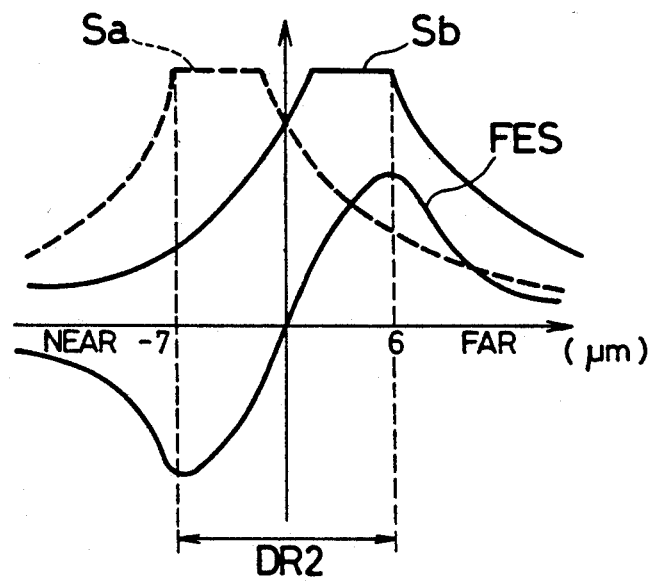

The following description describes a second embodiment of the invention with reference to FIGS. 5 and 6.

The photodetector 7 of this embodiment is comprised of the photo-detecting parts $7a$ and $7b$ (these photo-detecting parts constitute a main photo-detecting section) and photo-detecting parts $7c_1$ and $7d_1$ (these photo-detecting parts constitute a sub photo-detecting section). As shown in FIG. 5, the photo-detecting parts $7a$, $7b$, $7c_1$ and $7d_1$ respectively have a rectangular shape whose long sides are substantially parallel to the diffracting direction X of the second diffraction grating element 3, like the first embodiment.

The photo-detecting parts $7a$, $7b$, $7c_1$ and $7d_1$ are aligned substantially in the track direction Y. The photo detecting parts $7a$ and $7c_1$ are positioned with a predetermine spacing therebetween and the photo-detecting parts $7b$ and $7d_1$ are positioned with a predetermined spacing therebetween. The distance $d_2$ between the photo-detecting parts $7a$ and $7b$ on each of which the main first order diffracted light is converged, extending substantially along the track direction Y is considerably wider than the width of the parting line $7e$ lying between the photo-detecting parts $7a$ and $7b$ of the first embodiment and is set to 65 μm for example. The widths $d_1$ of the photo-detecting parts $7a$ and $7b$ are respectively 25 μm. In the second diffraction grating element 3, the grating lines $3d$ and $3e$ respectively have a predetermined orientation and a predetermined pitch. When focusing is accurately performed, the semi-circular spot $P_1$ formed by the main first order diffracted light in the the first diffraction grating $3a$ is positioned on the photo-detecting part $7a$ while the spot $P_2$ formed by the main first order diffracted light in the second diffraction grating $3b$ is positioned on the photo-detecting part $7b$, and the spots $P_1$ and $P_2$ are of equal size.

Like the first embodiment, the constants of the optical head device 10 (shown in FIG. 2) having the above described photodetector 7 are listed in the following table.

TABLE 2

| OPTICAL DISTANCE BETWEEN EACH POINT (mm) | |
|---|---|
| OPTICAL AXIS POINT $A_1$/EMITTING POINT $A_3$ | 2.727 |
| EMITTING POINT $A_3$/MIDDLE POINT $A_2$ | 1.3 |
| OPTICAL AXIS POINT $A_1$/FOCAL POINT $f_1$ | 2.8759 |
| OPTICAL AXIS POINT $A_1$/MIDDLE POINT $A_2$ | 3.0213 |
| OPTICAL AXIS POINT $A_1$/FOCAL POINT $f_2$ | 3.1823 |

| OPTICAL PROPERTIES OF LENSES | | |
|---|---|---|
| | NUMERICAL APERATURE (NA) | FOCAL DISTANCE (mm) |
| COLLIMATING LENS 4 | 0.145 | 18.0 |
| OBJECTIVE LENS 5 | 0.5 | 4.5 |

| COORDINATES OF EACH POINT (μm) |
|---|
| $A_1$: (0, 0, 0) |
| $A_2$: (1300.0, 0.0, −2727.0) |
| $A_3$: (0, 0, −2727.0) |
| $f_1$: (1237.4, 42.8, −2595.7) |
| $f_2$: (1369.3, −47.4, −2872.3) |

In the above example, when focusing is performed with accuracy as shown in FIG. 5, the diameters of the spots $P_1$ and $P_2$ are respectively 40 μm. When the objective lens 5 is moved along the optical axis $L_1$ in relation to the recording medium 6, the output signal Sa of the photo-detecting part 7a, the output signal Sb of the photo-detecting part 7b and the focusing error signal FES vary as indicated by the curved lines Sa, Sb and FES of FIG. 6 respectively. In this embodiment, a dynamic range DR2 for the detection of focusing errors is $-7$ μm to $+6$ μm, which is wider than the dynamic range DR1 of the first embodiment.

Figure 7:
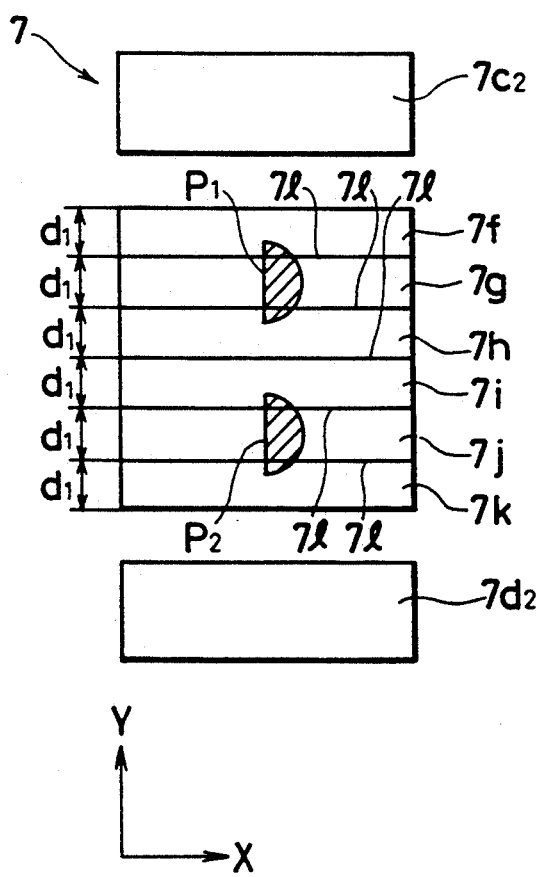
FIG. 7 and FIG. 8 are views illustrating a third embodiment of the present invention.
Figure 8:
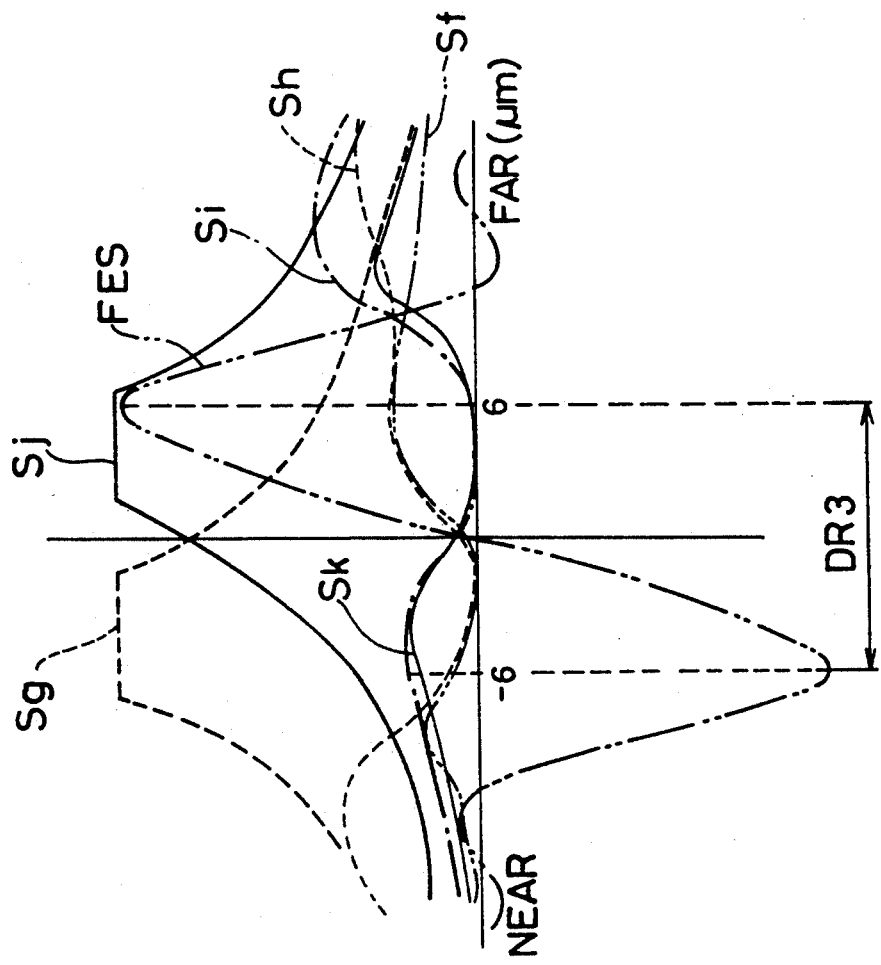

Now reference is made to FIGS. 7 and 8 for explaining a third embodiment of the invention.

The photodetector 7 of this embodiment is comprised of six photo-detecting parts 7f to 7k (these photo-detecting parts constitute a main photo-detecting section) and photo-detecting parts $7c_2$ and $7d_2$ (these photo-detecting parts constitute a sub photo-detecting section) which are a predetermined distance apart from the photo-detecting parts 7f and 7k respectively in the track direction Y. As shown in FIG. 7, these photo-detecting parts 7f to 7k respectively have a rectangular shape whose long sides are substantially parallel to the diffracting direction X of the second diffraction grating element 3. The width $d_1$ of each of the photo-detecting parts 7f to 7k is set to 25 μm like the foregoing embodiments. The five parting lines 71, which define the borders of the six photo-detecting parts 7f to 7k along the diffracting direction X, are respectively set to be 5 μm in width like the first embodiment. The optical head device 10 in this embodiment is designed to have the same constants as those shown in Table 2. In the second diffraction grating element 3, the grating lines 3d and 3e respectively have a predetermined orientation and a predetermined pitch. When focusing is performed with accuracy, the semi-circular spot $P_1$ formed by the main first order diffracted light in the the first diffraction grating 3a is virtually positioned on the photo-detecting part 7g while the semi-circular spot $P_2$ formed by the main first order diffracted light in the second diffraction grating 3b is virtually positioned on the photo-detecting part 7k, and the spots $P_1$ and $P_2$ are of equal size. Further, when focusing is accurately performed, like the foregoing embodiment, the focal point $f_1$ is positioned before the photodetector 7, the focal point $f_2$ is positioned behind the photodetector 7, and the photodetector 7 is located substantially in a mid-position between the focal points $f_1$ and $f_2$. Each diameter of the spots $P_1$ and $P_2$ is 40 μm at the time of accurate focusing.

Assuming that the output signals of the photo-detecting parts $7c_2$ and $7d_2$ are represented by $Sc_2$ and $Sd_2$ respectively and the output signals of the photo-detecting parts 7f to 7k are represented by Sf to Sk respectively, the recorded data signal RS is give by: RS $=Sf+Sg+Sh+Si+Sj+Sk$, the focusing error signal FES is given by: FES$=(Sf+Sh+Sj)-(Sg+Si+Sk)$, and the tracking error signal RES is given by: RES$=Sc_2-Sd_2$. In the above arrangement, when the objective lens 5 is moved in the optical axis $L_1$ in relation to the recording medium 6, the output signals Sf to Sk vary as indicated by the curved lines Sf to Sk of FIG. 8 respectively and the focusing error signal FES varies as indicated by the curved line FES. In this embodiment, a dynamic range DR3 for the detection of focusing errors is $-6$ μm to $+6$ μm. Since the focusing error signal FES has high strength and abruptly varies, the focusing control during operation can be more accurately performed than the first and second embodiments.

Figure 9:
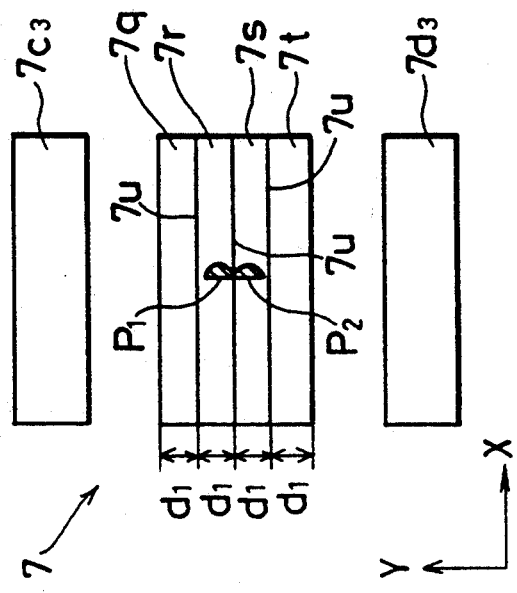

The following description describes a fourth embodiment wherein a main photo-detecting section of the photodetector 7 is divided by three parting lines 7u substantially along the diffracting direction X, into four photo-detecting parts 7q to 7t as shown in FIG. 9. Photo-detecting parts $7c_3$ and $7d_3$, which constitute a sub photo-detecting section, are positioned a predetermined distance away from the photo-detecting parts 7q and 7t respectively, substantially in the track direction Y. The optical head device 10 of this embodiment is designed to have the same constants as listed in Table 1.

Figure 10:
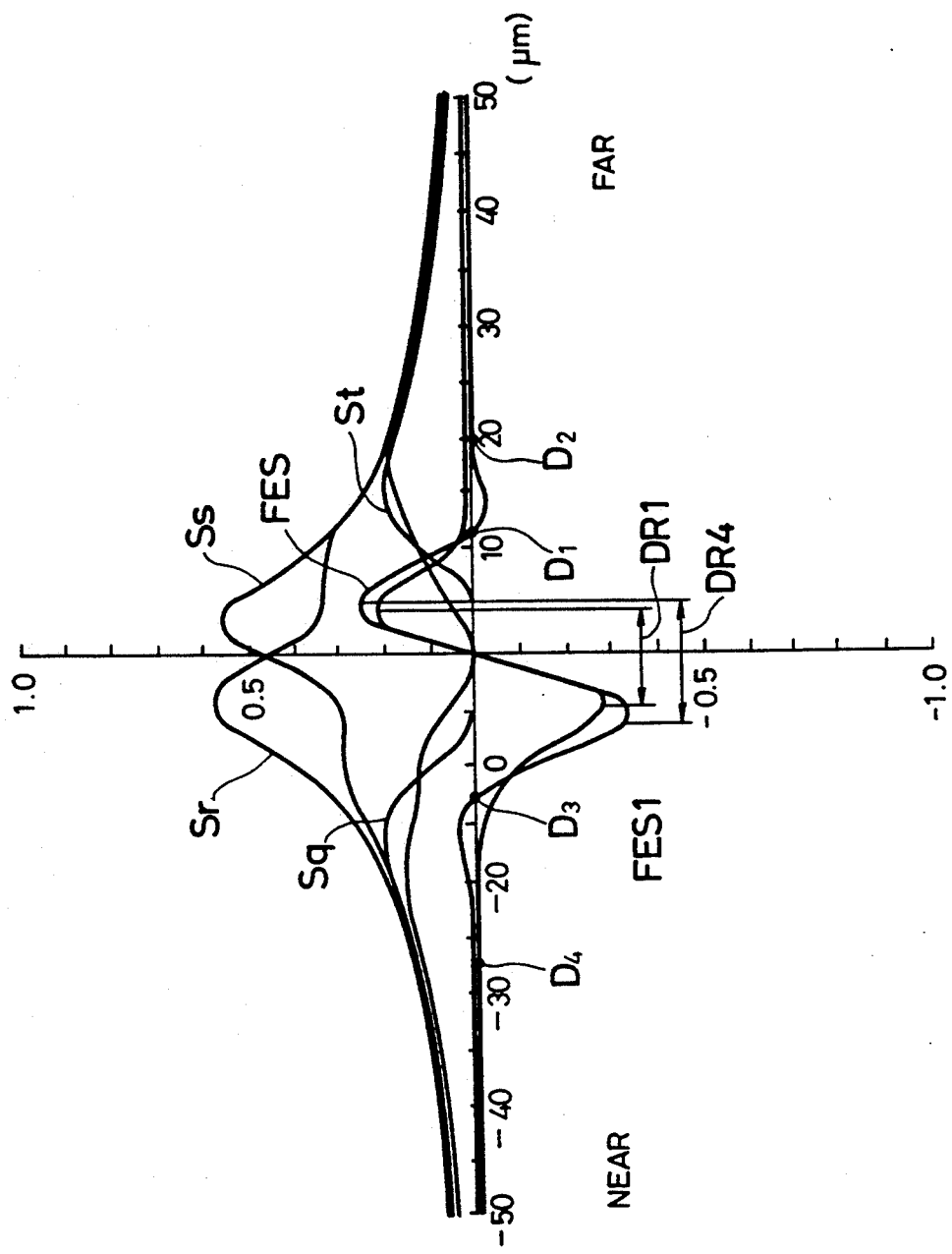

In the above arrangement, when the objective lens 5 is moved along the direction of the optical axis $L_1$ in relation to the recording medium 6, output signals Sq to St from the photo-detecting parts 7q to 7t vary as indicated by the curved lines Sq to St of FIG. 10 respectively. The focusing error signal FES vary as indicated by the curved line FES. This focusing error signal FES is given by: FES$=(Sq+Ss)-(Sr+St)$. The curved line FES1 indicates the transition of the focusing error signal FES in the first embodiment. In this embodiment, a dynamic range DR4 for the detection of focusing errors is $-6$ μm to $+5$ μm which is wider than that of the first embodiment.

When a focusing error occurs, focusing control is carried out such that: when the value of the focusing error signal FES is plus, the objective lens 5 is moved close to the recording medium 6, and when the value of the focusing error signal FES is minus, the objective lens 5 is moved away from the recording medium 6, so that the focusing error signal FES becomes "0". In order to accurately perform the focusing control, it is required that the focusing error signal FES always has a plus value in "FAR region" of FIG. 10, and always has a minus value in "NEAR region". The fact of the matter is, however, that the value of the focusing error signal FES is turned to be minus from a plus state in the zone between the points $D_1$ and $D_2$ in "FAR region", and turned to be plus from a minus state in the zone between the points $D_3$ to $D_4$ in "NEAR region". To be more concrete, when the displacement amount of the objective lens 5 from the optimum position relative to the recording medium 6 takes a value in the zone between the points $D_1$ and $D_2$ or between the points $D_3$ and $D_4$, there is a likelihood that the adjustment of a focusing error cannot be accurately performed. Practically, the objective lens 5 scarcely approaches the recording medium 6 to such an extent that the displacement amount takes the value of the point $D_3$, and therefore the fact that the focusing error signal FES is turned to be plus in "NEAR region" does not affect the focusing control. In the case of using an optical disk as the recording medium 6, there is, however, a likelihood that the displacement amount takes a value in the zone between the points $D_1$ and $D_2$. Because, when such a recording medium 6 is loaded in a reproducing apparatus, the objective lens 5 is once drawn apart from the recording medium 6 a great deal and then moved closely to the optimum position after the loading. In this case, the value of the focusing error signal becomes minus and therefore it is impossible to move the objective lens 5 to the optimum position after loading the recording medium 6. Consequently, some arrangements are required in order to prevent the inversion of the polarity of the focusing error signal FES at least in "FAR region" (the same phenomenon is seen in the focusing error signal FES when the photodetector 7, wherein the main photo-detecting section shown in FIG. 7 is divided into six parts, is employed (see FIG. 8)).

We have researched the the causes of the inversion of the polarity of the focusing error signal FES in the zone between the points $D_1$ and $D_2$, and obtained the following results. FIG. 11 is an illustration diagrammatically depicting changes in the spots $P_1$ and $P_2$ formed on the photodetector 7, when the objective lens 5 is getting far from the recording medium 6. FIG. 11(a) shows the spots $P_1$ and $P_2$ when focusing is accurately performed. As the objective lens 5 becomes far from the recording medium 6, the spot $P_1$ gradually becomes large while the spot $P_2$ becomes small as shown in FIGS. 11(b) and 11(c). When the objective lens 5 becomes farther from the recording medium 6, the orientation of the spot $P_2$ is inverted as shown in FIG. 11(d) because the focal point $f_2$ of the main first order diffracted light in the second diffraction grating 3b is moved from the backside of the photodetector 7 to the front thereof. When the objective lens 5 becomes much farther from the recording medium 6, a part of the spot $P_1$ gets out of the photo-detecting part 7q as shown in FIG. 11(e). This causes the strength of the output signal Sq from the photo-detecting section 7q to be reduced. This fact is apparent from FIG. 10 in which the value of the output signal Sq is lower than that of the output signal St, in the zone between the points $D_1$ and $D_2$. As a result, in the equation $FES=(Sq+Ss)-(Sr+St)$, the numerical value of the first term $(Sq+Ss)$ is smaller than that of the second term $(Sr+St)$ and thus the polarity of the focusing error signal FES is turned from plus to minus. In the case the objective lens 5 approaches the recording medium 6 excessively, the spots $P_1$ and $P_2$ are respectively varied in the opposite manner to the foregoing, resulting in the change of the polarity of the focusing error signal FES from minus to plus.

The following description discloses an embodiment in which the photodetector 7 having a multi-divided main photo-detecting section is employed and the polarity of the focusing error signal FES is not inverted at least in "FAR region".

Figure 12C:
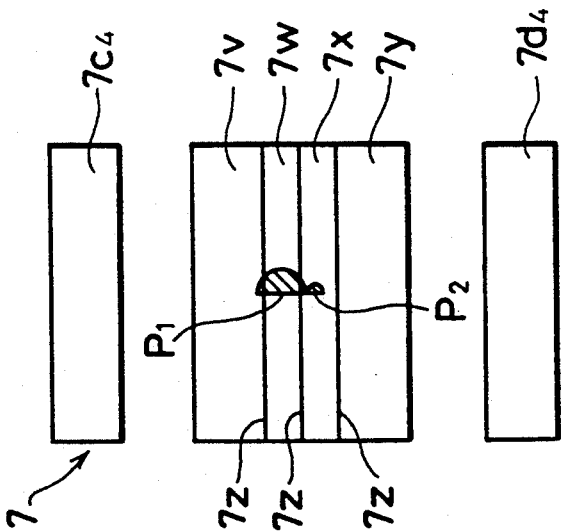
Figure 12B:
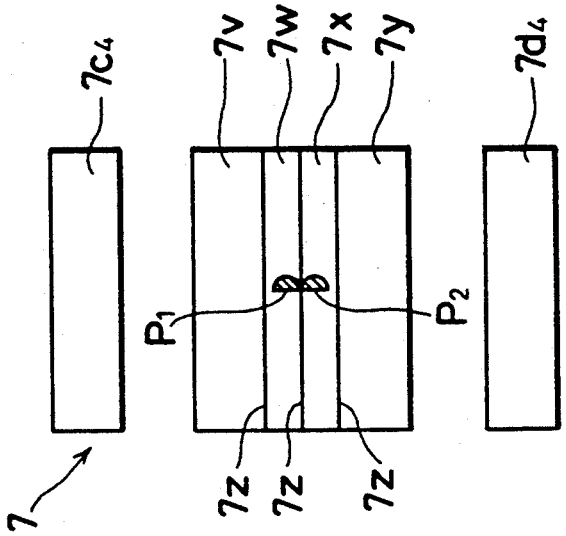
Figure 12A:
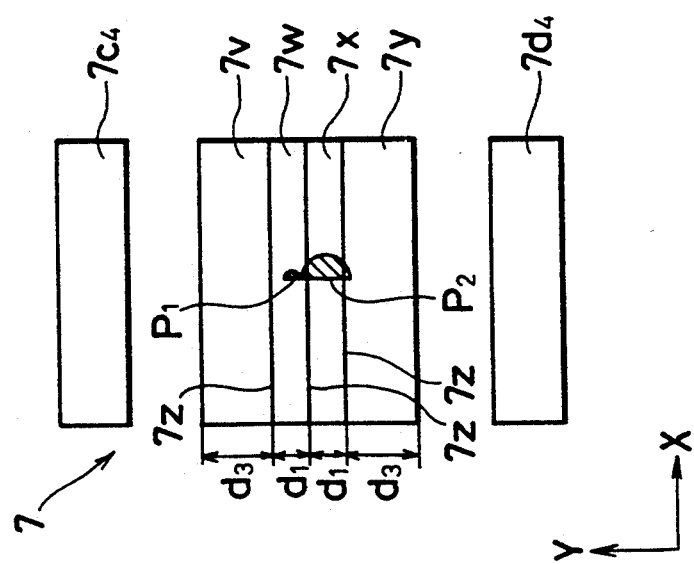

As shown in FIGS. 12(a)-(c), the photodetector 7 of a fifth embodiment has a main photo-detecting section divided by three parting lines 7z into four photo-detecting parts 7v to 7y, the parting lines 7z being substantially parallel with the diffracting direction X. Photo-detecting parts $7c_4$ and $7d_4$, which constitute a sub photo-detecting section, are positioned a predetermined distance from the photo-detecting parts 7v and 7y respectively, substantially along the track direction Y. The photo-detecting part 7v is located at one end of the main photo-detecting section and the photo-detecting part 7y at the other end thereof so that the photo-detecting parts 7w and 7x are located between the photo-detecting parts 7v and 7y. The width $d_3$ of each of the photo-detecting parts 7v and 7y is considerably wider than the width $d_1$ of each of the photo-detecting parts 7w and 7x. Concretely, the width $d_3$ is e.g. 100 μm and the width $d_1$ is about one forth of the former, i.e., 25 μm. The width of the parting line 7z is set to e.g. approx. 5 μm. The optical head device 10 having the above photodetector 7 is designed to have the constants listed in Table 1.

In the foregoing arrangement, when focusing is accurately performed, the spots $P_1$ and $P_2$ are of the same size as shown in FIG. 12(b) and the diameters thereof are respectively about 20 μm. The spot $P_1$ can be positioned within the photo-detecting part 7w while the spot $P_2$ within the photo-detecting part 7x. When the objective lens 5 approaches the recording medium 6 excessively, causing a focusing error, the focal point $f_1$ is closer to the photodetector 7 and the focal point $f_2$ is farther away from the photodetector 7. Therefore, the spot $P_1$ is reduced in size while the spot $P_2$ is enlarged expanding out of the photo-detecting part 7x such as to penetrate into the adjacent photo-detecting parts 7w and 7y, as shown in FIG. 12(a). On the other hand, when the objective lens 5 becomes far from the recording medium 6 excessively, causing a focusing error, the spot $P_1$ is enlarged to extend to the adjacent photo-detecting parts 7v and 7x, while the spot $P_2$ is constricted. The focusing error signal FES is obtained by: $FES=(Sv+Sx)-(Sw+Sy)$ where Sv to Sy represent the output signals of the photo-detecting parts 7v to 7y.

When the objective lens 5 is moved along the direction of the optical axis $L_1$ in relation to the recording medium 6, the output signals Sv to Sy vary as indicated by the curved lines Sv to Sy of FIG. 13 respectively. The focusing error signal FES varies as indicated by the curved line FES. In this figure, the curved line FES1 indicates the transition of the focusing error signal FES of the first embodiment. As apparent from FIG. 13, in this embodiment wherein the widths of the photo-detecting parts 7v and 7y each of which is located at either end of the main photo-detecting section are enlarged, the spots $P_1$ and $P_2$ of this embodiment do not expand out of the photo-detecting parts 7v and 7y, even if the objective lens 5 comes close to or moves far from the recording medium 6 excessively. As a result, the strength of the output signal Sv in "FAR region" and the strength of the output signal Sy in "NEAR region" are prevented from being reduced, and the inversion of the polarity of the focusing error signal FES in both regions is thus avoided. Therefore, even if the objective lens 5 is drawn apart from the recording medium 6 a great deal at the time of loading the recording medium 6 in a reproducing apparatus, this does not affect the focusing control after the loading. A dynamic range DR5 for detecting focusing errors in this embodiment is $-6$ μm to $+6$ μm, which is wider than the dynamic range DR1 of the first embodiment.

In the foregoing embodiment, the arrangement is made such that the widths $d_3$ of the photo-detecting parts 7v and 7y each of which is located at either end of the main photo-detecting section, are wider than the widths $d_1$ of the other photo-detecting parts 7w and 7x. However, the invention is not limited to the above. For example, only the width $d_3$ of the photo-detecting part 7y may be made wider than widths $d_1$ of the other photo-detecting parts 7v to 7x. The photo-detecting part 7y is located at either end of the main photo-detecting section and the function thereof is concerned with the inversion of the polarity of the focusing error signal FES in "FAR region". With the above arrangement, the inversion of the polarity of the focusing error signal FES can be prevented at least in "FAR region", so that the adjustment of a focusing error can be smoothly and appropriately performed.

The following description discloses an embodiment in which the photodetector 7 (having a main photo-detecting section comprised of the photo-detecting parts 7q to 7t of the same width $d_1$) shown in FIG. 9 is employed and the inversion of the polarity of the focusing error signal FES is prevented.

In a sixth embodiment, of the photo-detecting parts 7q and 7t each of which is located at either end of the main photo-detecting section, at least the photosensitivity of the photo-detecting part 7t is designed to be lower than those of the other photo-detecting parts 7q to 7s, by employing photosensitivity adjusting means (not shown). More specifically, the output signals Sq to St of the photo-detecting parts 7q to 7t are respectively amplified and the amplification factor for the output signal St of the photo-detecting part 7t is set lower than those for the output signals Sq to Ss of the photo-detecting parts 7q to 7s. The optical head device 10 is designed to have the constants listed in Table 1. The width $d_1$ of each of the photo-detecting parts 7q to 7t is 25 μm. The widths of the parting lines 7u are respectively 5 μm, and the amplification factor for the output signal St is 0.7 times those of the output signals Sq to Ss. When focusing is performed with accuracy, the diameters of the spots $P_1$ and $P_2$ are respectively 20 μm.

In the foregoing arrangement, when the objective lens 5 is moved along the optical axis $L_1$ in relation to the recording medium 6, the focusing error signal FES varies as indicated by the curved line FES of FIG. 14. When the output signals Sq to St of the photo-detecting parts 7q to 7t are amplified with a specified amplification factor $\epsilon$, the focusing error signal FES is obtained by: FES=$\epsilon \times$(Sq+Ss)−$\epsilon$(Sr+0.7×St). In FIG. 14, the curved line St' indicates the output signal obtained by: $\epsilon \times$(0.7×St) and the curved lines Sq to Ss indicate the output signals Sq to Ss which are respectively amplified with the amplification factor $\epsilon$. The curved line FES 1 indicates the transition of the focusing error signal FES of the first embodiment.

The output of the photo-detecting part 7t is controlled in order that the value of the focusing error signal FES in "FAR region" is not turned to be minus from a plus-state as indicated by the curved line FES of FIG. 14, by setting the photosensitivity of the photo-detecting part 7t to be lower than those of the photo-detecting parts 7q to 7s.

As a result, even if the objective lens 5 is moved far from the recording medium 6 at the time of loading the recording medium 6, this does not affect the focusing control afterward. The polarity of the focusing error signal FES is inverted after the point D in "NEAR region" in FIG. 14, but this does not affect the focusing control since the objective lens 5 does not approach the recording medium 6, in reality, such an extent that the focusing error signal FES is close to the point D. In this embodiment, a dynamic range DR6 for detecting a focusing error is −6 μm to 5 μm which is wider than the dynamic range DR1 of the first embodiment.

In the above embodiment, the photosensitivity of the photo-detecting part 7t is reduced, but the invention is not limited to this. For example, the same effect can be obtained by the arrangement in which the photo-detecting section 7q located at the other end of the main photo-detecting section has a higher photosensitivity than those of photo-detecting sections 7r to 7t.

In the embodiments that have been described above, the photo-detecting parts of the photo-detecting means are juxtaposed only in a direction substantially orthogonal to the average diffracting direction of the diffraction grating element and there are not a plurality of photo-detecting parts aligned in the average diffracting direction. With such an arrangement, the area occupied by the photo-detecting means is reduced, so that not only can the optical head device be manufactured in a compact size but also the production cost can be reduced.

Further, the orientation of the grating lines and the grating pitch in each of the first and second diffraction gratings of the diffraction grating element are designed such that the spots formed on the photo-detecting means by the main first order diffracted lights produced in the first and second diffraction gratings are juxtaposed substantially in a direction orthogonal to the average diffracting direction; and the diffraction angles of the first and second diffraction gratings are approximately equal. With the above arrangement, when the grooves of the first and second diffraction gratings are processed so as to have a serrated profile, the cross sections of the first and second diffraction gratings can be substantially identical. As a result, the processing of the diffraction grating element can be carried out smoothly and a high and substantially uniform optical utilization efficiency can be obtained for the diffraction grating element. Furthermore, the photo-detecting means is placed substantially at a mid-position between the focal points of the respective main first order diffracted lights produced in the first and second diffraction gratings. This enables spots formed on the main photo-detecting section at the time of accurate focusing to have the same size, or enables a pair of spots formed on the sub photo-detecting section at the time of accurate focusing to have the same size. Thanks to the fact that the optical utilization efficiency of the diffraction grating element is substantially uniform, the light amounts of the respective spots received by the main photo-detecting section are equalized and the light amounts of the respective spots received by the sum photo-detecting section are equalized. The accuracy of the detection of the focusing error signals and the tracking error signals is thus highly improved. Further, in case there occurs a variation in the wavelength of the emitted light from the light source, each spot will be displaced in the lengthwise direction of each photo-detecting part. That is, each photo-detecting part always corresponds to a spot received thereat as the photo-detecting parts are juxtaposed only in a direction substantially orthogonal to the average diffracting direction. Consequently, offset is not generated in the focusing error signals and tracking error signals so that accurate focusing and tracking control can be performed at all times.

Now reference is made to FIGS. 15(a)–(c) to 19 for explaining a seventh embodiment of the invention. For simplicity, those members functioning similarly to the members in the foregoing embodiments are represented by the same reference numerals and the description thereof is omitted. Like the above-described optical head device 10, an optical head device 20 of the seventh embodiment is used as a reproducing device for ROM-type optical disks such as compact disks and video disks.

Figure 17:
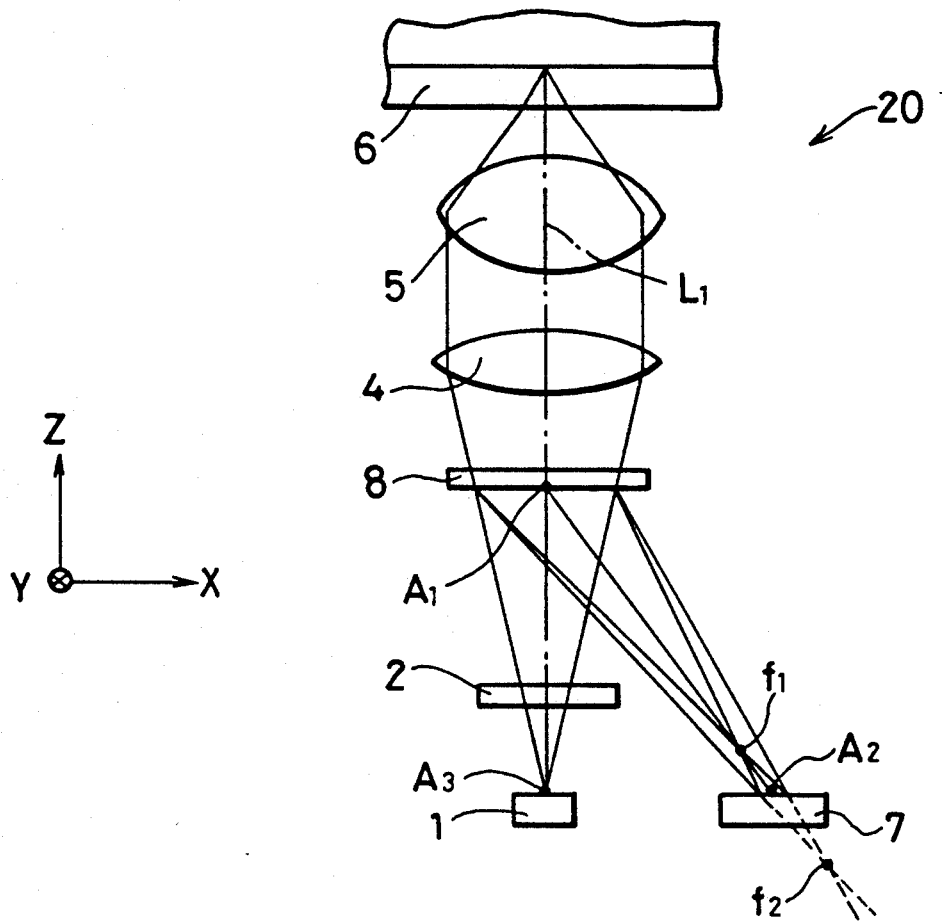
FIG. 17 is a schematic front view of another optical head device.
Figure 18:
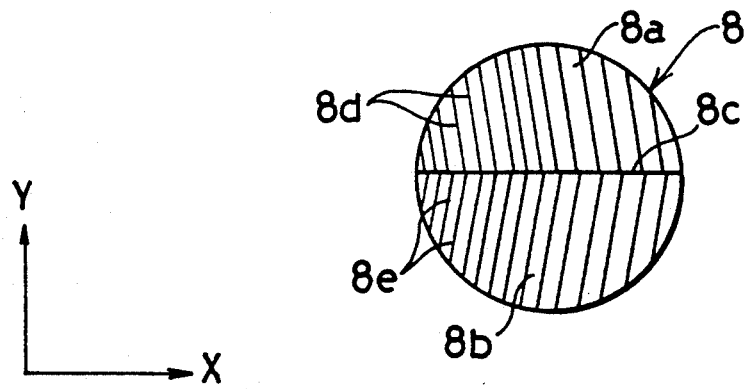
FIG. 18 is a schematic plan view of another second diffraction grating element as seen from a recording medium side.

As shown in FIGS. 17 and 18, the optical head device 20 differs from the optical head device 10 in that the orientation of a join line 8c of a second diffraction grating element 8 in the optical head device 20 is made parallel to the diffracting direction X that is the average diffracting direction of the second diffraction grating element 8.

As shown in FIGS. 15(a)–(c), the main photo-detecting section of the photodetector 7 is divided into three photo-detecting parts 7m to 7o by two parting lines 7p that are substantially parallel to the diffracting direction X. Photo-detecting parts $7c_5$ and $7d_5$, that constitute a sub photo-detecting section, are positioned a predetermined distance away from the photo-detecting parts 7m and 7o respectively, substantially along the track direction Y.

As shown in FIG. 18, the second diffraction grating element 8 is comprised of first and second diffraction gratings 8a and 8b which have grating lines 8d and 8e respectively. The orientation and pitch of each of the grating lines 8d and 8e are determined depending on the relative positions of the second diffraction grating element 8, the emitting point $A_3$ of the semiconductor laser 1 and the focal point on the photodetector 7. Each grating pitch is gradually varied in accordance with the above relative positions. The orientations of the grating lines 8d and 8e are substantially parallel to a direction orthogonal to the diffracting direction X. In this embodiment, when focusing is accurately performed, the focal point $f_1$ of the main first diffracted light produced in the first diffraction grating 8a is positioned before the photodetector 7, while the focal point $f_2$ of the main first order diffracted light produced in the second diffraction grating 8b is positioned behind the photodetector 7, as shown in FIG. 17, and the photodetector 7 is located at a mid-position between the focal points $f_1$ and $f_2$. With this arrangement, when focusing is performed with accuracy, the semi-circular spots $P_1$ and $P_2$ are positioned on the photo-detecting parts 7n and 7o respectively such that the upper ends of the spots $P_1$ and $P_2$ (i.e., the chord of the semi-circular configuration of each spot) respectively overlap the corresponding parting line 7p, and the spots $P_1$ and $P_2$ are of the same size, as shown in FIG. 15(b). The pair of sub first order diffracted lights produced in the second diffraction grating element 8 are converged on the photo-detecting parts $7c_5$ and $7d_5$ respectively. The difference between the average pitch of the first diffraction grating 8a and that of the second diffraction grating 8b can be made smaller than the difference between the average pitch of the first diffraction grating 3a and that of the second diffraction grating 3b (these diffraction gratings 3a and 3b have been mentioned before). This allows the second diffraction grating element 8 to have a more uniform optical utilization efficiency, facilitating the processing of the second diffraction grating element 8 still further.

Table 3 shows the constants in one concrete example of the optical head device 20 of this embodiment.

This embodiment is the same as the foregoing embodiments as to the numerical apertures (NA) and focal distances of the collimating lens 4 and the objective lens 5. Also, this embodiment has the same design factors as those of the foregoing embodiments in the following points: the optical distance between the optical axis point $A_1$ of the second diffraction grating element 8 and the emitting point $A_3$ of the semiconductor laser 1; and the optical distance between the emitting point $A_3$ and the middle point $A_2$ between the spots $P_1$ and $P_2$, these spots $P_1$ and $P_2$ being formed on the photodetector 7 when focusing is accurately performed. (see Tables 1 and 2). The optical axis point $A_1$, focal points $f_1$ and $f_2$, and middle point $A_2$ exist in the same plane which includes the optical axis of the first diffracted light of the beam passing through the center of the second diffraction grating element 8.

TABLE 3

| OPTICAL DISTANCE BETWEEN EACH POINT (mm) | |
| --- | --- |
| OPTICAL AXIS POINT $A_1$/EMITTING POINT $A_3$ | 2.727 |
| EMITTING POINT $A_3$/MIDDLE POINT $A_2$ | 1.3 |
| OPTICAL AXIS POINT $A_1$/FOCAL POINT $f_1$ | 2.9466 |
| OPTICAL AXIS POINT $A_1$/MIDDLE POINT $A_2$ | 3.0211 |
| OPTICAL AXIS POINT $A_1$/FOCAL POINT $f_2$ | 3.0995 |
| OPTICAL PROPERTIES OF LENSES | |

TABLE 3-continued

| | NUMERICAL APERATURE (NA) | FOCAL DISTANCE (mm) |
| --- | --- | --- |
| COLLIMATING LENS 4 | 0.145 | 18.0 |
| OBJECTIVE LENS 5 | 0.5 | 4.5 |

| COORDINATES OF EACH POINT (μm) |
| --- |
| $A_1$: (0, 0, 0) |
| $A_2$: (1300.0, 0.0, −2727.0) |
| $A_3$: (0, 0, −2727.0) |
| $f_1$: (1267.9, 29.3, −2727.0) |
| $f_2$: (1333.7, −30.8, −2797.8) |

The widths $d_1$ of the photo-detecting parts 7m to 7o in the photodetector 7 are respectively 25 μm and the widths of the parting lines 7p are respectively 5 μm. The diameters of the spots $P_1$ and $P_2$ are respectively 20 μm when focusing is accurately performed.

In the foregoing arrangement, when the objective lens 5 excessively approaches the recording medium 6, causing a focusing error, the focal point $f_1$ is closer to the photodetector 7 while the focal point $f_2$ is farther from the photodetector 7. Therefore, the spot $P_1$ becomes small and the spot $P_2$ is enlarged as shown in FIG. 15(a). In this case, despite the fact that the spots $P_1$ and $P_2$ respectively have a uniform light amount irrespective of their sizes, the received light amount at the photo-detecting part 7o is greater than that at the photo-detecting part 7n on the following grounds. The parting lines 7p in the photodetector 7 respectively have a width $d_4$ of e.g. 5 μm as shown in FIG. 16, so that the photosensitivity is lost or extremely attenuated on the parting lines 7p. Since the upper end of the spots $P_1$ and $P_2$ are respectively positioned on the center of the corresponding parting line 7p, when the spots $P_1$ and $P_2$ are in the condition shown in FIG. 16 (this condition is the same as that shown in FIG. 15(a)), the portion of the spot $P_2$ which overlaps the parting line 7p is small, compared with the portion of the spot $P_1$ which overlaps the parting line 7p. In other words, the area ratio of the overlapping portion to the non-overlapping portion in the spot $P_2$ is lower than that in the spot $P_1$. As a result, the received light amount at the photo-detecting part 7o is greater than that at the photo-detecting part 7n. On the contrary, when the objective lens 5 moves farther away from the recording medium 6, causing a focusing error, the spot $P_1$ is enlarged while the spot $P_2$ becomes small as shown in FIG. 15(c). In this case, the received light amount at the photo-detecting part 7n is greater than the received light amount at the photo-detecting part 7o for the reason same as above.

In this embodiment, the focusing error signal FES is given by: FES=Sn−(Sm+So) and the recorded data signal RS is given by: RS=Sm+Sn+So, where Sm to So represent the output signals of the photo-detecting parts 7m to 7o respectively. The tracking error signal RES is given by: RES=$Sc_5$−$Sd_5$ where $Sc_5$ and $Sd_5$ represent the output signals of the photo-detecting parts $7c_5$ and $7d_5$ respectively.

Figure 19:
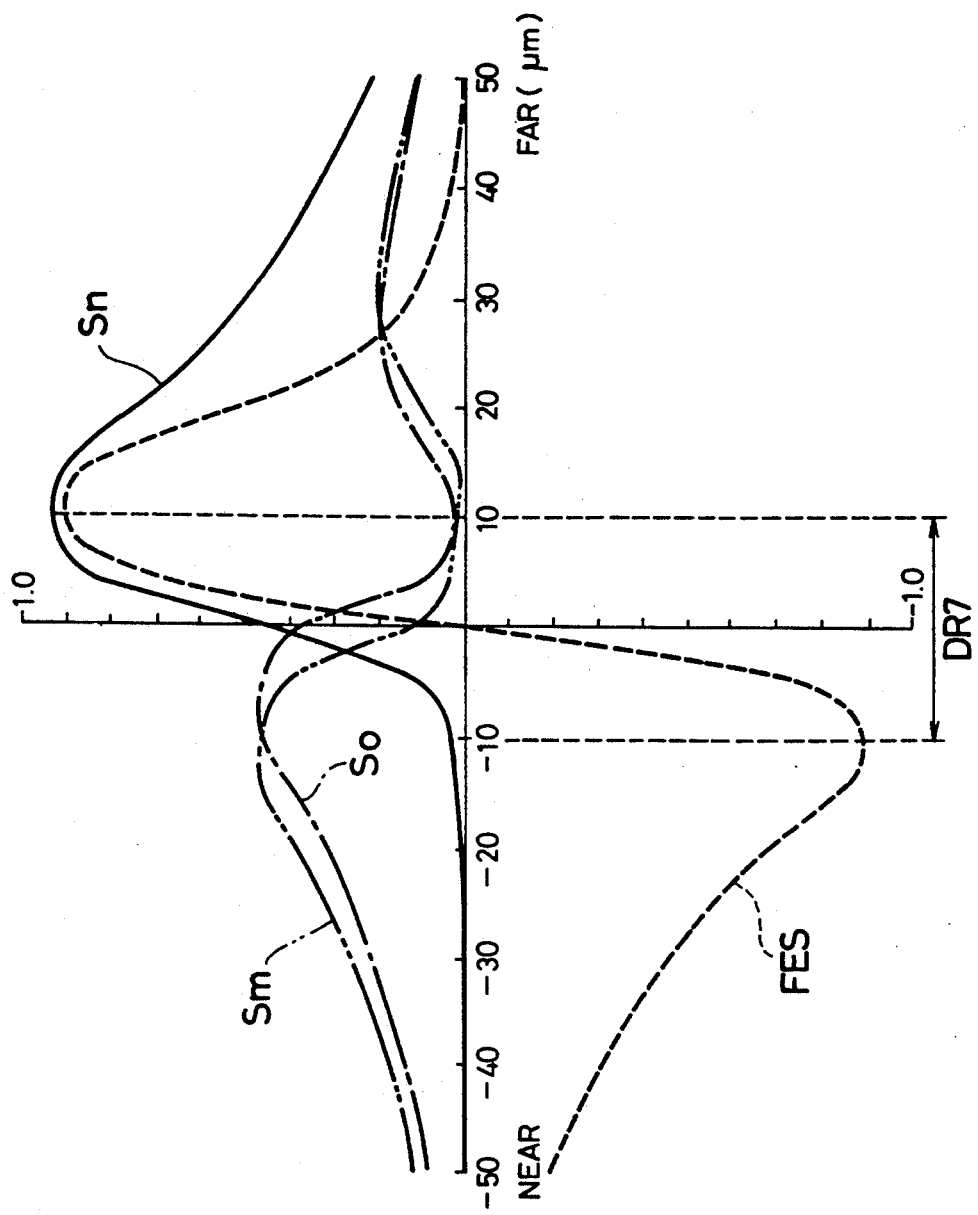

When the objective lens 5 is moved along the direction of the optical axis $L_1$ in relation to the recording medium 6, the output signals Sm to So vary as indicated by the curved lines Sm to So of FIG. 19, and the focusing error signal FES varies as indicated by the line FES of the same. In this embodiment, a dynamic range DR7 for detecting focusing errors is $-10$ μm to $+11$ μm. With the optical head device 20, effects similar to those of the optical head device 10 can be obtained.

The following description describes an eighth embodiment wherein precise tracking control can be performed at the time of recording, in the case the photodetector 7 shown in FIG. 7 is adapted to the optical head device 10 shown in FIG. 2 and an optical write-once disk is used as the recording medium 6.

Figure 20:
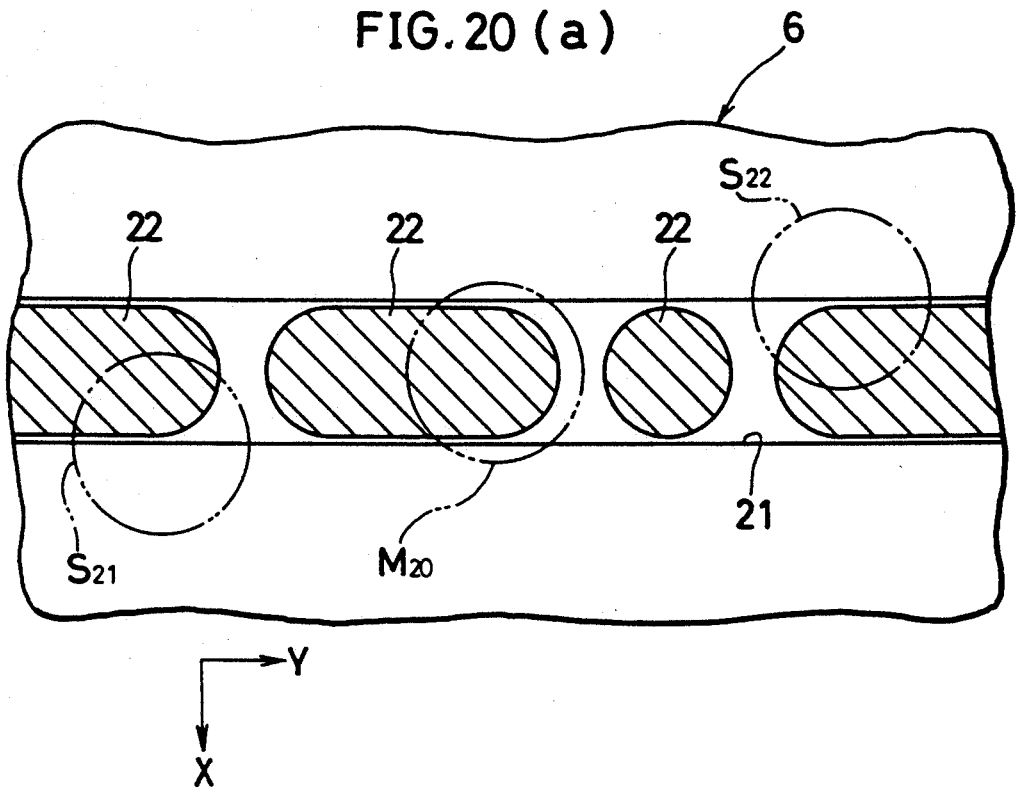
FIG. 20(a) and FIG. 20(b) are enlarged partial plane views illustrating an eighth embodiment of the present invention.
Figure 20:
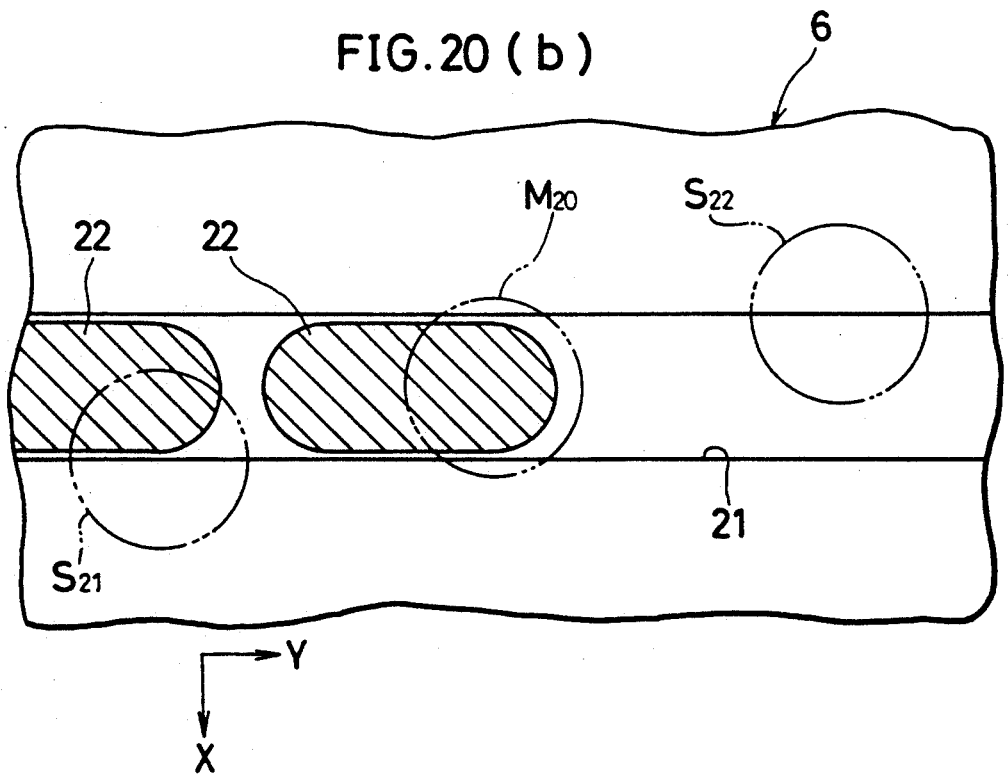
Figure 21:
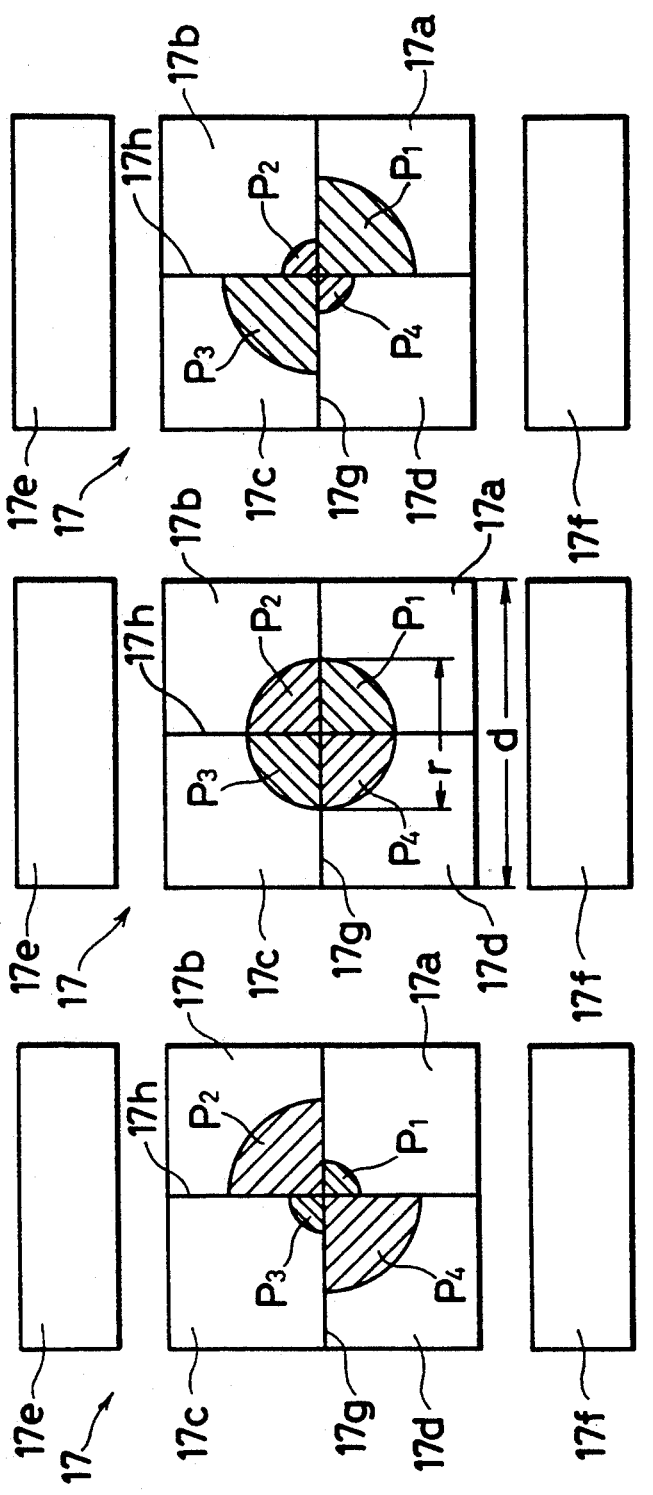
FIGS. 21(a)-(c) to FIG. 26 illustrate a ninth embodiment of the present invention.

The recording medium 6 in this embodiment is an optical write-once disk comprised of at least the substrate 6a and the recording layer 6b made of materials of Te series, organic pigment series or the like, as shown in FIG. 2. The recording medium 6 has as shown in FIGS. 20(a)-(b) a spiral track 21 (or convoluted tracks 21) which is performed in the form of guide grooves. At the time of the write operation, pits 22 are formed on the recording layer 6b by a main beam $M_{20}$. In an optical write-once disk, the data once recorded in the form of the pits 22 cannot be erased. At the time of the read operation, the pits 22 are read by the main beam $M_{20}$. When the write or read operation is performed, a pair of sub beams $S_{21}$ and $S_{22}$ are converged such that the focal points of the sub beams $S_{21}$ and $S_{22}$ oppositely deviate from the focal point of the main beam $M_{20}$ in the track direction Y (parallel to the track 21 of the optical disk 6) to a comparatively great extent, and oppositely deviate from the same slightly in the diffracting direction X (parallel to the radial direction of the optical disk 6).

When reading the pit 22 shown in FIG. 20(a), the three beam method is employed like the foregoing embodiment, in which the tracking error signal RES is obtained based on the pair of sub beams $S_{21}$ and $S_{22}$ upon receipt of an instruction released from control means composed of a servo signal processing system (not shown). More concretely, the output signals $Sc_2$ and $Sd_2$ of the photo-detecting parts $7c_2$ and $7d_2$ (shown in FIG. 7) are obtained; the tracking error signal RES is obtained by the equation $RES = Sc_2 - Sd_2$; and a tracking control is performed in order that the tracking error signal RES becomes "0". On the other hand, when recording data in the form of the pit 22 shown in FIG. 20(b), the output signals Sf to Sk of the photo-detecting parts 7f to 7k are obtained; and the tracking error signal RES is obtained by the equation $RES = (Sf + Sg + Sh) - (Si + Sj + Sk)$, thereby a tracking control is performed such that the tracking error signal becomes "0". In order to obtain the tracking error signal RES with the push-pull method in write operation, the join line 3c of the second diffraction grating element 3 is required to be parallel to the track direction Y of the recording medium 6.

Like the foregoing case, the focusing error signal FES is obtained by the equation: $FES = (Sf + Sh + Sj) - (Sg + Si + Sk)$ in both write and read operations, and a focusing control is performed such that the focusing error signal FES becomes "0". In this embodiment, when write operation is performed, the focusing error signal FES and the tracking error signal RES in the write operation are thus obtained by the different equations upon receipt of an instruction from the control means, and therefore crosstalk to be generated between the focusing error signal FES and the tracking error signal RES can be effectively reduced at the time of the write operation. In order to most effectively reduce the generation of crosstalk at the time of write operation, the relation between the widths $d_1$ of the photo-detecting parts 7f to 7k and the size of the spot $P_1$ (or $P_2$) may be determined such that the following equations are applied when focusing is accurately performed: $Sg = Sf + Sh$; and $Sj = Si + Sk$.

In the above description, data is recorded in the form of the pits 22, but the invention is not limited to this. For example, data may be recorded in a binary code by partially changing the reflective factor of the recording layer 6b. The optical head device 10 of this embodiment is mainly used for reading and writing data in and from an optical write-once disk (recording medium 6), but it is also possible to arrange the structure of the device 10 so as to be used for read operation on a ROM-type disk and read and write operations on a rewritable disk such as a magneto-optical disk.

Now reference is made to FIGS. 21(a)-(c) to 26 for explaining a ninth embodiment of the invention.

Figure 22:
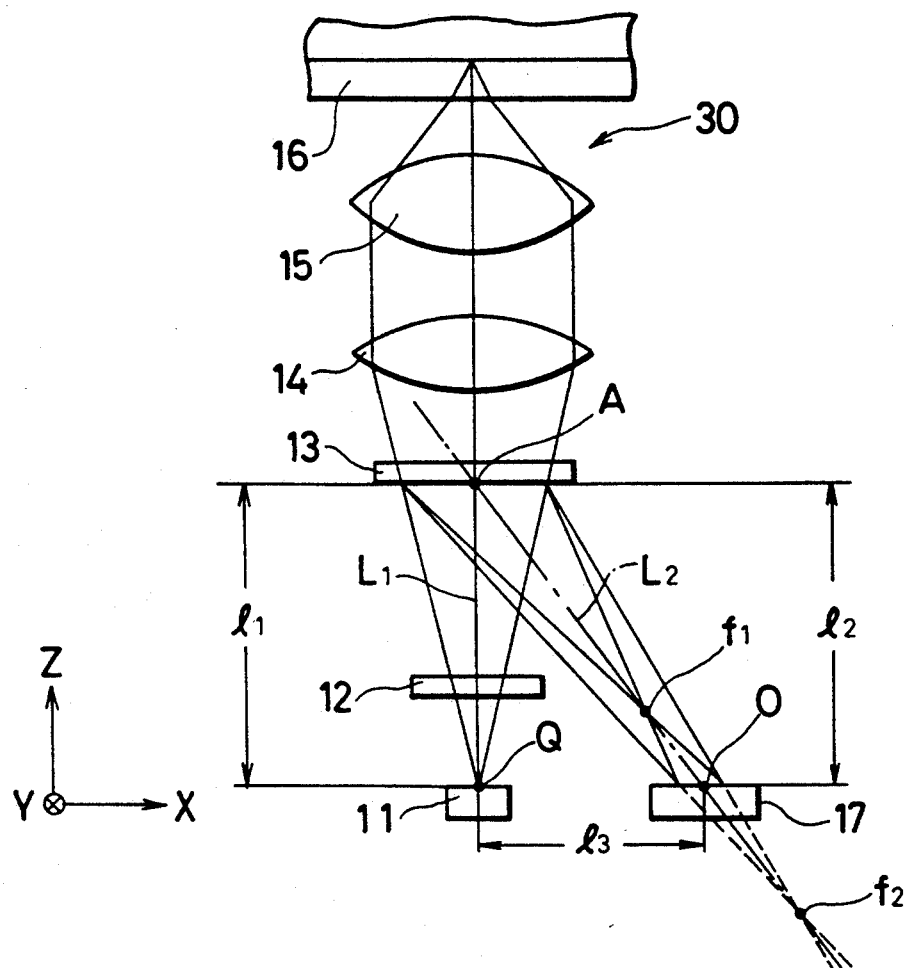
FIG. 22 is a schematic front view illustrating another optical head device.

According to the invention, an optical head device 30 used as a reproducing device for ROM-type optical disks 27 such as compact disks and video disks is, as shown in FIG. 22, comprised of components which function similarly to the components in the optical head devices 10 and 20 in the foregoing embodiments. To be concrete, a semiconductor laser 11 of the optical head device 30 corresponds to the semiconductor laser 1 of the optical head device 10 or 20. Likewise, a first diffraction grating element 12 corresponds to the first diffraction grating element 2; a second diffraction grating element 13 corresponds to the second diffraction grating element 3 or 8; a collimating lens 14 corresponds to the collimating lens 4; an objective lens 15 corresponds to the objective lens 5; and a photodetector 17 corresponds to the photodetector 7.

The second diffraction grating element 13 of the optical head device 30, however, differs from the second diffraction grating element 3 in that the former is comprised of four diffraction gratings. In accordance with this, the structure of the main photo-detecting section of the photodetector 17 and the design factors in the optical head device 30 differ from those in the optical head devices 10 and 20.

As shown in FIGS. 21(a)-(c), a main photo-detecting section of the photodetector 17 is divided into four square photo-detecting parts 17a to 17d by parting lines 17g and 17h. The parting line 17g extends substantially in the diffracting direction X which is the average diffracting direction of the second diffraction grating element 13 and substantially orthogonal to the track direction Y of the recording track on which light beam is focused. The parting line 17h extends substantially in the track direction Y of the recording medium 16. The photo-detecting parts 17e and 17f which constitute a sub photo-detecting section are aligned substantially in the track direction Y with the main photo-detecting section between and these photo-detecting parts 17e and 17f are respectively a predetermined distance apart from the main photo-detecting section.

Figure 23:
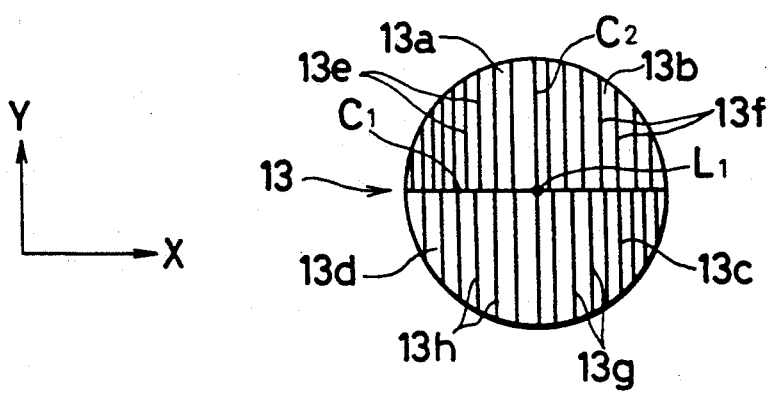
FIG. 23 is schematic plan view illustrating another second diffraction grating element as seen from a recording medium side.

As shown in FIG. 23, the second diffraction grating element 13 is divided into four regions by join lines $C_1$ and $C_2$, and comprised of diffraction gratings 13a to 13d. The join line $C_1$ exits in a plane which is parallel to the diffracting direction X and includes the optical axis $L_1$ (shown in FIG. 2) connecting the emitting point Q of the semiconductor laser 11 to the focal point on the recording medium 16. The join line $C_2$ exists in a plane which is parallel to the track direction Y and includes the optical axis $L_1$. The join lines $C_1$ and $C_2$ accordingly cross at right angles. The direction of the join lines $C_1$ is substantially the same as that of the parting line 17g of the photodetector 17 and the direction of the join line C₂ is substantially the same as that of the parting line 17h.

The diffraction gratings 13a to 13d of the second diffraction grating element 13 have grating lines 13e to 13h respectively. The orientation and pitch of each of the grating lines 13e to 13h are determined depending on the relative positions of the second diffraction grating element 13, the emitting point Q of the semiconductor laser 11, and the focal point formed on the photodetector 17.

Each grating pitch is gradually varied in accordance with the above positions. The grating lines 13e to 13h extend in a direction substantially orthogonal to the diffracting direction X. With the above arrangement, the respective main first order diffracted lights produced in the diffraction gratings 13a to 13d are guided to the photodetector 17. The diffraction gratings 13a and 13c are symmetrical with respect to the optical axis L₁ while the diffraction gratings 13b and 13d are symmetrical with respect to the same. When focusing is accurately performed with the above optical system, causing no focusing error, the main first order diffracted lights in the first pair of diffraction gratings 13a and 13c are converged at the same focal point f₁ located just before the photodetector 17. On the other hand, the main first order diffracted lights produced in the second pair of diffraction gratings 13b and 13d are converged at the same focal point f₂ located at a farther position than the photodetector 17. The above focal points f₁ and f₂ are positioned on an optical axis L₂ of a diffracted light which connects an optical axis point A (the intersection of the optical axis L₁ and the second diffraction grating element 13) to the center O of the photodetector 17 (the intersection of the parting lines 17g and 17h on the photodetector 17).

The photodetector 17 is disposed substantially at a mid-position between the focal points f₁ and f₂ of the main first order diffracted lights at the time of accurate focusing. The pair of sub first order diffracted lights produced in the second diffracted grating element 13 are received by the photo-detecting sections 17e and 17f respectively. In order to differentiate the focal distance of the main first order diffracted lights in the diffraction gratings 13a and 13c from the focal distance of the main first order diffracted lights in the diffraction gratings 13b and 13d, a light-converging property (convex lens effects) is given to the diffraction gratings 13a and 13c while a light-diverging property (concave lens effects) is given to the diffraction gratings 13b and 13d for example.

The method for inscribing the grating lines 13e to 13h is the same as that for the diffracting lines 3d and 3e. With the above arrangement, the grooves formed in the diffraction gratings 13a to 13d have a rectangular profile shown in FIG. 41(a) or a serrated profile shown in FIG. 41(b).

The following description describes the detection of the recorded data signal RS, focusing error signal FES and tracking error signal RES.

The main first order diffracted light in the diffraction grating 13a of the second diffraction grating element 13 is once converged at the focal point f₁ as shown in FIG. 22, and then inverted to form the fan-shaped spot P₁ at the photo-detecting part 17a of the photodetector 17. The main first order diffracted light in the diffraction grating 13c which has a point-symmetrical relationship with the diffraction grating 13a is once converged at the same focal point f₁ as the above, and then inverted to form a fan-shaped spot P₃ at the photo-detecting part 17c which has a point-symmetrical relationship with the photo-detecting part 17a. The main first order diffracted light in the diffraction grating 13b forms the fan-shaped spot P₂ on the photo-detecting part 17b before being converged at the focal point f₂ positioned behind the photodetector 17. The main first order diffracted light in the diffraction grating 13d which has a point-symmetrical relationship with the diffraction grating 13b forms a fan-shaped spot P₄ on the photo-detecting part 17d which has a point-symmetrical relationship with the photo-detecting part 17b, before being converged at the focal point f₂.

When focusing is accurately performed, the photodetector 17 is located substantially at a mid-position between the focal points f₁ and f₂, and therefore the spots P₁ to P₄ are of the same size. Further, since the diffraction gratings 13a to 13d are formed such that the respective spots P₁ to P₄ have a substantially equal light amount, the output signals Sa to Sd of the photo-detecting part 17a to 17d become equal.

When the objective lens 15 excessively approaches the recording medium 16, causing a focusing error, the focal point f₁ is closer to the photodetector 17 while the focal point f₂ is farther away from the photodetector 17. This results in that the spots P₁ and P₃ becomes small and the spots P₂ and P₄ are enlarged. In this case, the light amounts of the respective spots P₁ to P₄ are not varied in accordance with their sizes. The parting lines 17g and 17h practically have a predetermined width (e.g. about 5 μm) as shown in FIG. 24. The two straight-line portions of each of the spots P₁ to P₄ (i.e. the two chords of each of the fan-shaped spots) are positioned at the central parts of the parting lines 17g and 17h respectively.

The photosensitivity of the photodetector 17 is lost or extremely attenuated at the parting lines 17g and 17h. One example of photosensitivity properties in the photo-detecting parts 17d and 17a is shown in FIG. 24(b). When the light spot moves from the point S₁ to the point S₄ in FIG. 24(a), the photosensitivity of the photo-detecting part 17d varies as indicated by the solid line (17d) of FIG. 24(b). Likewise, the photosensitivity of the photo-detecting part 17a varies as indicated by the dotted line (17a) of FIG. 24(b). The photosensitivity is accordingly linearly attenuated on the parting line 17h. Similarly, the photosensitivity on the parting line 17g is attenuated. In the condition shown in FIG. 24(a) (FIG. 21(a)), the portions of the spots P₁ and P₃ which overlap the parting line 17g and 17h are large, compared with the portions of the spots P₂ and P₄ overlapping the parting lines 17g and 17h. Therefore, the output signals Sa and Sc of the photo-detecting parts 17a and 17c each have lower strength than those of the output signals Sb and Sd of the photo-detecting parts 17b and 17d. On the contrary, when the objective lens 15 is excessively remote form the recording medium 16, causing a focusing error, the spots P₁ and P₃ are enlarged while spots P₂ and P₄ become small, resulting in that the strength of the output signals Sa and Sc are higher than the strength of the output signals Sb and Sd.

The focusing error signal FES is given by: FES=(Sa+Sc)−(Sb+Sd) and the objective lens 15 is driven so that the focusing error signal FES becomes "0". The recorded data signal RS is given by: RS=Sa+Sb+Sc+Sd. The tracking error signal RES is given by: RES=Se −Sf where Se and Sf represent the output signals of the photo-detecting parts 17e and 17f respectively, and tracking control is performed so that the tracking error signal RES becomes "0".

When the wavelength of a laser beam emitted from the semiconductor laser 11 is shorter than the wavelength of a reference laser beam due to its variation (this reference laser beam is set such that the main first order diffracted lights in the second diffraction grating element 13 are converged on the focal point $f_1$ and $f_2$ when focusing is accurately performed), the main first order diffracted lights in the diffraction gratings 13a and 13c are converged on a position which is closer to the photodetector 17 than the focal point $f_1$ by a predetermined distance x; and the main first order diffracted lights in the diffraction gratings 13b and 13d are converged on a position closer to the photodetector 17 than the focal point $f_2$ by a predetermined distance y. The predetermined distance x is equal to the predetermined distance y. Therefore, the spots $P_1$ to $P_4$ formed on the photodetector 17 are uniformly smaller than those formed by the reference laser beam. A variation in the wavelength of the semiconductor laser 11 accordingly does not affect the focusing error signal FES. When the wavelength of the laser beam is longer than the wavelength of the reference laser beam, the spots $P_1$ and $P_4$ are uniformly larger than those formed by the reference laser beam, causing no influence on the focusing error signal FES.

Figure 25A:
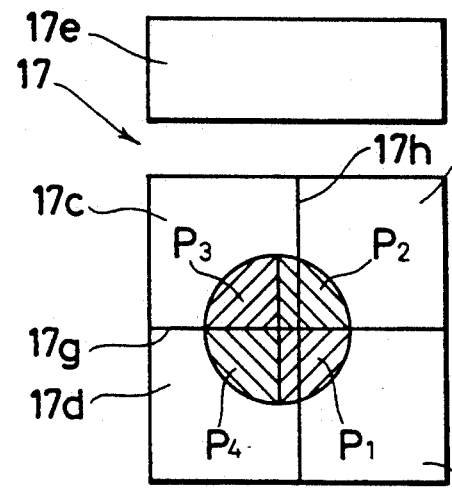
FIG. 25(a) and FIG. 25(b) are schematic plane views illustrating the photodetector whereon the light spots are illuminated when the wavelength of a light emitted from a semiconductor laser fluctuates.
Figure 25B:
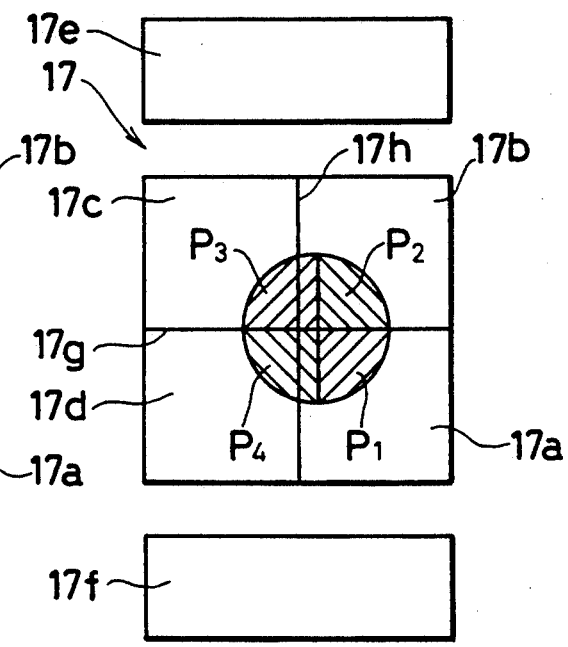

If a variation occurs in the wavelength of the laser beam, the spots $P_1$ to $P_4$ moves on the photodetector 17 in the diffracting direction X as shown in FIGS. 25(a) and 25(b). In this case, since the increased/decreased light amount of the photo-detecting part 17a and the increased/decreased light amount of the photo-detecting part 17c are offset by each other, the value of the term (Sa+Sc) in the equation FES=-(Sa+Sc)−(Sb+Sd) is not varied. Similarly, since the increased/decreased light amount of the photo-detecting part 17b and the increased/decreased light amount of the photo-detecting part 17d are offset by each other, the value of the term (Sb+Sd) is not varied. As a result, there is no error occurred in the focusing error signal FES.

The following description concretely describes the design factors of an example of the optical head device 30.

In the optical head device 30 shown in FIG. 22, the objective lens 15 has a numerical aperture (NA) of 0.5 and a focal distance of 4.5 mm, and the collimating lens 14 has a numerical aperture (NA) of 0.3 and a focal distance of 8.3 mm. Further, an optical distance $l_1$ between an optical axis point A of the second diffraction grating element 13 and an emitting point Q of the semiconductor laser 11 is set to 3.480 mm; an optical distance $l_2$ between the second diffraction grating element 13 and the irradiated surface of the photodetector 17 in the direction Z is set to 3.100 mm; an optical distance $l_3$ between the emitting point Q and a center 0 of the photodetector 17 is set to 1.670 mm; an optical distance between the optical axis point A and the focal point $f_1$ is set to 3.479 mm; an optical distance between the optical axis point A and the center O of the photodetector 17, along the optical axis $L_2$ is set to 3.521 mm; and an optical distance between the optical axis point A and the focal point $f_2$ is set to 3.565 mm. When the above points are plotted on coordinates, on condition that the optical axis point A is an original (0, 0, 0), the following values are obtained: the center O (1670.0, 0.0, −3100.0); the emitting point Q (0, 0, −3480.0); the focal point $f_1$ (1649.8, 0, −3062.6); and the focal point $f_2$ (1690.7, 0, −3138.4). In this case, the unit of the coordinates is μm. The above constants are listed in the following table.

TABLE 4

| OPTICAL DISTANCE BETWEEN EACH POINT (mm) | |
|---|---|
| OPTICAL AXIS POINT A/EMITTING POINT Q($l_1$) | 3.480 |
| EMITTING POINT Q/CENTER O($l_3$) | 1.670 |
| OPTICAL AXIS POINT A/FOCAL POINT $f_1$ | 3.479 |
| OPTICAL AXIS POINT A/CENTER O($l_2$) (Z direction) | 3.100 |
| OPTICAL AXIS POINT A/CENTER O (a direction of the optical axis $L_2$) | 3.521 |
| OPTICAL AXIS POINT A/FOCAL POINT $f_2$ | 3.565 |

| OPTICAL PROPERTIES OF LENSES | | |
|---|---|---|
| | NUMERICAL APERATURE (NA) | FOCAL DISTANCE (mm) |
| COLLIMATING LENS 14 | 0.3 | 8.3 |
| OBJECTIVE LENS 15 | 0.5 | 4.5 |

| COORDINATES OF EACH POINT (μm) |
|---|
| A: (0, 0, 0) |
| O: (1670.0, 0.0, −3100.0) |
| Q: (0, 0, −3480.0) |
| $f_1$: (1649.8, 0, −3062.6) |
| $f_2$: (1690.7, 0, −3138.4) |

In the photodetector 17 shown in FIG. 21(b), the length d of each side of the main photo-detecting part is 155 μm and each width of the parting lines 17g and 17h is 5 μm. The widths (5 μm) of the parting lines 17g and 17h are determined so as to obtain an optimum focusing error signal FES when the photosensitivities of the photo-detecting parts 17a to 17d show the characteristic shown in FIG. 24(b) which has already been explained. When focusing is accurately performed, the spots $P_1$ to $P_4$ form a circle having a diameter r of 20 μm.

Figure 26:
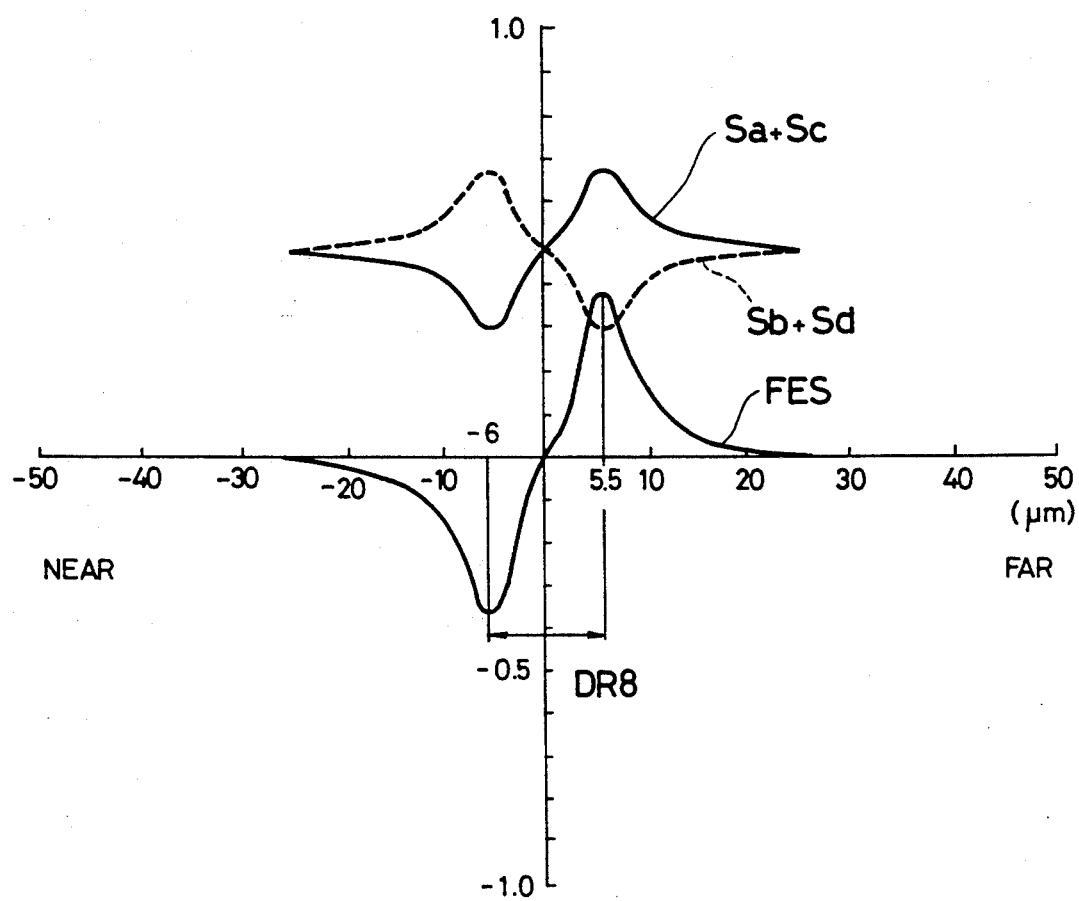

In the use of the optical head device 30 having the above design factors, when the objective lens 15 is moved in the direction of the optical axis $L_1$ in relation to the recording medium 16, the sum of the output signals Sa and Sc of the photo-detecting parts 17a and 17c (these parts 17a and 17c are diagonally positioned) varies as indicated by the curved line Sa+Sc of FIG. 26; and the sum of the output signals Sb and Sd of the photo-detecting parts 17b and 17d, which are diagonally positioned, varies as indicated by the curved line Sb+Sd of the same. The focusing error signal FES (=(Sa+Sc)−(Sb+Sd)) varies as indicated by the curved line FES. The above curved lines are obtained through the results of the simulations and the ordinate indicates relative values. A dynamic range DR8 for detecting focusing errors is −6 μm to 5.5 μm.

The following description discloses a tenth embodiment in which the photodetector 17 has main and sub photo-detecting sections longer than those of the ninth embodiment in the diffracting direction X.

Figure 27:
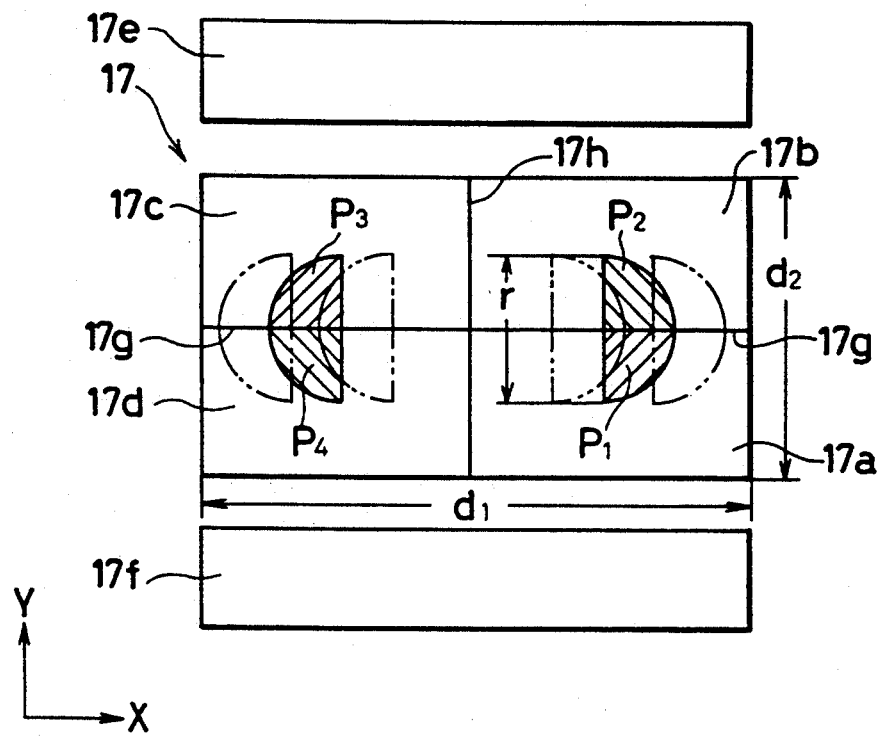
FIG. 27 through FIG. 29 are views illustrating a tenth embodiment of the present invention.

As shown in FIG. 27, the main photo-detecting section of the photodetector 17 of this embodiment is divided into the four photo-detecting parts 17a to 17d by the parting lines 17g and 17h. The photo-detecting parts 17a to 17d are elongated substantially in the diffracting direction X compared with those of the ninth embodiment, because the second diffraction grating element 13 is designed such that: the joined spots $P_1$ and $P_2$ (which are formed on the photo-detecting parts 17a and 17b) and the joined spots $P_3$ and $P_4$ (which are formed on the photo-detecting parts 17c and 17d) are spaced substantially in the diffracting direction X.

Figure 28:
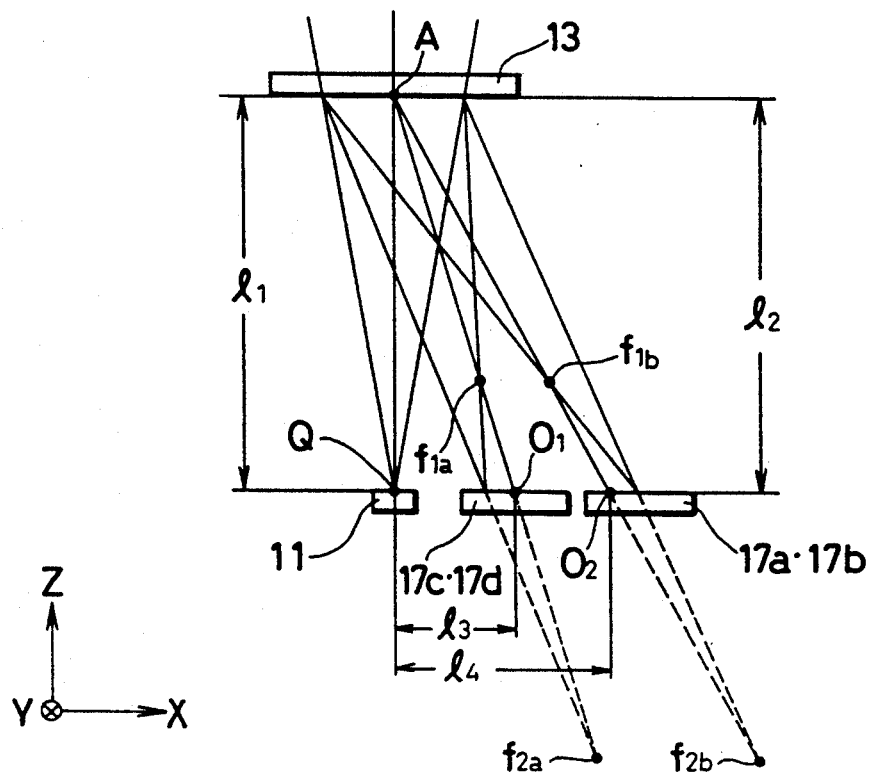

The second diffraction grating element 13 is comprised of the four diffraction gratings 13a to 13d similarly to the ninth embodiment. In this embodiment, the grating lines 13e of the diffraction grating 13a are designed such that when focusing is accurately performed, the main first order diffracted light produced in the diffraction grating 13a is converged on a focal point $f_{1b}$ positioned before the photo-detecting parts 17a and 17b as shown in FIG. 28, and then inverted to form the spot $P_1$ on the photo-detecting part 17a (for simplicity, the first diffraction grating element 12 is omitted in FIG. 28). The grating lines 13g of the diffraction grating 13c are designed such that when focusing is accurately performed, the main first order diffracted light produced in the diffraction grating 13c is converged on a focal point $f_{1a}$ positioned before the photo-detecting parts 17c and 17d, and then inverted to form the spot $P_3$ on the photo-detecting part 17c. Further, the grating lines 13f of the diffraction grating 13b are designed such that when focusing is accurately performed, the main first order diffracted light in the diffraction grating 13b is converged on a focal point $f_{2b}$ positioned behind the photo-detecting parts 17a and 17b. This allows the main first order diffracted light in the diffraction grating 13b to form the spot $P_2$ on the photo-detecting part 17b without being inverted. The grating lines 13h of the diffraction grating 13d are designed such that when focusing is accurately performed, the main first order diffracted light in the diffraction grating 13d is converged on a focal point $f_{2a}$ positioned behind the photo-detecting parts 17c and 17d. Therefore, the main first order diffracted light in the diffraction grating 13d is not inverted and forms the spot $P_4$ on the photo-detecting part 17d.

In this embodiment, the focusing error signal FES, tracking error signal RES and others are obtained from the same arithmetic operations as those of the ninth embodiment. Since the spots $P_1$, $P_2$ and the spots $P_3$, $P_4$ are spaced in the diffracting direction X, the spots $P_1$ and $P_4$ will be always converged within the corresponding photo-detecting parts 17a to 17d even if the spots $P_1$ to $P_4$ are moved as indicated by the virtual line in the diffracting direction X due to a variation in the wavelength of the laser beam from the semiconductor laser 11. Therefore, the spots $P_1$ to $P_4$ are not affected by a variation in the wavelength. The difference between an average diffraction angle of the diffraction gratings 13a and 13b and an average diffraction angle of the diffraction gratings 13c and 13d is somewhat large, compared to the ninth embodiment, but can be considerably reduce compared to conventional diffraction grating elements.

The design factors of an example of the optical head device 30 in this embodiment will be listed in Table 5. In Table 5, $O_1$ represents the center of the area consisting of the photo-detecting parts 17c and 17d; $O_2$ represents the center of the area consisting of the photo-detecting parts 17a and 17b; $l_3$ represents the optical distance in the diffracting direction X between the emitting point Q and the center $O_1$; and $l_4$ represents the optical distance in the diffracting direction X between the emitting point Q and the center $O_2$.

TABLE 5

| OPTICAL DISTANCE BETWEEN EACH POINT (mm) | |
|---|---|
| OPTICAL AXIS POINT A/EMITTING POINT Q($l_1$) | 3.480 |
| EMITTING POINT Q/CENTER $O_1$ ($l_3$) | 1.670 |
| EMITTING POINT Q/CENTER $O_2$ ($l_4$) | 1.770 |
| OPTICAL AXIS POINT A/CENTERS $O_1$, $O_2$ ($l_2$) | 3.100 |
| OPTICAL AXIS POINT A/CENTER $O_1$ | 3.521 |
| OPTICAL AXIS POINT A/FOCAL POINT $f_{1a}$ | 3.479 |
| OPTICAL AXIS POINT A/FOCAL POINT $f_{1b}$ | 3.526 |
| OPTICAL AXIS POINT A/FOCAL POINT $f_{2a}$ | 3.565 |
| OPTICAL AXIS POINT A/FOCAL POINT $f_{2b}$ | 3.614 |

| OPTICAL PROPERTIES OF LENSES | | |
|---|---|---|
| | NUMERICAL APERATURE (NA) | FOCAL DISTANCE (mm) |
| COLLIMATING LENS 14 | 0.3 | 8.3 |
| OBJECTIVE LENS 15 | 0.5 | 4.5 |

| COORDINATES OF EACH POINT (μm) |
|---|
| A: (0, 0, 0) |
| $O_1$: (1670.0, 0.0, −3100.0) |
| $O_2$: (1770.0, 0.0, −3100.0) |
| Q: (0, 0, −3480.0) |
| $f_{1a}$: (1649.8, 0, −3062.6) |
| $f_{1b}$: (1748.6, 0, −3062.6) |
| $f_{2a}$: (1690.7, 0, −3138.4) |
| $f_{2b}$: (1791.9, 0, −3138.4) |

In the photodetector 17 shown in FIG. 27, the length $d_1$ (extending in the diffracting direction X) of the main photo-detecting section is 205 μm; the width $d_2$ thereof (extending in the track direction Y) is 155 μm; and each width of the parting lines 17g and 17h is 5 μm. When focusing is accurately performed, the semi-circle consisting of the spots $P_1$ and $P_2$ and the semi-circle consisting of the spots $P_3$ and $P_4$ respectively have a diameter r of 20 μm.

Figure 29:
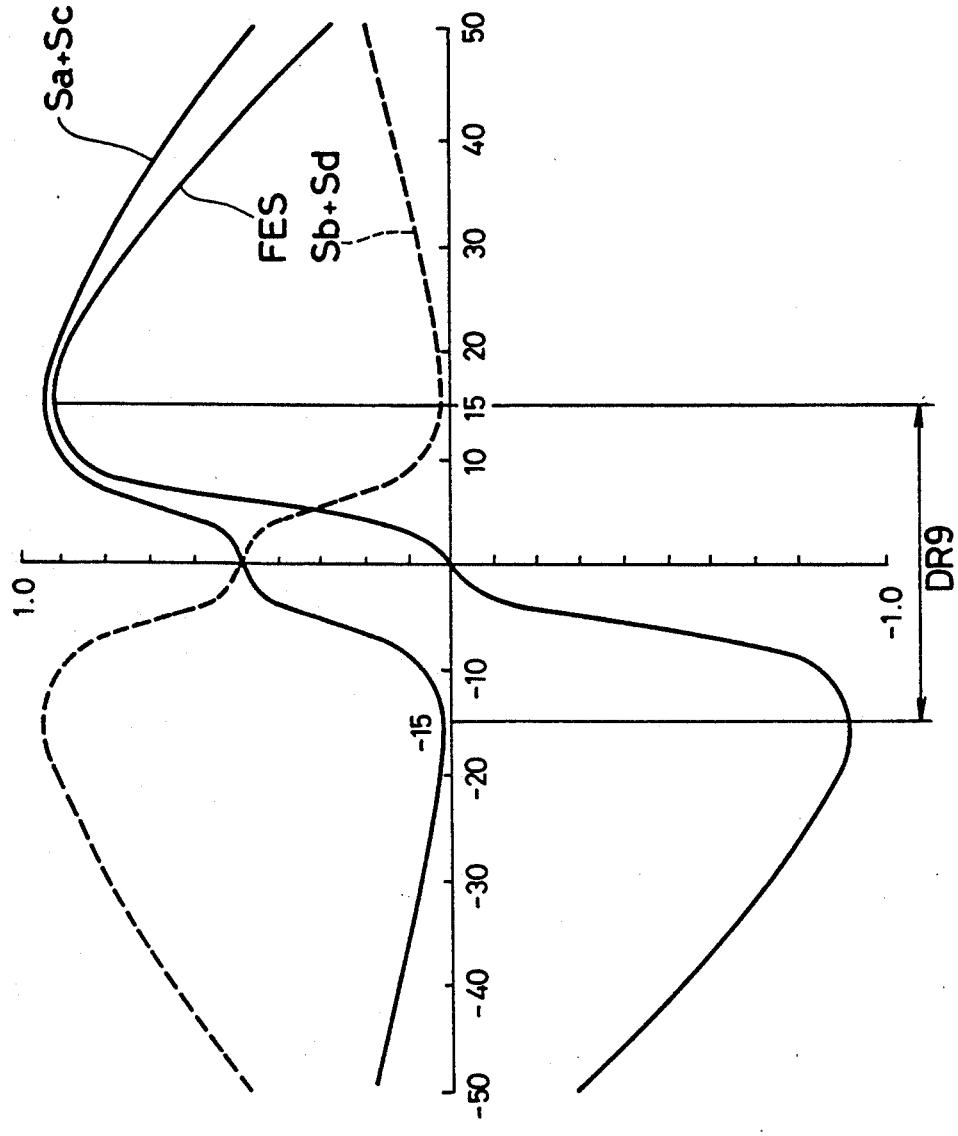

In the use of the optical head device 30 having the above arrangement, when the objective lens 15 is moved along the direction of the optical axis $L_1$ in relation to the recording medium 16, the sum of the output signals Sa and Sc of the photo-detecting parts 17a and 17c which are diagonally positioned varies as indicated by the curved line Sa+Sc, while the sum of the output signals Sb and Sd of the photo-detecting parts 17b and 17d which are diagonally positioned varies as indicated by the curved line Sb+Sd (see FIG. 29). The focusing error signal FES =(Sa+Sc)−(Sb+Sd) varies as indicated by the curved line FES. The above curved lines are obtained through the results of the simulations and the ordinate indicates relative values. A dynamic range DR9 for detecting focusing errors is −15 μm to +15 m.

Figure 30:
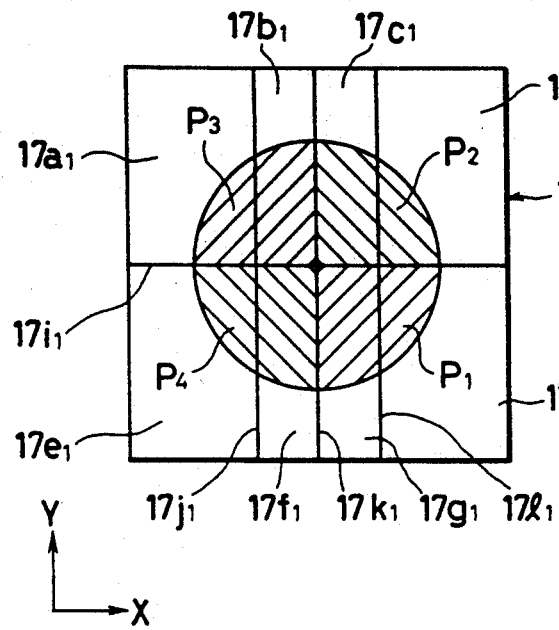
FIG. 30 is a schematic plan view illustrating an 11th embodiment of the present invention, and shows a photodetector whereon light spots are illuminated.

With reference to FIG. 30, an 11th embodiment of the invention will be described below.

In this embodiment, the main photo-detecting section of the photodetector 17 is comprised of eight photo-detecting parts $17a_1$ to $17h_1$. More specifically the main photo-detecting section is firstly divided into four parts by a parting line $17i_1$ which is parallel with the diffracting direction X and a parting line $17k_1$ which is parallel with the track direction Y. The four divided parts are further divided by parting lines $17j_1$ and $17l_1$ which are symmetrically positioned with respect to the parting line $17k_1$. The parting lines $17j_1$ and $17l_1$ are respectively a predetermined distance away from the parting line $17k_1$, being parallel with the track direction Y.

As shown in FIG. 23, the second diffraction grating element 13 is comprised of the four diffraction gratings 13a to 13d similarly to the tenth embodiment. In the second diffraction grating element 13 of this embodiment, the main first order diffracted light produced in the diffraction grating 13a is once converged on the focal point $f_1$ as shown in FIG. 22 when focusing is accurately performed, and then inverted to form the spot $P_1$ on the photo-detecting parts $17h_1$ and $17g_1$ of the photodetector 17. The main first order diffracted light produced in the diffraction grating 13c is once converged on the focal point $f_1$ when focusing is accurately performed, and then inverted to form the spot $P_3$ on the photo-detecting parts $17a_1$ and $17b_1$. The photo-detecting parts $17a_1$, $17b_1$ and the photo-detecting parts $17h_1$, $17g_1$ are symmetrically positioned about a point. The main first order diffracted lights in the diffraction gratings 13b and 13d are converged on the focal point $f_2$ when focusing is accurately performed. Therefore, the main first order diffracted lights in the diffraction gratings 13b and 13d are not inverted and form the spot $P_2$ on the photo-detecting parts $17c_1$ and $17d_1$ and the spot $P_4$ on the photo-detecting parts $17e_1$ and $17f_1$ respectively. The photo-detecting parts $17c_1$, $17d_1$ and the photo-detecting parts $17e_1$, $17f_1$ are symmetrically positioned about a point.

The focusing error signal FES is obtained from the equation $FES=(Sc_1+Sf_1)-(Sb_1+Sg_1)$ and the recorded data signal RS is obtained from the equation $RS=Sa_1+Sb_1+Sc_1+Sd_1+Se_1+Sf_1+Sg_1+Sh_1$, where $Sa_1$ to $Sh_1$ represent the output signals of the photo-detecting parts $17a_1$ to $17h_1$ respectively. In this case, even if the spots $P_1$ to $P_4$ are moved in the diffracting direction X, or the sizes of the spots $P_1$ to $P_4$ are reduced due to a variation in the wavelength of the laser beam, the focusing error signal FES can be obtained with accuracy.

The photodetector 17 of this embodiment is provided with a pair of photo-detecting parts (not shown) which constitute a sub photo-detecting section for detecting the tracking error signal RES. The photo-detecting parts are juxtaposed with the main photo-detecting section substantially in the track direction Y so that the main photo-detecting section is positioned between the photo-detecting parts and there is a predetermined spacing between the main photo-detecting section and each of the photo-detecting parts.

Figure 31:
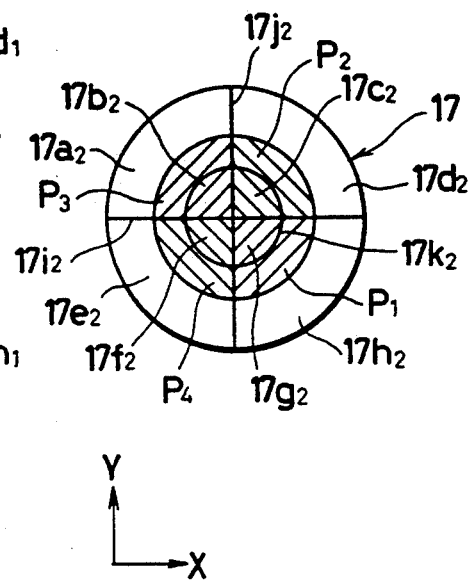
FIG. 31 is a schematic plan view illustrating a 12th embodiment of the present invention and shows a photodetector whereon light spots are illuminated.

Referring now to FIG. 31, a 12th embodiment of the invention will be explained below.

In this embodiment, the main photo-detecting section of the photodetector 17 is formed in a circle and comprised of eight photo-detecting parts $17a_2$ to $17h_2$. More specifically, the main photo-detecting section is firstly divided into four parts by two parting lines $17i_2$ and $17j_2$ and the four parts are further divided by a parting line $17k_2$. The parting lines $17i_2$ and $17j_2$ are substantially parallel with the diffracting direction X and the track direction Y respectively, and the parting line $17k_2$ is a circle line which is concentric with the circular main photo-detecting section, having a predetermined diameter.

The second diffraction grating 13 of this embodiment is comprised of the diffraction gratings 13a to 13d similarly to the 11th embodiment. In this second diffraction grating 13, the main first order diffracted lights produced in the diffraction gratings 13a and 13c are inverted to form the spot $P_1$ on the photo-detecting parts $17g_2$ and $17h_2$ and the spot $P_3$ on the photo-detecting parts $17a_2$ and $17b_2$ respectively, when focusing is accurately performed. The photo-detecting parts $17g_2$, $17h_2$ and the photo-detecting parts $17a_2$, $17b_2$ are symmetrically positioned about a point. The main first order diffracted lights in the diffraction gratings 13b and 13d are not inverted and form the spot $P_2$ on the photo-detecting parts $17c_2$ and $17d_2$ and the spot $P_4$ on the photo-detecting parts $17e_2$ and $17f_2$ respectively, when focusing is accurately performed.

The focusing error signal FES is given by: $FES=(Sc_2+Sf_2)-(Sb_2+Sg_2)$ where $Sa_2$ to $Sh_2$ represent the output signals of the photo-detecting parts $17a_2$ to $17h_2$ respectively. The spots $P_1$ to $P_4$ on the photodetector 17 form a circular area, and if the diameter of this circular area is set such that $Sa_2+Sd_2+Se_2+Sh_2=Sb_2+Sc_2+Sf_2+Sg_2$ at the time of accurate focusing, the focusing error signal FES is also obtained from the equation: $FES=(Sd_2-Sc_2)+(Se_2-Sf_2)+(Sg_2-Sh_2)+(Sb_2-Sa_2)=(Sd_2+Se_2+Sg_2+Sb_2)-(Sc_2+Sf_2+Sh_2+Sa_2)$. In this case, even if the spots $P_1$ to $P_4$ are moved along the diffracting direction X or the sizes of the spots $P_1$ to $P_4$ are reduced due to a variation in the wavelength of the laser beam, the focusing error signal FES can be obtained with accuracy. The recorded data signal RS is given by: $RS=Sa_2+Sb_2+Sc_2+Sd_2+Se_2+Sf_2+Sg_2+Sh_2$.

In this embodiment, the tracking error signal FES is detected by a pair of photo-detecting parts (not shown). The photo-detecting parts are juxtaposed with the main photo-detecting section substantially in the track direction Y so that the main photo-detecting section is positioned between the photo-detecting parts and there is a predetermined spacing between the main photo-detecting section and the respective photo-detecting parts.

Figure 32:
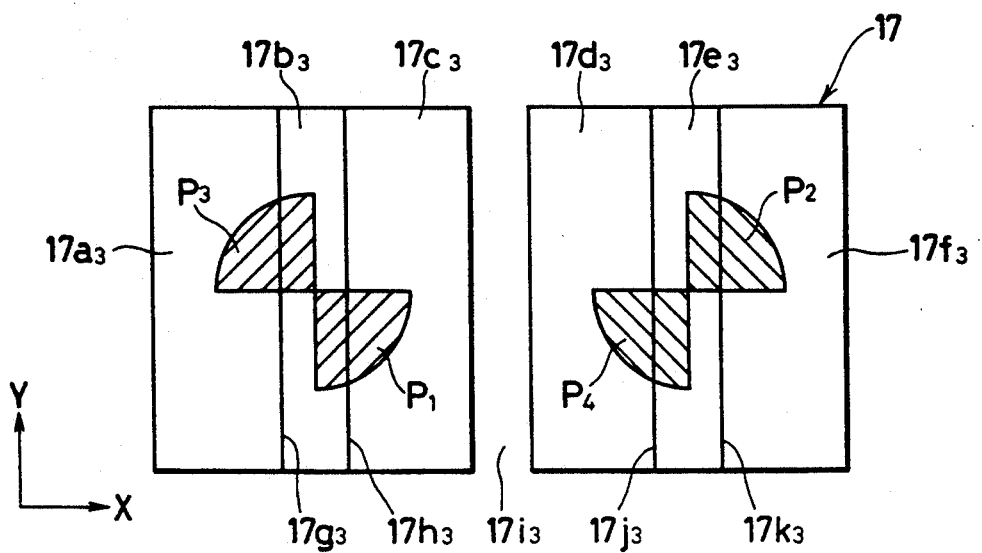
FIG. 32 is a schematic plan view illustrating a 13th embodiment of the present invention and shows a photodetector whereon light spots are illuminated.

The following description describes a 13th embodiment of the invention with reference to FIG. 32.

In this embodiment, the main photo-detecting section of the photodetector 17 is divided into six photo-detecting parts $17a_3$ to $17f_3$ by five parting lines $17g_3$ to $17k_3$ which are substantially parallel with the track direction Y. The parting line $17i_3$ (this parting line is centrally located) is wider than the other parting lines $17g_3$, $17h_3$, $17j_3$ and $17k_3$, substantially in the diffracting direction X. The reason for this is that the spots $P_1$ and $P_3$ which are formed in pairs on the corresponding photo-detecting parts, and the spots $P_2$ and $P_4$ which are formed in pairs on the corresponding photo-detecting parts are positioned with a predetermined spacing in the diffracting direction X.

The second diffraction grating element 13 is comprised of the four diffraction gratings 13a to 13d similarly to the 12th embodiment. In this embodiment, when focusing is accurately performed, the main first order diffracted lights in the diffraction gratings 13a and 13c are once converged on a focal point (not shown) located before the photo-detecting parts $17a_3$ to $17c_3$, and then inverted to form the spot $P_1$ on the photo-detecting parts $17b_3$ and $17c_3$ and the spot $P_3$ on the photo-detecting parts $17a_3$ and $17b_3$ respectively. The main first order diffracted lights in the diffraction gratings 13b and 13d are not inverted and form the spot $P_2$ on the photo-detecting parts $17e_3$ and $17f_3$ and the spot $P_4$ on the photo-detecting parts $17d_3$ and $17e_3$ respectively before being converged on a focal point (not shown) when focusing is accurately performed. The above focal point is located behind the photo-detecting parts $17d_3$ to $17f_3$.

In this embodiment, the focusing error signal FES is obtained by the equation: $FES=Sb_3-Se_3$ or $FES=(Sb_3+Sd_3+Sf_3)-(Sa_3+Sc_3+Se_3)$; and the recorded data signal RF is obtained by: RF=$Sa_3+Sb_3+Sc_3+Sd_3+Se_3+Sf_3$, where $Sa_3$ to $Sf_3$ represent the output signals of the photo-detecting parts $17a_3$ to $17f_3$ respectively.

In this embodiment, there is provided a spacing between the spots $P_1$, $P_3$ and the spots $P_2$, $P_4$ in the diffracting direction X, and therefore even if the spots $P_1$ to $P_4$ are moved along the diffracting direction X due to a variation in the wavelength of the lesser beam, the spots $P_1$ and $P_3$ are formed within the photo-detecting parts $17a_3$ to $17c_3$ while the spots $P_2$ and $P_4$ are formed within the photo-detecting parts $17d_3$ to $17f_3$. That is, the spots $P_1$ to $P_2$ are not affected by a variation in the wavelength of the laser beam.

In this embodiment, the tracking error signal is detected by a pair of photo-detecting parts (not shown). The photo-detecting parts are juxtaposed with the main photo-detecting section in the track direction Y so that the main photo-detecting section is positioned between the photo-detecting parts and there is a predetermined spacing between the main photo-detecting section and the respective photo-detecting parts.

The second diffraction grating element 13 and photo-detector 17, with which the objects of the invention are achieved, may be divided with other dividing methods than those described in the foregoing embodiments.

As described above, when focusing is accurately performed in the optical head device 30, the main first order diffracted lights in a first diffraction grating pair (this pair is symmetrically positioned about a point) are converged on a focal point located before the photo-detecting means, while the main first order diffracted lights in a second diffraction grating pair (this pair is symmetrically positioned about a point) are converged on a focal point located behind the photo-detecting means. Further, the optical head device 30 is designed such that the differences among the diffraction angles of the diffraction gratings which constitute the diffraction grating element are reduced so that the spots are formed on the photo-detecting means in sufficiently close proximity. Therefore, when focusing is accurately performed, symmetrical spots each having a predetermined area are formed on the photo-detecting means in close proximity. If a focusing error occurs, the spots formed by the diffracted lights in the first diffraction grating pair are enlarged whilst the spots formed by the diffracted lights in the second diffraction grating pair are reduced, or vice versa. With such an arrangement, the focusing error can be detected. The photo-detecting means is placed substantially at a mid-position between the focal point of the main first order diffracted lights produced in the first diffraction grating pair and the focal point of the main first order diffracted lights produced in the second diffraction grating pair, and therefore even if the wavelength of the emitted light from the light source is varied, the spots formed on the photo-detecting means are uniformly enlarged or reduced so that the detection of the focusing error is not affected by a variation in the wavelength.

Since the photo-detecting parts of the photo-detecting means are comparatively closely formed, the area occupied by the photo-detecting means as well as the manufacturing cost can be reduced. Also, since the differences among the diffraction angles are sufficiently reduced, the diffraction gratings have the substantially same profile when the diffraction gratings are respectively fabricated in a serrated configuration. This facilitates the manufacturing process of the diffraction grating element and allows the diffraction grating element to have a substantially uniform optical utilization efficiency which is sufficiently high. The diffracted lights from the second diffraction grating element have properties similar to the astigmatic properties, so that the known astigmatism may be applied for controlling the focal points.

The following description discloses an optical head device 40 wherein no sub photo-detecting section is provided and the detection of recorded data, focusing errors and tracking errors is performed by the main photo-detecting section. For simplicity, the members of the following embodiments that function similarly to those in the foregoing embodiments are denoted by the same reference numerals and the description thereof will be omitted. The optical head device 40 is capable of recording and reproducing data with the use of various types of disks such as Read-Only type disks, Write-Once type disks and Rewritable disks.

Figure 33:
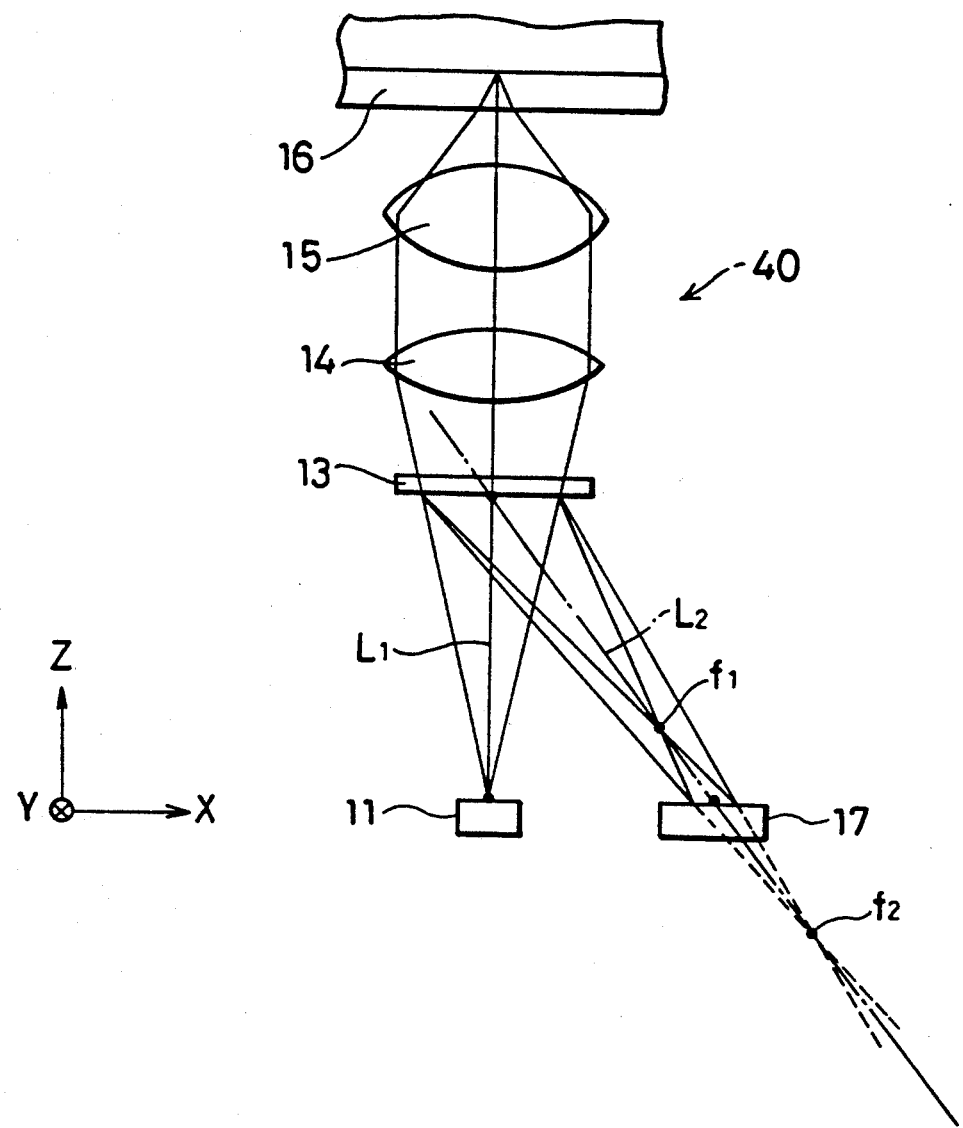

FIG. 33 shows the structure of the optical head device 40 in a 14th embodiment. The optical head device 40 differs from the optical head device 30 shown in FIG. 22 in that the first diffraction grating element 12 for dividing the laser beam of the semiconductor laser 11 into three beams is not provided in the optical head device 40. As shown in FIGS. 34(a)-34(c), the photodetector 17 is not provided with a sub photo-detecting section but provided with photo-detecting parts 17a to 17d shown in FIGS. 21(a)-21(c). The diffraction grating element 13 is comprised of the four diffraction gratings 13a to 13d like the diffraction grating element 13 shown in FIG. 23. The diffraction gratings 13a to 13d of the diffraction grating element 13 have the grating lines 13e to 13h respectively, whose orientations and pitches are determined by the relative positions of the diffraction grating element 13, the emitting point of the semiconductor laser 11 and the focal point on the photodetector 17 so that the average diffracting direction of first order diffracted lights is set to be the diffracting direction X orthogonal to the track direction Y. Like the foregoing embodiments, the photodetector 17 is located substantially at a mid-position between the focal point $f_1$ of the first order diffracted lights in the first pair of diffraction gratings 13a and 13c and the focal point $f_2$ of the first order diffracted lights in the second pair of diffraction gratings 13b and 13d.

In the above arrangement, the laser beam emitted from the semiconductor laser 11 is diffracted at the diffraction grating element 13, and only the zeroth order diffracted light of the diffracted lights is converged on the recording track of the recording medium 16 after passing through the collimating lens 14 and the objective lens 15. The reflected light off of the recording medium 16 is projected back to the diffraction grating element 13 through the objective lens 15 and the collimating lens 14 so as to be diffracted by the diffraction gratings 13a to 13d. The first order diffracted lights of the diffracted lights are guided to the photodetector 17. The lights diffracted at the diffraction gratings 13a to 13d form the spots $P_1$ to $P_4$ on the photo-detecting parts 17a to 17d in a similar process to the process which has been explained with reference to FIG. 21, and therefore the explanation thereof is omitted.

Like the foregoing embodiment, the focusing error signal FES is given by: FES=(Sa+Sc)−(Sb+Sd) and the recorded data signal RS is given by: RS=Sa+Sb+Sc+Sd, where Sa to Sd represent the output signals of the photo-detecting parts 17a to 17d respectively. A light/darkness pattern, which is formed by a light beam E (see FIG. 36) reflected off of the recording medium 16 and guided onto the diffraction grating element 13, is varied depending on which part of a pit C a light spot D (see FIG. 35) converged on the recording medium 16 is situated. The values of the output signals Sa to Sd of the photo-detecting parts 17a to 17d are also respectively varied as the light spot D moves on the pit C in the direction of the arrow A. Therefore, each value of the output signals Sa to Sd when obtaining the focusing error signal FES may be the average of output signals generated from photo-detecting parts 17a to 17d during the optical spot D passes through the pit C.

The tracking error signal RES is obtained by the heterodyne measurement. More concretely, when the light spot D is irradiated, as shown in FIG. 35(b), on the center of the recording track of the recording medium 16 on which the pit C is formed, causing no tracking error, the light/darkness pattern formed by the light beam E on the diffraction grating element 13 at the time the light spot D begins to enter the pit C (i.e. the passing of the light spot D through the pit C is just started) is as shown in FIG. 36(b), that is, the upper and lower portions of the pattern are bright and the center portion thereof is dark. In this case, the light/darkness pattern of the light beam E is symmetrical with respect to a join line $C_2$ of the diffraction grating element 13, and therefore the value of the signal (hereinafter referred to as "diagonal difference signal") obtained by the equation: $(Sa+Sc)-(Sb+Sd)$ becomes "0".

Figure 37:
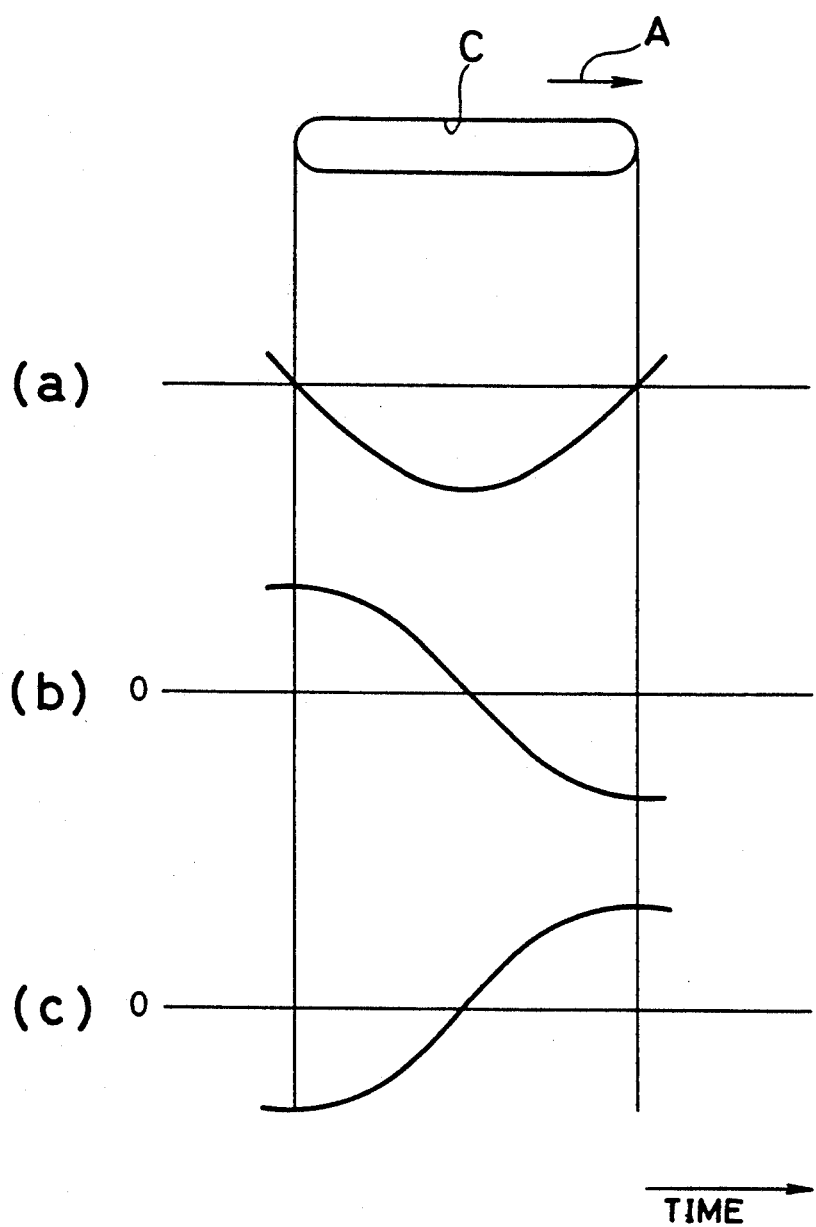
Figure 38:
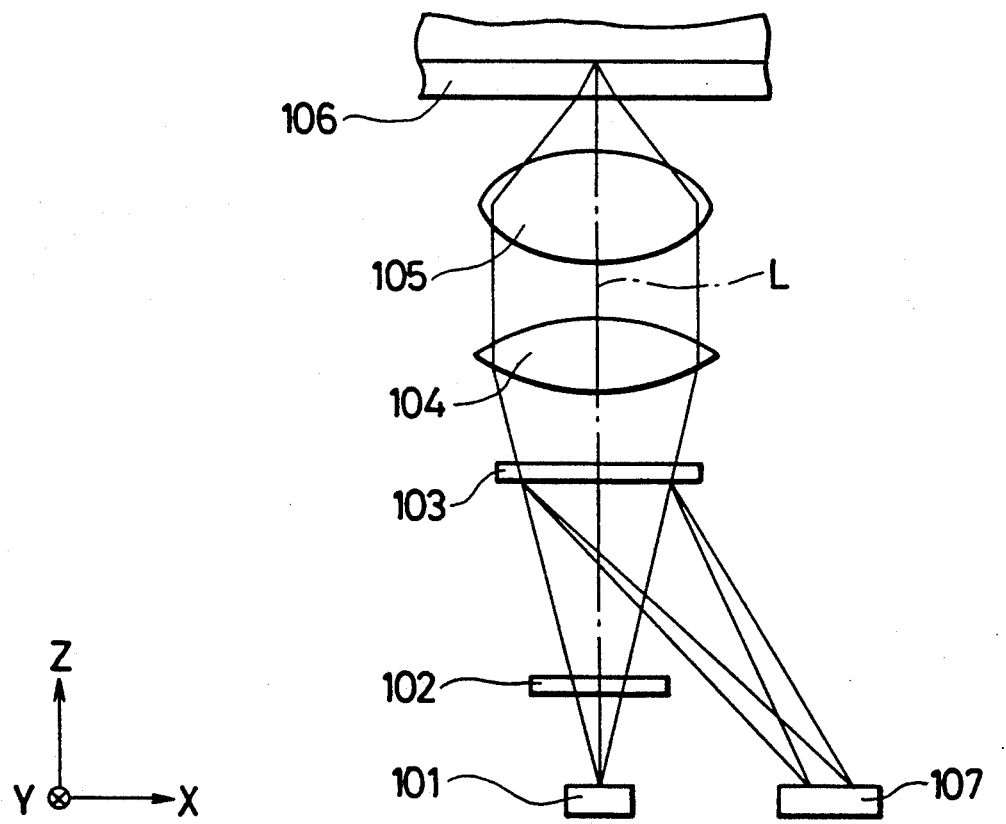
Figure 39A:
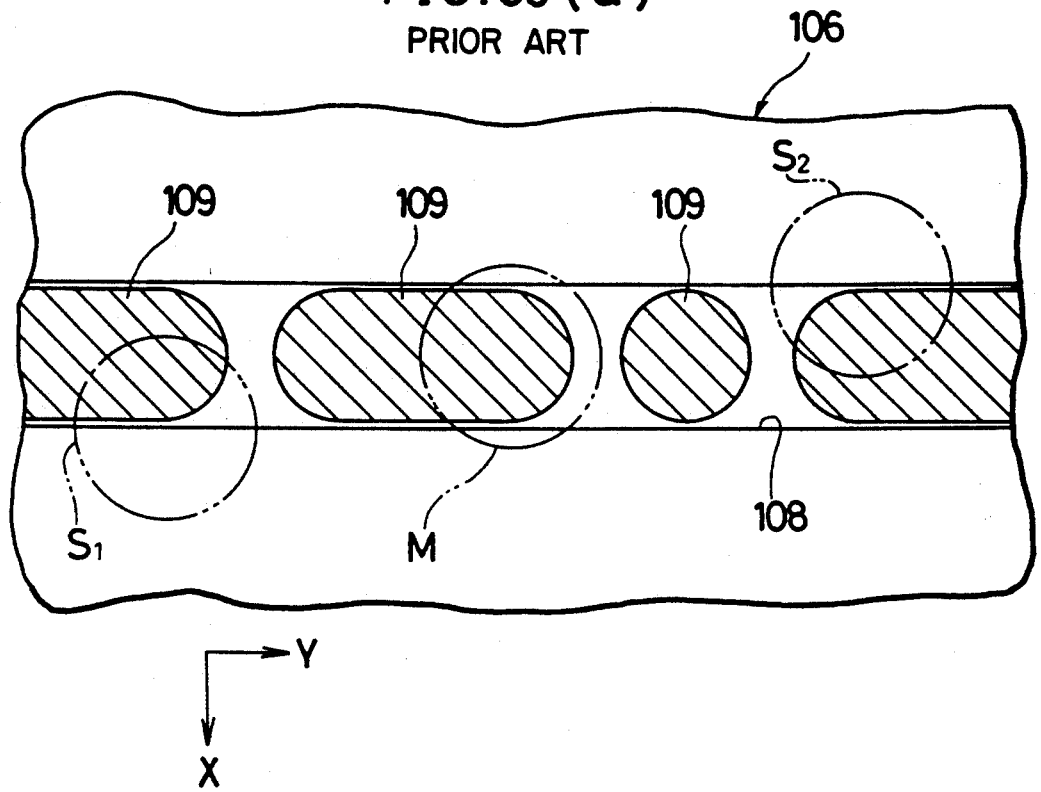
FIG. 39(a) is an enlarged partial plan view illustrating a light spot illuminated on a recording pit formed on a recording medium when data is read.
Figure 39B:
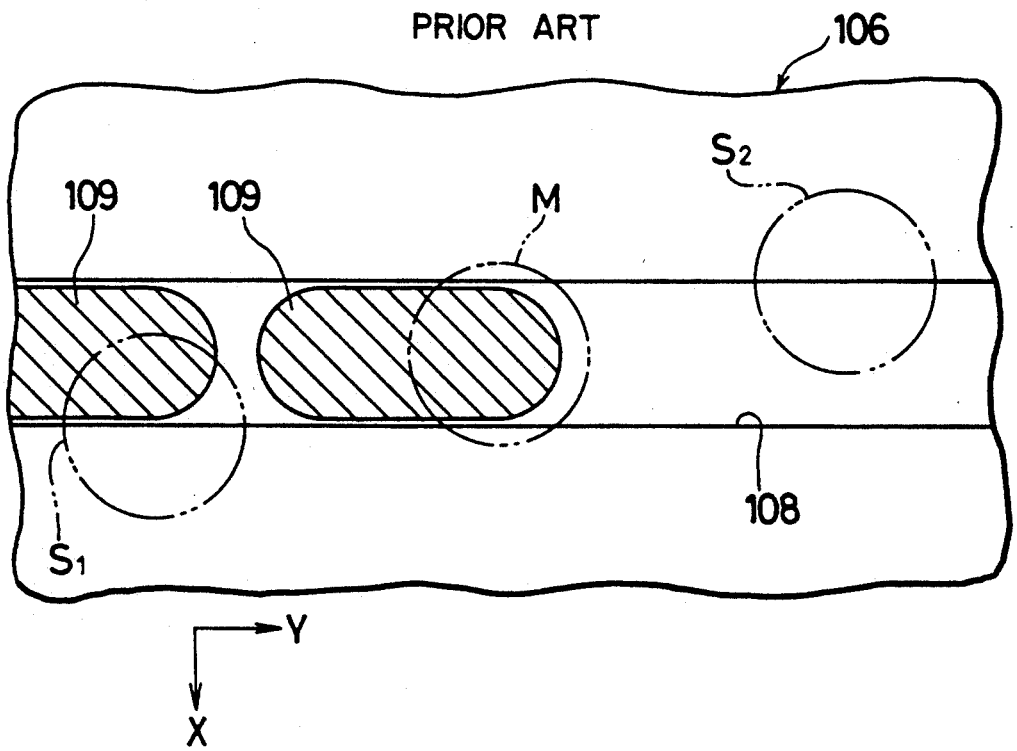
FIG. 39(b) is an enlarged partial plan view illustrating a light spot illuminated on a recording pit formed on the recording medium when data is recorded.
Figure 40A:
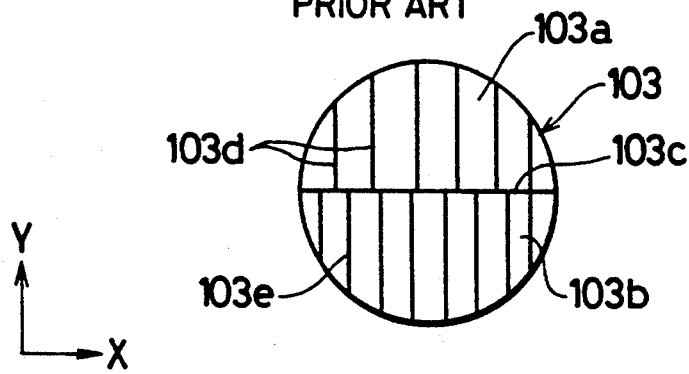
FIG. 40(a) is a schematic plan view illustrating a second diffraction grating element as seen from the recording medium side.
Figure 40B:
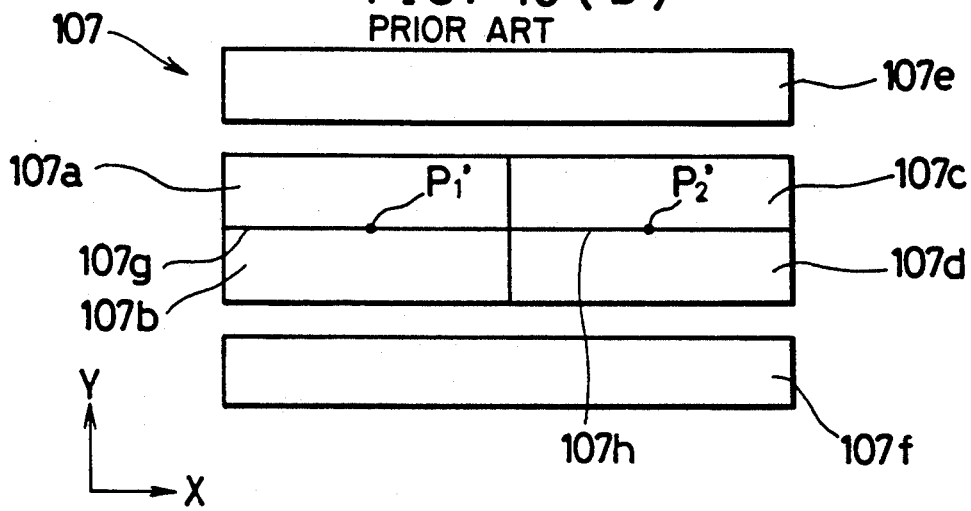
FIG. 40(b) is a schematic plan view illustrating a photodetector.

When the light spot D is displaced off the center of the recording track to the left-hand as shown in FIG. 35(a), causing a tracking error, the light/darkness pattern formed by the light beam E at the time the light spot D begins to enter the pit C is as shown in FIG. 36(a), that is, the upper left portion and lower right portion are bright and the center portion is dark. At that time, the received light amount of the photo-detecting parts 17a and 17c in the photodetector 17 is relatively large while the received light amount of the photo-detecting parts 17b and 17d is relatively small, and the value of the diagonal difference signal $((Sa+Sc)-(Sb+Sd))$ accordingly becomes plus. At the time the light spot D has just passed through the pit C, while being displaced off the center of the recording track to the left-hand, the light/darkness pattern formed by the light beam E is as shown in FIG. 36(c), that is, the upper right portion and lower left portion of the light beam E are bright and the center thereof is dark. At that time, the received light amount of the photo-detecting parts 17a and 17c is relatively small while the received light amount of the photo-detecting parts 17b and 17d is relatively large, so that the value of the diagonal difference signal $((Sa+Sc)-(Sb+Sd))$ becomes minus. Therefore, as the light spot D displaced off the pit C to the left-hand moves in the direction of the arrow A, the value of the diagonal difference signal $((Sa+Sc)-(Sb+Sd))$ is varied from a plus value to a minus value as indicated by the waveform of FIG. 37(b) which is virtually sinusoidal.

On the other hand, when the light spot D is displaced off the center of the recording track to the right-hand as shown in FIG. 35(c), causing a tracking error, the light /darkness pattern formed by the light beam E at the time the light spot D begins to enter the pit C is as shown in FIG. 36(c). At that time, the received light amount of the photo-detecting parts 17a and 17c is relatively small while the received light amount of the photo-detecting parts 17b and 17d is relatively large, so that the value of the diagonal difference signal becomes minus.

At the time the light spot D has passed through the pit C, while being displaced off the center of the recording track to the right-hand, the light/darkness pattern formed by the light beam E is as shown in FIG. 36 (a). At that time, the received light amount of the photo-detecting parts 17a and 17c is relatively large while the received light amount of the photo-detecting parts 17b and 17d is relatively small so that the value of the diagonal difference signal becomes plus. Accordingly, as the light spot D displaced off the pit C to the right-hand moves in the direction of the arrow A, the value of the diagonal difference signal varies from minus to plus as indicated by the waveform of FIG. 37(c) which is virtually sinusoidal. The phase of the sinusoidal waveform obtained when the light spot D is displaced to the right-hand is accordingly rotated from the phase of the sinusoidal waveform by 180° when the light spot D is displaced to the left-hand.

The signal (hereinafter referred to as "sum signal") obtained from the arithmetic operation $(Sa+Sb+Sc+Sd)$ varies as indicated by the sinusoidal waveform of FIG. 37(a) as the light spot D passes through the pit C. As shown in FIG. 37(a), this sum signal reaches its maximum minus value when the light spot D is positioned at the center of the pit C. The phase of the sinusoidal waveform is almost constant irrespective of whether a tracking error occurs.

It is apparent from FIGS. 37(a) and 37(b) that the phase of the diagonal difference signal obtained when the light spot D is displaced off the pit C to the left-hand is backwardly shifted from that of the sum signal by 90°. On the other hand when the light spot D is displaced off the pit C to the right-hand, the phase of the diagonal difference signal is forwardly shifted from that of the sum signal by 90°. Therefore, the direction in which the light spot D is displaced ca be detected by comparing the phases of the diagonal difference signal and the sum signal by tracking error detecting means (not shown). The above comparison can be achieved by e.g. a heterodyne detector. When there is no tracking error occurred, the diagonal difference signal becomes "0" as described above. The light/darkness pattern of FIG. 36 is obtained when the depth of the pit C is a quarter of the wavelength of the laser beam to be used.

Even though the wavelength and frequency of a laser beam emitted from the semiconductor laser 11 are varied, no focusing error FES will occur as has been described. Since the diffracted lights from the second diffraction grating element 13 have properties similar to the astigmatic properties, the known astigmatism may be applied for controlling the focal points.

Even when the photodetector 17 is made up of only the main photo-detecting section shown in FIG. 27, the section comprising the photo-detecting parts 17a to 17d, a tracking error is detectable by comparing the phase of the diagonal difference signal $((Sa+Sc)-(Sb+Sd))$ with the phase of the sum signal $Sa+Sb+Sc+Sd$).

Further, in the case the photodetector 17 is made up of only the main photo-detecting section shown in FIG. 30, the section comprising the photo-detecting parts $17a_1$ to $17h_1$, the diagonal difference signal is obtained by applying the following operation to the output signals $Sb_1$, $Sc_1$, $Sf_1$ and $Sg_1$ of the photo-detecting parts $17b_1$, $17c_1$, $17f_1$ and $17g_1$ which are located at the center of the photodetector 17: Diagonal difference signal $=(Sc_1+Sf_1)-(Sb_1+Sg_1)$. A tracking error is accordingly detectable by comparing the phase of the diagonal difference signal $((Sc_1+Sf_1)-(Sb_1+Sg_1))$ with the phase of the sum signal $(Sa_1+Sb_1+Sc_1+Sd_1+Se_1+Sf_1+Sg_1+Sh_1)$.

Further, in the case the photodetector 17 is made up of the main photo-detecting section shown in FIG. 31, the section comprising the photo-detecting parts $17a_2$ to $17h_2$, the diagonal difference signal is obtained by applying the following operation to the output signals $Sb_2$, $Sc_2$, $Sf_2$ and $Sg_2$ of the photo-detecting parts $17b_2$, $17c_2$, $17f_2$ and $17g_2$ which are located at the center of the photodetector 17: Diagonal difference signal $=(Sc_2+Sf_2)-(Sb_2+Sg_2)$. A tracking error signal is accordingly detectable by comparing the phase of the diagonal difference signal $((Sc_2+Sf_2)-(Sb_2+Sg_2))$ with the phase of the sum signal $(Sa_2+Sb_2+Sc_2+Sd_2+Se_2+Sf_2+Sg_2+Sh_2)$.

Still further, in the case photodetector 17 is made up of the main photo-detecting section shown in FIG. 32, the section comprising the photo-detecting parts $17a_3$ to $17f_3$, the diagonal difference signal is obtained by applying the following operation to the output signals $Sa_3$, $Sc_3$, $Sd_3$ and $Sf_3$ of the photo-detecting parts $17a_3$, $17c_3$, $17d_3$ and $17f_3$. Diagonal difference signal $=(Sa_3+Sc_3)-(Sd_3+Sf_3)$. A tracking error signal is accordingly detectable by comparing the phase of the diagonal difference signal $((Sa_3+Sc_3)-(Sd_3+Sf_3))$ with the phase of the sum signal $(Sa_3+Sb_3+Sc_3+Sd_3+Se_3+Sf_3)$.

In the optical head device 40, a light beam is used; a light/darkness pattern is formed on the diffraction grating element by the reflected light from the recording medium; and a tracking error is detected based on the strength variation of the output signals of the photo-detecting parts, the variation corresponding to the above pattern. Tracking is deemed to be accurately performed when it is detected by the tracking error detecting means that the diagonal difference signal is "0". On the other hand, when a tracking error occurs, the phase of the diagonal difference signal is compared with that of the sum signal by the tracking error detecting means so as to judge in which direction the former is shifted by ±90° in relation to the latter; the direction in which the tracking is displaced is thereby judged; and the adjustment of the tracking is executed until it is detected that the diagonal tracking signal is "0".

Since there is no need to use sub beams for the detection of tracking errors, separating means for separating a light emitted from the light source into a main beam and sub beams becomes unnecessary, resulting in a reduction in the number of the parts. Furthermore, the detection of focusing errors/recorded data and the detection of tracking errors can be performed by the same photo-detecting parts, so that the number of photo-detecting parts can be reduced, thereby reducing the space occupied by the photo-detecting means as well as the manufacturing cost.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An optical head device comprising:
   a light source for emitting a light beam;
   a diffraction grating element divided into a first diffraction grating and a second diffraction grating by a plane including an optical axis that connects a light emitting point on the light source from which a light beam is emitted, to a focal point on a recording medium on which the light beam is converged, the first and second diffraction gratings having different focal distances of first order diffracted light; and
   photo-detecting means disposed substantially at a mid-position between a focal point of a first order diffracted light produced in the first diffraction grating and a focal point of a first order diffracted light produced in the second diffraction grating when there occurs no focusing error, the photo-detecting means comprising a plurality of photo-detecting parts juxtaposed in a direction substantially orthogonal to an average diffracting direction of the diffraction grating element;
   wherein the first diffraction grating and second diffraction grating are designed such that lights diffracted at the first diffraction grating and second diffraction grating are guided into the photo-detecting means to form light spots that are aligned in a direction substantially orthogonal to the average diffracting direction of the diffraction grating element, one of either the first diffraction grating or second diffraction grating has a light-converging property while the other has a light-diverging property, and thereby the focal distance of a first order diffracted light produced in the first diffraction grating differs from the focal distance of a first order diffracted light produced in the second diffraction grating, the first diffraction grating and second diffraction grating have a substantially identical profile, and thereby said diffraction gratings have a substantially equal optical utilization efficiency.

2. The optical head device according to claim 1, wherein either of the first diffraction grating and second diffraction grating has a light-converging property while the other has a light-diverging property, and thereby the focal distance of a first order diffracted light produced in the first diffraction grating differs from the focal distance of a first order diffracted light produced in the second diffraction grating.

3. The optical head device according to claim 2, wherein the first diffraction grating and second diffraction grating have a substantially identical profile, and thereby said diffraction gratings have a substantially equal optical utilization efficiency.

4. The optical head device according to claim 1, further comprising separating means for separating the light emitted from the light source into a main beam and a pair of sub beams,
   wherein said photo-detecting means includes a main photo-detecting section comprising a plurality of photo-detecting parts for detecting recorded data and focusing errors based on the main beam, and a sub photo-detecting section comprising a pair of photo-detecting parts for detecting tracking errors based on the pair of sub beams, the photo-detecting parts of the sub photo-detecting section being positioned with the main photo-detecting section between in such a way that the photo-detecting parts of the sub photo-detecting section are respectively a predetermined distance apart from the main photo-detecting section in the direction substantially orthogonal to the average diffracting direction of the diffraction grating element.

5. The optical head device according to claim 4, wherein the photo-detecting parts are in a point-symmetric relationship and a join line defining a border of the first diffraction grating and second diffraction grating is parallel with a direction of a recording track, on which the light is converged, of the recording medium, and the first and second diffraction gratings are designed such that the diffracting directions thereof each substantially coincide with a direction orthogonal to the track direction.

6. The optical head device according to claim 5, further comprising:
an objective lens for converging a light beam onto the recording medium;
a collimating lens for guiding a parallel beam to the objective lens;
wherein said light source may be a semiconductor laser; and
wherein said main photo-detecting section is divided into a plurality of photo-detecting parts by at least a parting line extending substantially along the average diffracting direction, and the relative positions of (1) an optical axis point $A_1$ that is an intersection of the diffraction grating element and the optical axis, (2) a light emitting point $A_3$ of the semiconductor laser, (3) a middle point $A_2$ between two equal-sized light spots formed on the main photo-detecting section when focusing is accurately performed causing no focusing error, (4) a focal point $f_1$ of the first order diffracted light in the first diffraction grating at the time of accurate focusing, and (5) a focal point $f_2$ of the first order diffracted light in the second diffraction grating are determined based on the optical axis point $A_1$.

7. The optical head device according to claim 6, wherein said main photo-detecting section is divided by a parting line into two photo-detecting parts, and the parting line has a width and photo-detecting parts each have a width, in the direction substantially orthogonal to the average diffracting direction;
wherein the optical axis point $A_1$, middle point $A_2$, light emitting point $A_3$, focal point $f_1$ and focal point $f_2$ are plotted in X, Y and Z coordinates, wherein the X-coordinate is plotted in a direction X that is substantially parallel with the average diffracting direction and orthogonal to a direction Y of the recording track, on which a light is converged, of the recording medium, the Y-coordinate is plotted in the track direction Y, and the Z-coordinate is plotted in a direction Z orthogonal to the directions X and Y; and
wherein the first diffraction grating and second diffraction grating are so designed that a light spot is formed approximately at a center of each of the photo-detecting parts when focusing is accurately performed.

8. The optical head device according to claim 6, wherein said main photo-detecting section is divided by a parting line into two photo-detecting parts, each having a width in the direction substantially orthogonal to the average diffracting direction;
wherein the optical axis point $A_1$, middle point $A_2$, light emitting point $A_3$, focal point $f_1$ and focal point $f_2$ are plotted in X, Y and Z coordinates, wherein the X-coordinate is plotted in a direction X that is substantially parallel with the average diffracting direction and orthogonal to a direction Y of the recording track, on which a light is converged, of the recording medium, the Y-coordinate is plotted in the track direction Y, and the Z-coordinate is plotted in a direction Z orthogonal to the directions X and Y; and
wherein the first diffraction grating and second diffraction grating are so designed that a light spot is formed approximately at a center of each of the photo-detecting parts when focusing is accurately performed.

9. The optical head device according to claim 6, wherein said main photo-detecting section is divided by five parting lines into six photo-detecting parts, each having a width, in the direction substantially orthogonal to the average diffracting direction;
wherein the optical axis point $A_1$, middle point $A_2$, light emitting point $A_3$, focal point $f_1$ and focal point $f_2$ are plotted in X, Y and Z coordinates, wherein the X-coordinate is plotted in a direction X that is substantially parallel with the average diffracting direction and orthogonal to a direction Y of the recording track, on which a light beam is converged, of the recording medium, the Y-coordinate is plotted in the track direction Y, and the Z-coordinate is plotted in a direction Z orthogonal to the directions X and Y; and
wherein the first diffraction grating and second diffraction grating are so designed that, with the six photo-detecting parts being first to sixth photo-detecting parts in an order from one end along the direction substantially orthogonal to the average diffracting direction, light spots are formed with their centers in the vicinity of centers of the second and fifth photo-detecting parts respectively, when focusing is accurately performed.

10. The optical head device according to claim 6, wherein said main photo-detecting section is divided by three parting lines into first to fourth photo-detecting parts which are aligned in order along the direction substantially orthogonal to the average diffracting direction and at least one of the first and fourth photo-detecting parts which are located at both ends of the main photo-detecting section is wider than the other photo-detecting parts in the direction substantially orthogonal to the average diffracting direction.

11. The optical head device according to claim 10, wherein the parting lines each have a width, the first and fourth photo-detecting parts each have a width and the second and third photo-detecting parts each have a width, all widths being oriented in the direction substantially orthogonal to the average diffracting direction;
wherein the optical axis point $A_1$, middle point $A_2$, light emitting point $A_3$, focal point $f_1$ and focal point $f_2$ are plotted in X, Y and Z coordinates, wherein the X-coordinate is plotted in a direction X that is substantially parallel with the average diffracting direction and orthogonal to a direction Y of the recording track, on which a light beam is converged, of the recording medium, the Y-coordinate is plotted in the track direction Y, and the Z-coordinate is plotted in a direction Z orthogonal to the directions X and Y; and wherein the first diffraction grating and second diffraction grating are so designed that a light spot is formed approximately on a center of each of the second and third photo-detecting parts when focusing is accurately performed.

12. The optical head device according to claim 6, further comprising photosensitivity adjusting means for reducing the photosensitivity of at least one photo-detecting part so as to be lower than those of the other photo-detecting parts or increasing the same so as to be higher than those of the other photo-detecting parts, the photosensitivity of said at least one photo-detecting part being a cause of an undesirable inversion of a focusing error signal when the distance between the objective lens and the recording medium is excessively longer than an optimum distance with which no focusing error occurs.

13. The optical head device according to claim 9, further comprising control means for generating a tracking error signal based on the output signals from the main photo-detecting section when recording data on the recording medium and generating a tracking error signal based on output signals from the sub photo-detecting section when reading data.

14. The optical head device according to claim 13, wherein said control means generates a tracking error signal RES based on the arithmetic operation: $RES = (S_1 + S_2 + S_3) - (S_4 + S_5 + S_6)$ when recording data on the recording medium; generates the tracking error signal RES based on the arithmetic operation: $RES = S_7 - S_8$ when reading data; and generates a focusing error signal FES based on the arithmetic operation: $FES = (S_1 + S_3 + S_5) - (S_2 + S_4' + S_6)$ when recording or reading data, where $S_1$ to $S_6$ represent output signals from the first to sixth photo-detecting parts respectively, and $S_7$ and $S_8$ represent output signals from the pair of photo-detecting parts of the sub photo-detecting section respectively.

15. The optical head device according to claim 14, wherein a preferable relationship among the sizes of the light spots that are formed with their centers in the vicinity of centers of the second and fifth photo-detecting parts respectively when focusing is performed with accuracy and the widths of the first to sixth photo-detecting parts in the direction substantially orthogonal to the average diffracting direction, is determined such that the equations: $S_2 = S_1 + S_3$ and $S_5 = S_4 + S_6$ are satisfied when there occurs no focusing error.

16. The optical head device according to claim 4, wherein a join line defining a border of the first diffraction grating and second diffraction grating is parallel with a direction substantially orthogonal to the direction of the recording track, on which light is converged, of the recording medium, and the first and second diffraction gratings are designed such that the diffracting directions thereof each substantially coincide with a direction orthogonal to the track direction.

17. The optical head device according to claim 16, further comprising:
an objective lens for converging a light beam onto the recording medium;
a collimating lens for guiding a parallel beam to the objective lens;
wherein said light source may be a semiconductor laser; and wherein said main photo-detecting section is divided into a plurality of photo-detecting parts by at least a parting line extending substantially along the average diffracting direction, and the relative positions of (1) an optical axis point $A_1$ that is an intersection of the diffraction grating element and the optical axis, (2) a light emitting point $A_3$ of the semiconductor laser, (3) a middle point $A_2$ between two equal-sized light spots formed on the main photo-detecting section when focusing is accurately performed causing no focusing error, (4) a focal point $f_1$ of the first order diffracted light in the first diffraction grating at the time of accurate focusing, and (5) a focal point $f_2$ of the first order diffracted light in the second diffraction grating are determined based on the optical axis point $A_1$.

18. The optical head device according to claim 17, wherein said main photo-detecting section is divided by two parting lines into three photo-detecting parts, and the parting lines each have a width and photo-detecting parts each have a width in the direction substantially orthogonal to the average diffracting direction;

wherein the optical axis point $A_1$, middle point $A_2$, light emitting point $A_3$, focal point $f_1$ and focal point $f_2$ are plotted in X, Y and Z coordinates, wherein the X-coordinate is plotted in a direction X that is substantially parallel with the average diffracting direction and orthogonal to a direction Y of the recording track, on which a light beam is converged, of the recording medium, the Y-coordinate is plotted in the track direction Y, and the Z-coordinate is plotted in a direction Z orthogonal to the directions X and Y; and wherein the first diffraction grating and second diffraction grating are so designed that semi-circular light spots each having a chord are formed on the main photo-detecting section with their chord each positioned substantially on a center of each of the parting lines, when focusing is performed with accuracy.

19. An optical head device comprising:
a light source for emitting a light beam;
a diffraction grating element divided into first to fourth diffraction gratings by two planes each including an optical axis connecting a light emitting point on the light source from which a light beam is emitted, to a focal point on a recording medium on which the light beam is converged, wherein when focal points of first order diffracted lights produced in the first to fourth diffraction gratings respectively are plotted in X, Y, and Z coordinates, wherein the X-coordinate is plotted in a direction X that is parallel with an average diffracting direction of the diffraction grating element and orthogonal to a direction Y of a recording track, on which a light beam is converged, of the recording medium, the Y-coordinate is plotted in the tracking direction Y and the Z-coordinate is plotted in a direction Z orthogonal to the directions X and Y, (1) the Z-coordinates of the respective focal points of the first order diffracted lights in the second and fourth diffraction gratings are substantially equal at the time of accurate focusing, the first and third diffraction gratings being symmetrical with respect to the optical axis, (2) the Z-coordinates of the respective focal points of the first order diffracted lights in the second and fourth diffraction gratings are substantially equal at the time of accurate focusing, the first and third diffraction gratings being symmetrical with respect to the optical axis and (3) the Z-coordinates of the focal points of the first order diffracted lights in the first and third diffraction gratings differ from the Z-coordinates of the focal points of the first order diffracted lights in the second and fourth diffraction gratings, the first and third diffraction gratings, and the second and fourth diffraction gratings, are symmetrical with respect to the optical axis located in between, and either of those pairs has a light-converging property while the other pair has a light-diverging property whereby the Z-coordinates of the focal points of the first order diffracted lights in the first diffraction grating and third diffraction grating differ from the Z-coordinates of the focal points of the first order diffracted lights in the second diffraction grating and fourth diffraction grating, the first to fourth diffraction gratings have a substantially identical cross-sectional profile and thereby the gratings have a substantially equal optical utilization efficiency; and photo-detecting means placed substantially at a mid-position between the focal points of the first order diffracted lights produced in the first and third diffraction gratings and the focal points of the first order diffracted lights produced in the second and fourth diffraction gratings, the photo-detecting means comprising a plurality of photo-detecting parts corresponding to the first to fourth diffraction gratings, the photo-detecting parts being in a point-symmetrical relationship wherein one of two join lines that symmetrically separate the first to the fourth diffraction gratings, is parallel with the track direction and orthogonal to the other join line, and the respective diffracting directions of the first to fourth diffraction gratings substantially coincide with a direction orthogonal to the track direction.

20. The optical head device according to claim 19, further comprising separating means for separating a light emitted from the light source into a main beam and a pair of sub beams, wherein said photo-detecting means includes a main photo-detecting section comprising a plurality of photo-detecting parts for detecting recorded data and focusing errors based on the main beam, and a sub photo-detecting section comprising a pair of photo-detecting parts for detecting tracking errors based on the pair of sub beams, the photo-detecting parts of the sub photo-detecting section being positioned with the main photo-detecting section between in such a way that the photo-detecting parts of the sub photo-detecting are respectively a predetermined distance apart from the main photo-detecting section in a direction substantially orthogonal to the average diffracting direction of the diffraction grating element.

21. The optical head device according to claim 20, wherein the focal points of the first order diffracted lights respectively produced in the first and third diffraction gratings substantially coincide with each other, while the focal points of the first order diffracted lights respectively produced in the second and fourth diffraction gratings substantially coincide with each other.

22. The optical head device according to claim 21, further comprising:
an objective lens for converging a light beam onto the recording medium;
a collimating lens for guiding a parallel beam to the objective lens;
wherein said light source may be a semiconductor laser;
wherein said main photo-detecting section is a square, that is point-symmetrically divided into four parts by a first parting line having a width in a direction substantially orthogonal to the average diffracting direction and a second parting line having a width in a direction that is orthogonal to the first parting line and parallel with the average diffracting direction;
wherein the objective lens has a numerical aperture and a focal distance, and the collimating lens has a numerical aperture and a focal distance;
wherein (1) an optical axis point A that is an intersection of the diffraction grating element and the optical axis, (2) a light emitting point Q of the semiconductor laser, (3) a center O of the main photo-detecting section, (4) a focal point $f_1$ on which the first order diffracted lights in the first and third diffraction gratings are converged at the time of accurate focusing and (5) a focal point $f_2$ on which the first order diffracted lights in the second and fourth diffraction gratings are converged at the time of accurate focusing are plotted in the X, Y and Z coordinates; and
wherein the first to fourth diffraction gratings are so designed that a circular light spot formed on the main photo-detecting section with its center positioned on the center O of the main photo-detecting section when there is no focusing error occurred.

23. The optical head device according to claim 20, further comprising:
an objective lens for converging a light beam onto the recording medium;
a collimating lens for guiding a parallel beam to the objective lens;
wherein said light source is a semiconductor laser;
wherein said main photo-detecting section has a length in a direction substantially parallel with the average diffracting direction and a width in a direction substantially orthogonal to the average diffracting direction and is point-symmetrically divided into four photo-detecting parts by a first parting line having a width in the direction substantially orthogonal to the average diffracting direction and a second parting line having a width in the direction that is parallel with the average diffracting direction and orthogonal to the first parting line; and
wherein focal points $f_{1b}$, $f_{2b}$, $f_{1a}$ and $f_{2a}$ of the respective first order diffracted lights in the first to fourth diffraction gratings, a center $O_2$ of a pair of photo-detecting parts positioned substantially in the middle of the focal points $f_{1b}$ and $f_{2b}$, a center $O_1$ of a pair of photo-detecting parts positioned substantially in the middle of the focal points $f_{1a}$ and $f_{2a}$ are plotted in the X, Y and Z coordinates; and
wherein the first and second diffraction gratings are designed such that a semi-circular light spot is formed in the vicinity of the center $O_2$ when focusing is accurately formed, and the third and fourth diffraction gratings are designed such that a semicircular light spot is formed in the vicinity of the center $O_1$ when focusing is accurately formed.

24. The optical head device according to claim 21, further comprising:
an objective lens for converging a light beam onto the recording medium;
a collimating lens for guiding a parallel beam to the objective lens;
wherein said light source is a semiconductor laser;
wherein said main photo-detecting section is divided into eight parts by (1) a first parting line substantially parallel with the average diffracting direction of the diffraction grating element, (2) a second parting line that passes through a center of the main photo-detecting section and is orthogonal to the first parting line, (3) third and fourth parting lines that are parallel with the second parting line and symmetrical with respect to the second parting line; and
wherein a circular light spot is formed on a center of the main photo-detecting section when focusing is accurately performed, and a focusing error signal is generated based on output signals from four photo-detecting parts positioned at the center of the main photo-detecting section.

25. The optical head device according to claim 21, further comprising:
an objective lens for converging a light beam onto the recording medium;
a collimating lens for guiding a parallel beam to the objective lens;
wherein said light source is a semiconductor laser;
wherein said main photo-detecting section has a circular shape and is divided into eight parts by (1) a first parting line substantially parallel with the average diffracting direction of the diffraction grating element, (2) a second parting line that passes through the center of the main photo-detecting section and is orthogonal to the first parting line and (3) a third parting line that is a circle line concentric with the main photo-detecting section, having a predetermined radius; and
wherein a circular light spot is formed at the center of the main photo-detecting section when focusing is accurately performed, and a focusing error is generated based on output signals from four photo-detecting parts positioned at the center of the main photo-detecting section.

26. The optical head device according to claim 25, wherein assuming that four photo-detecting parts existing in the outer circumference of the main photo-detecting section are clockwise referred to as first to fourth photo-detecting parts; a photo-detecting part positioned at the inner part of the main photo-detecting section with its arc coming in contact with the first photo-detecting part is referred to as a fifth photo-detecting part; three photo-detecting parts are referred to as sixth to eighth photo-detecting parts clockwise from the fifth photo-detecting part; and output signals generated from the first to eighth photo-detecting parts are represented by S1 to S8 respectively, a preferable diameter of the circular light spot formed at the center of the main photo-detecting section is set to satisfy the equation: $S1+S2+S3+S4=S5+S6+S7+S8$ and at that time, a focusing error signal FES is given by: $FES=(S1+S3+S6+S8)-(S2+S4+S5+S7)$.

27. The optical head device according to claim 21, further comprising:
an objective lens for converging a light beam onto the recording medium;
a collimating lens for guiding a parallel beam to the objective lens;
wherein said light source is a semiconductor laser;
wherein said main photo-detecting section is divided into six photo-detecting parts by five parting lines substantially orthogonal to the average diffracting direction of the diffraction grating element;
wherein assuming that the photo-detecting parts are referred to as first to sixth photo-detecting parts in the order of their positions near to the diffraction grating element, when there is no focusing error occurred, point-symmetrical light spots formed by the first order diffracted lights produced in the first and third diffraction gratings and irradiated closely to each other in the vicinity of a center of an area consisting of the first to third photo-detecting parts and point-symmetrical light spots formed by the first order diffracted lights produced in the second and fourth diffraction gratings are irradiated closely to each other in the vicinity of a center of an area consisting of the fourth to sixth photo-detecting parts; and
wherein a focusing error signal FES is generated based on: $FES=S2-S5$ or $FES (S2+S4+S6)-(S1+S3+S5)$ where S1 to S6 represent output signals from the first to sixth photo-detecting parts respectively.

28. The optical head device according to claim 20, further comprising tracking error detecting means for detecting a tracking error by (1) generating a difference signal based on a difference between a sum signal for output signals released from the photo-detecting parts which receive the light spots of the first order diffracted lights produced in the first and third diffraction gratings which are symmetrical and a sum signal for output signals released from the photo-detecting parts which receive the light spots of the first order diffracted lights produced in the second and fourth diffraction gratings which are symmetrical, (2) generating a sum signal based on output signals from all the photo-detecting parts of the photo-detecting means, and (3) comparing the phase of said difference signal with the phase of said sum signal based on the output signals of all the photo-detecting parts.

29. The optical head device according to claim 28, wherein said tracking error detecting means is a heterodyne detector circuit.

30. The optical head device according to claim 29,
wherein said photo-detecting means comprises a plurality of photo-detecting parts divided by a plurality of parting lines so as to be point-symmetrical with respect to a center of the photo-detecting means;
wherein when there is no tracking error occurred, a difference signal generated based on a difference between a sum signal for output signals from a first pair of point-symmetrical photo-detecting parts and a sum signal for output signals from a second pair of point-symmetrical photo-detecting parts is "0";
wherein when a light/dark pattern of reflected light from the recording medium is formed on the diffraction grating element as a light beam scans the recording track of the recording medium, (1) if a tracking error occurs so that the area ratio of the light part of the pattern formed on the first and third diffraction gratings to the dark part of the same, which is firstly larger than the area ratio of the light part of the pattern formed on the second and fourth diffraction gratings to the dark part of the same, becomes smaller than the latter, the phase of the difference signal detected by the tracking error detecting means is backwardly shifted from the phase of the sum signal for output signals released from all the photo-detecting parts by 90°, if a tracking error occurs so that the area ratio of the light part of the pattern formed on the first and third diffraction gratings to the dark part of the same, which is firstly smaller than the area ratio of the light part of the pattern formed on the second and forth diffraction gratings to the dark part of the same, becomes larger than the latter, the phase of the difference signal detected by the tracking error detecting means is forwardly shifted from the phase of the sum signal by and 90°; and wherein tracking control is performed based on a difference between the phases of the difference signal and sum signal.

31. The optical head device according to claim 30, wherein said photo-detecting means is point-symmetrically divided into first to fourth photo-detecting parts by a first parting line which has a width in a direction substantially orthogonal to an average diffracting direction of first to fourth diffraction gratings and a second parting line which has a width in a direction orthogonal to the first parting line and parallel with the average diffracting direction; and wherein the first to fourth diffraction gratings are designed such that when there is no focusing error occurred, light spots are formed in close proximity to a center of an area consisting of the first to forth photo-detecting parts.

32. The optical head device according to claim 30, wherein said photo-detecting means point-symmetrically divided into first to fourth photo-detecting parts by a first parting line which has a width in a direction substantially orthogonal to an average diffracting direction of the first to fourth diffraction gratings and a second parting line which has a width in a direction orthogonal to the first parting line and parallel with the average diffracting direction, said first to fourth photo-detecting parts respectively having a rectangular shape elongated in the average diffracting direction of the diffraction grating element;

wherein said first parting line defines a border between the first and second photo-detecting parts and third and fourth photo-detecting parts, and the first and second photo-detecting parts are placed substantially at a mid-position between a focal point of a first order diffracted light produced in the first diffraction grating at the time of accurate focusing and a focal point of a first order diffracted light produced in the second diffraction grating at the time of accurate focusing, while the third and fourth photo-detecting parts are placed substantially at a mid-position between a focal point of a first diffracted light produced in the third diffraction grating at the time of accurate focusing and a focal point of a first order diffracted light produced in the fourth diffraction grating at the time of accurate focusing; and wherein when there is no focusing error occurred, light spots formed by the first order diffracted lights in the first and second diffraction gratings are positioned in close proximity to a center of an area consisting of the first and second photo-detecting parts, while light spots formed by the first order diffracted lights in the third and fourth diffraction gratings are positioned in close proximity to a center of an area consisting of the third and fourth photo-detecting parts.

33. The optical head device according to claim 30, wherein said photo-detecting means is divided into eight photo-detecting parts by (1) a first parting line substantially parallel with the average diffracting direction of the first to fourth diffraction gratings, (2) a second parting line that passes through the center of the photo-detecting means, being orthogonal to the first parting line, and (3) third and fourth parting lines which are parallel with the second parting line and symmetrical with respect to the second parting line;

wherein when there is no focusing error occurred, a circular light spot is formed at the center of the photo-detecting means; and wherein the difference signal is generated based on a difference between a sum signal for the output signals from the first pair of photo-detecting parts and a sum signal for the output signals from the second pair of photo-detecting parts, the first pair and second pair respectively being point-symmetrical and positioned at the center of the photo-detecting means.

34. The optical head device according to claim 30, wherein said photo-detecting means is circular in its entire configuration and is divided into eight photo-detecting parts by (1) a first parting line substantially parallel with the average diffracting direction of the first to fourth diffraction gratings, (2) a second parting line that passes through the center of the photo-detecting means, being orthogonal to the first parting line, (3) a third parting line that is a circle line concentric with the photo-detecting means, having a predetermined radius;

wherein when there is not focusing error occurred, a circular light spot is formed at the center of the photo-detecting means; and wherein the difference signal is generated based on a difference between a sum signal for the output signals from the first pair of photo-detecting parts and a sum signal for the output signals from the second pair of photo-detecting parts, the first pair and second pair of photo-detecting parts, the first pair and second pair respectively being point-symmetrical and positioned within the third parting line of the photo-detecting means.

35. The optical head device according to claim 29, wherein said photo-detecting means is divided in to six photo-detecting parts by five parting lines substantially orthogonal to the average diffracting direction of the diffraction grating element;

wherein assuming that the photo-detecting parts are referred to as first to sixth photo-detecting parts in the order of their positions near to the diffraction grating element, when there is no focusing error occurred, point-symmetrical light spots formed by the first order diffracted lights produced in the first and third diffraction gratings are irradiated in the vicinity of a center of an area consisting of the first to third photo-detecting parts, and point-symmetrical light spots formed by the first order diffracted lights produced in the second and fourth diffraction gratings are irradiated in the vicinity of a center of an area consisting of the fourth to sixth photo-detecting parts;

wherein when tracking is accurately performed without an error, a difference signal generated based on a difference between a sum signal for output signals from the first and third photo-detecting parts and a sum signal for output signals from the fourth and sixth photo-detecting parts is "0";

wherein when a light/dark pattern of a reflected light from the recording medium is formed on the diffraction grating element as a light beam scans the recording track of the recording medium, (1) if a tracking error occurs so that the area ratio of the light part of the pattern formed on the first and third diffraction gratings to the dark part of the same, which is firstly larger than the area ratio of the light part of the pattern formed on the second and fourth diffraction gratings to the dark part of the same, becomes smaller than the latter, the phase of the difference signal detected by the tracking error detecting means is backwardly shifted from the phase of the sum signal for output signals released from the six photo-detecting parts by 90°, and (2) if a tracking error occurs so that the area ratio of the light part of the pattern formed on the first and third diffraction gratings to the dark part of the same, which is firstly smaller than the area ratio of the same, which is firstly smaller than the area ratio of the light part of the pattern formed on the second and fourth diffraction gratings to the dark part of the same, becomes larger than the latter, the phase of the difference signal detected by the tracking error detecting means is forwardly shifted from the phase of the sum signal by 90°; and wherein tracking control is performed based on a difference between the phases of the difference signal and sum signal.

36. The optical head device according to claim 10, wherein at least either of the first and fourth photo-detecting parts has a width of e.g. 100 μm in a direction orthogonal to the average diffracting direction and said width is about four times as large as the width of the other photo-detecting part (e.g. 25 μm) in said direction.

37. The optical head device according to claim 12, wherein said photo-detecting means comprises first to fourth photo-detecting parts aligned in a direction substantially orthogonal to the average diffracting direction of the diffraction grating element; and wherein said photosensitivity adjusting means decreases the photosensitivity of the first photo-detecting part positioned at one end of the main photo-detecting section to be lower than those of the other photo-detecting parts, or increases the photosensitivity of the fourth photo-detecting part positioned at the other end of the main photo-detecting section to be higher than those of the other photo-detecting parts.

38. The optical head device according to claim 37, wherein said photo-detecting means is divided into four photo-detecting parts by three parting lines, each parting line and each photo-detecting part having a width in a direction substantially orthogonal to the average diffracting direction;

wherein the objective lens has a numerical aperture and a focal distance and the collimating lens has a numerical aperture and a focal distance;

wherein the optical axis point $A_1$, middle point $A_2$, light emitting point $A_3$, focal point $f_1$ and focal point $f_2$ are plotted in X, Y and Z coordinates, wherein the X-coordinate is plotted in a direction X that is substantially parallel with the average diffracting direction of the diffraction grating element and orthogonal to a direction Y of a recording track, on which a laser beam is converged, of the recording medium, the Y-coordinate is plotted in the track direction Y, and the Z-coordinate is plotted in a direction Z orthogonal to the directions X and Y; and wherein the first diffraction grating and second diffraction grating are so designed that, with the four photo-detecting parts being first to fourth photo-detecting parts in an order from one end of the main photo-detecting section, light spots are formed in the vicinity of centers of the second and third photo-detecting parts respectively at the time of accurate focusing.

39. The optical head device according to claim 38, wherein the photosensitivity of the first photo-detecting part located in one end of the main photo-detecting section is 0.7 times as high as the photosensitivities of the other photo-detecting parts.

40. An optical head device comprising:

a light source for emitting a light beam;

a diffraction grating element divided into a first diffraction grating and a second diffraction grating by a plane including an optical axis that connects a light emitting point on the light source from which a light beam is emitted, to a focal point on a recording medium on which the light beam is converged, the first and second diffraction gratings having different focal distances of first order diffracted light;

separating means for separating the light emitted from the light source into a main beam and a pair of sub beams;

photo-detecting means disposed substantially at a mid-position between a focal point of a first order diffracted light produced in the first diffraction grating and a focal point of a first order diffracted light produced in the second diffraction grating when no focusing error occurs, the photo-detecting means comprising a plurality of photo-detecting parts juxtaposed in a direction substantially orthogonal to an average diffracting direction of the diffraction grating element;

wherein the first diffraction grating and second diffraction grating are designed such that lights diffracted at the first diffraction grating and second diffraction grating are guided into the photo-detecting means to form light spots that are aligned in a direction substantially orthogonal to the average diffracting direction of the diffraction grating element; and wherein said photo-detecting means includes a main photo-detecting section comprising a plurality of photo-detecting parts for detecting recorded data and focusing errors based on the main beam, and a sub photo-detecting section comprising a pair of photo-detecting parts for detecting tracking errors based on the pair of sub beams, the photo-detecting parts of the sub photo-detecting section being positioned with the main photo-detecting section between in such a way that the photo-detecting parts of the sub photo-detecting section are respectively a predetermined distance apart from the main photo-detecting section in the direction substantially orthogonal to the average diffracting direction of the diffraction grating element, wherein the main photo-detecting section is divided into six photo-detecting sections by five parting lines that are substantially parallel to the average diffracting direction, and referring to the first through sixth photo-detecting sections in an order from an edge that runs along a direction virtually orthogonal to the average diffracting direction, the first and second diffracting gratings are formed such that the centers of the resulting light spots are respectively directed to the centers of the second and fifth photo-detecting sections when there is no focusing error, and one of either the first diffraction grating or second diffraction grating has a light-converging property with the other one having a light-diverging property, and thereby the focal distance of a first order diffracted light produced in the first diffraction grating differs from the focal distance of a first order diffracted light produced in the second diffraction grating.

41. The optical head device according to claim 40, further comprising control means for generating a tracking error signal based on the output signals from the main photo-detecting section when recording data on the recording medium and generating a tracking error signal based on output signals from the sub photo-detecting section when reading data.

42. The optical head device according to claim 41, wherein said control means generates a tracking error signal RES based on the arithmetic operation: $RES=(S_1+S_2+S_3)-(S_4+S_5+S_6)$ when recording data on the recording medium; generates the tracking error signal RES based on the arithmetic operation: $RES = S_7 - S_8$ when reading data; and generates a focusing error signal FES based on the arithmetic operation: $FES=(S_1+S_3+S_5)-(S_2+S_4+S_6)$ when recording or reading data, where $S_1$ to $S_6$ represent output signals from the first to the sixth of the plurality of photo-detecting parts respectively, and $S_7$ and $S_8$ represent output 1signals from the pair of photo-detecting parts of the sub photo-detecting section respectively.

43. The optical head device according to claim 42, wherein a preferable relationship among the sizes of the light spots that are formed with their centers in the vicinity of centers of the second and the fifth of the plurality of photo-detecting parts respectively, when focusing is performed with accuracy and the widths of the first to sixth photo-detecting parts in the direction substantially orthogonal to the average diffracting direction, is determined such that the equations: $S_2=S_1+S_3$ and $S_5=S_4+S_6$ are satisfied when there occurs no focusing error.

44. An optical head device comprising:
a light source for emitting a light beam;
a diffraction grating element divided into a first diffraction grating and a second diffraction grating by a plane including an optical axis that connects a light emitting point on the light source from which a light beam is emitted, to a focal point on a recording medium on which the light beam is converged, the first and second diffraction gratings having different focal distances of first order diffracted light;

separating means for separating the light emitted from the light source into a main beam and a pair of sub beams;

photo-detecting means disposed substantially at a mid-position between a focal point of a first order diffracted light produced in the first diffraction grating and a focal point of a first order diffracted light produced in the second diffraction grating when there occurs no focusing error, the photo-detecting means comprising a plurality of photo-detecting parts juxtaposed in a direction substantially orthogonal to an average diffracting direction of the diffraction grating element;

wherein said photo-detecting means includes a main photo-detecting section divided by two parting lines into three photo-detecting parts for detecting recorded data and focusing errors based on the main beam, the photo-detecting parts having a width in the direction substantially orthogonal to the average diffracting direction, and a sub photo-detecting section comprising a pair of photo-detecting parts for detecting tracking errors based on the pair of sub beams, the photo-detecting parts of the sub photo-detecting section being positioned with the main photo-detecting section between in such a way that the photo-detecting parts of the sub photo-detecting section are respectively a predetermined distance apart from the main photo-detecting section in the direction substantially orthogonal to the average diffracting direction of the diffraction grating element;

wherein the first diffraction grating and second diffraction grating are designed such that light diffracted at the first diffraction grating and second diffraction grating are guided into the photo-detecting means to form light spots that are aligned in a direction substantially orthogonal to the average diffracting direction of the diffraction grating element, the first diffraction grating and the second diffraction grating having a substantially identical profile and thereby said first and second diffraction gratings having a substantially equal optical utilization efficiency; and wherein the photo detecting parts are in a point symmetric relationship wherein a join line defining the first diffraction grating and second diffraction grating is parallel with a direction substantially orthogonal to the direction of the recording track, on which light is converged, of the recording medium, and the first and second diffraction gratings are designed such that the diffracting directions thereof each substantially coincide with a direction orthogonal to the track direction.

45. The optical head device according to claim 44, further comprising:
an objective lens for converging a light beam onto the recording medium;
a collimating lens for guiding a parallel beam to the objective lens;
wherein said light source is a semiconductor laser; and
wherein said main photo-detecting section is divided into a plurality of photo-detecting parts by at least a parting line extending substantially along the average diffracting direction, and the relative positions of (1) an optical axis point $A_1$ that is an intersection of the diffraction grating element and the optical axis, (2) a light emitting point $A_3$ of the semiconductor laser, (3) a middle point $A_2$ between two equal-sized light spots formed on the main photo-detecting section when focusing is accurately performed causing no focusing error, (4) a focal point $f_1$ of the first order diffracted light in the first diffraction grating at the time of accurate focusing, and (5) a focal point $f_2$ of the first order diffracted light in the second diffraction grating are determined based on the optical axis.

46. An optical head device comprising:

a light source for emitting a light beam;

a diffraction grating element divided into a first diffraction grating and a second diffraction grating by a plane including an optical axis that connects a light emitting point on the light source from which a light beam is emitted, to a focal point on a recording medium on which the light beam is converged, the first and second diffraction gratings having different focal distances of first order diffracted light;

separating means for separating the light emitted from the light source into a main beam and a pair of sub beams; and photo-detecting means disposed substantially at a mid-position between a focal point of a first order diffracted light produced in the first diffraction grating and a focal point of a first order diffracted light produced in the second diffraction grating when there occurs no focusing error, the photo-detecting means comprising a plurality of photo-detecting parts juxtaposed in a direction substantially orthogonal to an average diffracting direction of the diffraction grating element;

wherein said photo-detecting means includes a main photo-detecting section comprising a plurality of photo-detecting parts for detecting recorded data and focusing errors based on the main beam, and a sub photo-detecting section comprising a pair of photo-detecting parts for detecting tracking errors based on the pair of sub beams, the photo-detecting parts of the sub photo-detecting section being positioned with the main photo-detecting section between in such a way that the photo-detecting parts of the sub photo-detecting section are respectively a predetermined distance apart from the main photo-detecting section in the direction substantially orthogonal to the average diffracting direction of the diffraction grating element;

wherein the first diffraction grating and second diffraction grating are designed such that lights diffracted at the first diffraction grating and second diffraction grating are guided into the photo-detecting means to form light spots that are aligned in a direction substantially orthogonal to the average diffracting direction of the diffraction grating element and one of either the first diffraction grating element or second diffraction grating has a light-converging property with the other one having a light-diverging property, and thereby the focal distance of a first order diffracted light produced in the first diffracting grating differs from the focal distance of a first order diffracted light produced in the second diffraction grating;

said main photo-detecting section is divided by three parting lines into first to fourth photo-detecting parts which are aligned in order along the direction substantially orthogonal to the average diffracting direction and at least one of the first and fourth photo-detecting parts which are located at both ends of the main photo-detecting section is set to be approximately four times the width of the other photo-detecting parts in the direction substantially orthogonal to the average diffracting direction.

47. The optical head device according to claim 46, wherein the parting lines each have a width, the first and fourth photo-detecting parts each have a width and the second and third photo-detecting parts each have a width, all widths being oriented in the direction substantially orthogonal to the average diffracting direction;

wherein the optical axis point $A_1$, middle point $A_2$, light emitting point $A_3$, focal point $f_1$ and focal point $f_2$ are plotted in X, Y and Z coordinates, wherein the X-coordinate is plotted in a direction X that is substantially parallel with the average diffracting direction and orthogonal to a direction Y of the recording track, on which a light beam is converged, of the recording medium, the Y-coordinate is plotted in the track direction Y, and the Z-coordinate is plotted in a direction Z orthogonal to the directions X and Y; and wherein the first diffraction grating and second diffraction grating are so designed that a light spot is formed approximately on a center of each of the second and third photo-detecting parts when focusing is accurately performed.

48. An optical head device comprising:

a light source for emitting a light beam;

a diffraction grating element divided into a first diffraction grating and a second diffraction grating by a plane including an optical axis that connects a light emitting point on the light source from which a light beam is emitted, to a focal point on a recording medium on which the light beam is converged, the first and second diffraction gratings having different focal distances of first order diffracted light;

separating means for separating the light emitted from the light source into a main beam and a pair of sub beams;

photo-detecting means disposed substantially at a mid-position between a focal point of a first order diffracted light produced in the first diffraction grating and a focal point of a first order diffracted light produced in the second diffraction grating when there occurs no focusing error, the photo-detecting means comprising a plurality of photo-detecting parts juxtaposed in a direction substantially orthogonal to an average diffracting direction of the diffraction grating element;

photosensitivity adjusting means for eliminating the inversion of a focusing error signal by changing the photosensitivity of at least one of two photo-detecting sections, located at both sides of photo-detecting sections lined up in the direction orthogonal to average diffracting direction, from those of the other photo-detecting sections, wherein the first diffraction grating and the second diffraction grating have a substantially identical profile and thereby said first and second diffraction gratings have a substantially equal optical utilization efficiency; and wherein the first diffraction grating and second diffraction grating are designed such that lights diffracted at the first diffraction grating and second diffraction grating are guided into the photo-detecting means to form light spots that are aligned in a direction substantially orthogonal to the average diffracting direction of the diffraction grating element.

49. The optical head device according to claim 48, wherein said photo-detecting means comprises first to fourth photo-detecting parts aligned in a direction substantially orthogonal to the average diffracting direction of the diffraction grating element; and wherein said photosensitivity adjusting means decreases the photosensitivity of the first photo-detecting part positioned at one end of the main photo-detecting section to be lower than those of the other photo-detecting parts, or increases the photosensitivity of the fourth photo-detecting part positioned at the other end of the main photo-detecting section to be higher than those of the other photo-detecting parts.

50. The optical head device according to claim 48, wherein said photo-detecting parts are divided into four photodetecting parts by three parting lines, each parting line and each photo-detecting part having a width respectively in a direction substantially orthogonal to the average diffracting direction;

wherein the optical axis point $A_1$, middle point $A_2$, light emitting point $A_3$, focal point $f_1$ and focal point $f_2$ are plotted in X, Y and Z coordinates, wherein the X-coordinate is plotted in a direction X that is substantially parallel with the average diffracting direction of the diffraction grating element and orthogonal to a direction Y of a recording track, on which a laser beam is converged, of the recording medium, the Y-coordinate is plotted in the track direction Y, and the Z-coordinate is plotted a direction Z orthogonal to the directions X and Y; and wherein the first diffraction grating and second diffraction grating are so designed that assuming that the four photo-detecting parts are referred to as first to fourth photo-detecting parts from one end of the main photo-detecting section, light spots are formed in the vicinity of centers of the second and third photo-detecting parts respectively at the time of accurate focusing.

51. The optical head device according to claim 50, wherein the photosensitivity of the first photo-detecting part located in one end of the main photo-detecting section is 0.7 times as high as the photosensitivities of the other photo-detecting parts.

52. An optical head device comprising:
a light source for emitting a light beam;
a diffraction grating element divided into a first diffraction grating and a second diffraction grating by a plane including an optical axis that connects a light emitting point on the light source from which a light beam is emitted, to a focal point on a recording medium on which the light beam is converged, the first and second diffraction gratings having different focal distances of first order diffracted light;

separating means for separating the light emitted from the light source into a main beam and a pair of sub beams, and photo-detecting means disposed substantially at a mid-position between a focal point of a first order diffracted light produced in the first diffraction grating and a focal point of a first order diffracted light produced in the second diffraction grating when there occurs no focusing error, the photo-detecting means comprising a plurality of photo-detecting parts juxtaposed in a direction substantially orthogonal to an average diffracting direction of the diffraction grating element;

wherein said photo-detecting means includes a main photo-detecting section comprising a plurality of photo-detecting parts for detecting recorded data and focusing errors based on the main beam, and a sub photo-detecting section comprising a pair of photo-detecting parts for detecting tracking errors based on the pair of sub beams, the photo-detecting parts of the sub photo-detecting section being positioned with the main photo-detecting section between in such a way that the photo-detecting parts of the sub photo-detecting section are respectively a predetermined distance apart from the main photo-detecting section in the direction substantially orthogonal to the average diffracting direction of the diffraction grating element;

control means for generating a tracking error signal based on the output signals from the main photo-detecting section when recording data on the recording medium and generating a tracking error signal based on output signals from the sub photo-detecting section when reading data; and wherein the main photo-detecting section is divided into six photo-detecting sections by five parting lines that are substantially parallel to the average diffracting direction, and wherein the first diffraction grating and second diffraction grating are designed such that lights diffracted at the first diffraction grating and second diffraction grating are guided into the photo-detecting means to form light spots that are aligned in a direction substantially orthogonal to the average diffracting direction of the diffraction grating element, one of either the first diffracting grating or second diffraction grating having a light-converging property with the other one having a light diverging property, and thereby the focal distance of a first order diffracted light produced in the first diffraction grating differs from the focal distance of a first order diffracted light produced in the second diffraction grating, the first diffraction grating and the second diffraction grating having a substantially identical profile and thereby said first and second diffraction gratings having a substantially equal optical utilization efficiency.

53. The optical head device according to claim 52, wherein said control means generates a tracking error signal RES based on the arithmetic operation: $RES=(S_1+S_2+S_3)-(S_4+S_5+S_6)$ when recording data on the recording medium; generates the tracking error signal RES based on the arithmetic operation: $RES = S_7-S_8$ when reading data; and generates a focusing error signal FES based on the arithmetic operation: $FES=(S_1+S_3+S_5)-(S_2+S_4+S_6)$ when recording or reading data, where $S_1$ to $S_6$ represent output signals from the first to the sixth of the plurality of photo-detecting parts respectively, and $S_7$ and $S_8$ represent output signals from the pair of photo-detecting parts of the sub photo-detecting section respectively.

54. The optical head device according to claim 53, wherein a preferable relationship among the sized of the light spots that are formed with their centers in the vicinity of centers of the second and the fifth of the plurality of photo-detecting parts respectively, when focusing is performed with accuracy and the widths of the first to sixth photo-detecting parts in the direction substantially orthogonal to the average diffracting direction, is determined such that the equations: $S_2=S_1+S_3$ and $S_5=S_4+S_6$ are satisfied when there occurs no focusing error.

55. The optical head device according to claim 9, further comprising control means for generating a tracking error signal based on the output signals from the main photo-detecting section when recording data on the recording medium and generating a tracking error signal based on output signals from the sub photo-detecting section when reading data.

* * * * *